(12) United States Patent
Norieda et al.

(10) Patent No.: US 10,372,229 B2
(45) Date of Patent: Aug. 6, 2019

(54) INFORMATION PROCESSING SYSTEM, INFORMATION PROCESSING APPARATUS, CONTROL METHOD, AND PROGRAM

(71) Applicant: NEC Corporation, Minato-ku, Tokyo (JP)

(72) Inventors: Shin Norieda, Tokyo (JP); Makoto Yoshimoto, Tokyo (JP); Yoshinori Saida, Tokyo (JP); Hiroki Kosuge, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/759,941

(22) PCT Filed: Sep. 20, 2016

(86) PCT No.: PCT/JP2016/077731
§ 371 (c)(1),
(2) Date: Mar. 14, 2018

(87) PCT Pub. No.: WO2017/145423
PCT Pub. Date: Aug. 31, 2017

(65) Prior Publication Data
US 2018/0253149 A1     Sep. 6, 2018

(30) Foreign Application Priority Data
Feb. 25, 2016   (JP) ................... 2016-033960

(51) Int. Cl.
*G06F 3/01*     (2006.01)
*G06K 9/00*     (2006.01)
(Continued)

(52) U.S. Cl.
CPC .............. *G06F 3/017* (2013.01); *G06F 3/011* (2013.01); *G06F 3/03547* (2013.01);
(Continued)

(58) Field of Classification Search
CPC ...... G06F 3/017; G06F 3/0426; G06F 3/0346; G06K 9/00664; G02B 27/0172
(Continued)

(56) References Cited

U.S. PATENT DOCUMENTS 7,027,054 B1 *  4/2006  Cheiky ................... G06T 13/40
                                                   345/473
7,719,563 B2 *  5/2010  Richards ............. G06F 3/04815
                                                    348/36
(Continued)

FOREIGN PATENT DOCUMENTS

JP    2012-079138 A    4/2012
JP    2013-041431 A    2/2013
(Continued)

OTHER PUBLICATIONS

International Search Report for PCT Application No. PCT/JP2016/077731, dated Nov. 22, 2016.
(Continued)

*Primary Examiner* — Prabodh M Dharia

(57) ABSTRACT

An information processing system (3000) includes a marker (3020). The marker (3020) is any part of the body of a user of the information processing system (3000), or is any object attached to the user of the information processing system (3000). An information processing apparatus (2000) includes an operation region extraction unit (2020) and a recognition unit (2040). The operation region extraction unit (2020) extracts an operation region from a captured image on the basis of a position of the marker (3020). The recognition unit (2040) calculates a position or motion of an operation body in the operation region on a captured image. The recognition unit (2040) recognizes an input operation on the basis of the calculated position or motion of the operation body.

18 Claims, 42 Drawing Sheets

(51) Int. Cl.
  *G06T 7/20* (2017.01)
  *G06T 7/73* (2017.01)
  *G06F 3/042* (2006.01)
  *G06F 3/0354* (2013.01)
  *G06F 3/0482* (2013.01)
  *G06F 3/0484* (2013.01)
  *G06F 3/0488* (2013.01)

(52) U.S. Cl.
  CPC ............ *G06F 3/042* (2013.01); *G06F 3/0482* (2013.01); *G06F 3/04842* (2013.01); *G06F 3/04847* (2013.01); *G06F 3/04883* (2013.01); *G06F 3/04886* (2013.01); *G06K 9/00375* (2013.01); *G06T 7/20* (2013.01); *G06T 7/73* (2017.01); *G06T 2207/10004* (2013.01); *G06T 2207/30204* (2013.01)

(58) Field of Classification Search
  USPC .......................... 345/156–184; 348/47.61; 1/1
  See application file for complete search history.

(56) References Cited

U.S. PATENT DOCUMENTS

| | | | | |
|---|---|---|---|---|
| 8,175,364 | B2* | 5/2012 | Goto | A61B 5/055 382/131 |
| 9,292,097 | B1* | 3/2016 | Miller | G06F 1/163 |
| 9,566,004 | B1* | 2/2017 | Radwin | |
| 2005/0128286 | A1* | 6/2005 | Richards | G06F 3/04815 348/36 |
| 2008/0100588 | A1* | 5/2008 | Nogami | G06F 3/016 345/173 |
| 2009/0128552 | A1* | 5/2009 | Fujiki | G06T 19/006 345/419 |
| 2010/0007665 | A1* | 1/2010 | Smith | G06T 13/40 345/473 |
| 2011/0007035 | A1* | 1/2011 | Shai | G06F 3/014 345/179 |
| 2011/0043446 | A1* | 2/2011 | Spears | G06F 3/0325 345/156 |
| 2012/0236317 | A1* | 9/2012 | Nomura | G01B 11/026 356/610 |
| 2012/0262558 | A1* | 10/2012 | Boger | G02B 27/0093 348/61 |
| 2013/0100255 | A1* | 4/2013 | Ohba | G06T 3/4038 348/47 |
| 2013/0324857 | A1* | 12/2013 | Kurillo | A61B 5/1127 600/476 |
| 2014/0168267 | A1* | 6/2014 | Kim | G06F 3/017 345/633 |
| 2014/0192087 | A1* | 7/2014 | Frost | G06F 3/011 345/633 |
| 2015/0016777 | A1 | 1/2015 | Abovitz et al. | |
| 2015/0334280 | A1* | 11/2015 | Itoh | H04N 5/2354 348/251 |
| 2016/0238703 | A1* | 8/2016 | Liu | G01S 13/867 |
| 2016/0252976 | A1* | 9/2016 | Zhang | G06F 3/0317 345/156 |
| 2016/0286164 | A1* | 9/2016 | Kratz | H04N 7/15 |
| 2016/0350973 | A1* | 12/2016 | Shapira | G06T 19/006 |
| 2017/0011496 | A1* | 1/2017 | Lu | G06T 15/50 |
| 2017/0086712 | A1* | 3/2017 | Mauro | G06K 9/00355 |
| 2017/0255838 | A1* | 9/2017 | Norieda | G06K 9/00671 |
| 2017/0324877 | A1* | 11/2017 | Tokuchi | H04N 1/00251 |
| 2018/0150186 | A1* | 5/2018 | Norieda | H03M 11/04 |
| 2018/0260032 | A1* | 9/2018 | Norieda | G06T 7/11 |
| 2018/0267619 | A1* | 9/2018 | Norieda | G06F 3/017 |

FOREIGN PATENT DOCUMENTS

| | | |
|---|---|---|
| JP | 2013-190941 A | 9/2013 |
| JP | 2014-032646 A | 2/2014 |
| JP | 2014-228945 A | 12/2014 |
| JP | 2015-504616 A | 2/2015 |
| JP | 2015-127976 A | 7/2015 |
| JP | 2015-135572 A | 7/2015 |

OTHER PUBLICATIONS

Written opinion of the International Preliminary Examining Authority for PCT Application No. PCT/JP2016/077731, dated Feb. 6, 2018.

* cited by examiner

INFORMATION PROCESSING SYSTEM, INFORMATION PROCESSING APPARATUS, CONTROL METHOD, AND PROGRAM

This application is a National Stage Entry of PCT/JP2016/077731 filed on Sep. 20, 2016, which claims priority from Japanese Patent Application 2016-033960 filed on Feb. 25, 2016, the contents of all of which are incorporated herein by reference, in their entirety.

TECHNICAL FIELD

The present invention relates to an information processing system, an information processing apparatus, a control method, and a program.

BACKGROUND ART

A technique has been developed in which an action such as gesture input performed on a space by a user is imaged by a camera, a generated captured image is analyzed, and thus the user's input operation on an information processing apparatus is recognized. Patent Document 1 discloses a technique in which a menu screen is displayed on the palm or the menu screen is changed according to a gesture of the palm of a user (for example, a gesture of opening the palm).

Patent Document 2 discloses a technique of performing input by using a virtual keyboard displayed on a head mounted display. Patent Document 2 discloses a technique in which the virtual keyboard is fixed to an object on a real space, and thus a position of the virtual keyboard is not changed even if the head of a person wearing the head mounted display is moved.

RELATED DOCUMENT

Patent Document

[Patent Document 1] U.S. Patent Application Publication No. 2015/0016777
[Patent Document 2] PCT Japanese Translation Patent Publication No. 2015-504616

SUMMARY OF THE INVENTION

Technical Problem

In a case where an image analysis process is performed on the entire captured image in order to recognize a user's input operation, the time required for the image analysis process increases.

The present invention has been made in light of the problem. An object of the present invention is to lighten a necessary process when a user's input operation is recognized from a captured image.

Solution to Problem

According to the present invention, there is provided an information processing system including a marker that is an object attached to a user or is a part of the body of the user; and an information processing apparatus.

The information processing apparatus includes (1) an operation region extraction unit that extracts an operation region from a captured image generated by a camera on the basis of a position of the marker, and (2) a recognition unit that detects a position or motion of an operation body in the operation region, and recognizes an input operation on the basis of the detected position or motion.

According to the present invention, there is provided an information processing apparatus that is the information processing apparatus included in the information processing system of the present invention.

According to the present invention, there is provided a control method executed by a computer. The control method includes (1) an operation region extraction step of extracting an operation region from a captured image generated by a camera on the basis of a position of a marker; and (2) a recognition step of detecting a position or motion of an operation body in the operation region, and recognizing an input operation on the basis of the detected position or motion.

The marker is an object attached to a user or is a part of the body of the user.

According to the present invention, there is provided a program causing a computer to execute each of the steps included in the control method of the present invention.

Advantageous Effects of Invention

According to the present invention, there is provided a technique of lightening a necessary process when a user's input operation is recognized from a captured image.

BRIEF DESCRIPTION OF THE DRAWINGS

The above-described object, and other objects, features and advantages will become more apparent on the basis of preferred embodiments described below and the following accompanying drawings.

DESCRIPTION OF EMBODIMENTS

Figure 1:
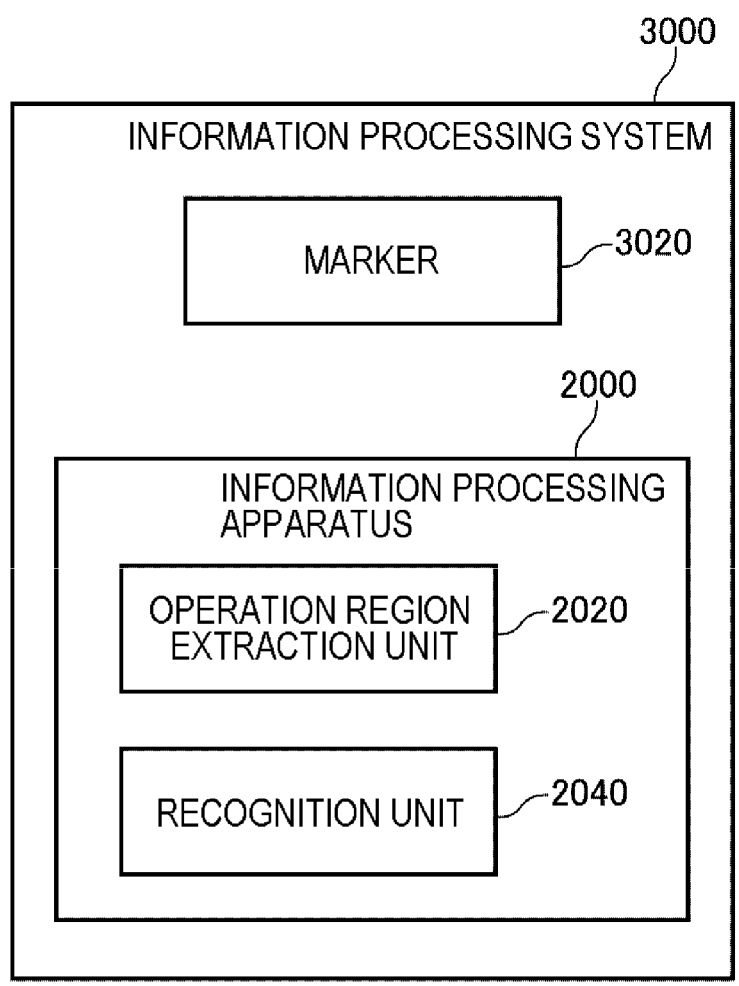
FIG. 1 is a block diagram illustrating an information processing system according to Example Embodiment 1.

Hereinafter, example embodiments of the present invention will be described with reference to the drawings. The same constituent elements are given the same reference numerals throughout all the drawings, and description thereof will not be repeated as appropriate. In each block diagram, unless particularly mentioned, each block indicates not a configuration in the hardware unit but a configuration in the functional unit.

Example Embodiment 1

FIG. 1 is a block diagram illustrating an information processing system 3000 according to Example Embodiment 1. The information processing system 3000 includes a marker 3020. The marker 3020 is any part of the body of a user of the information processing system 3000, or any object attached to the user of the information processing system 3000. The marker 3020 will be described later in detail.

An information processing apparatus 2000 includes an operation region extraction unit 2020 and a recognition unit 2040. The operation region extraction unit 2020 extracts an operation region from a captured image on the basis of a position of the marker 3020.

The recognition unit 2040 calculates a position or motion of an operation body in the operation region on the captured image. The operation body is any object used for an operation by the user. For example, the operation body is a part (the finger or the like) of the user's body or an object (a pen or the like) held by the user's body.

The recognition unit 2040 recognizes an input operation on the basis of the calculated position or motion of the operation body. A target of the input operation may be the information processing apparatus 2000 or other apparatuses.

Figure 2:
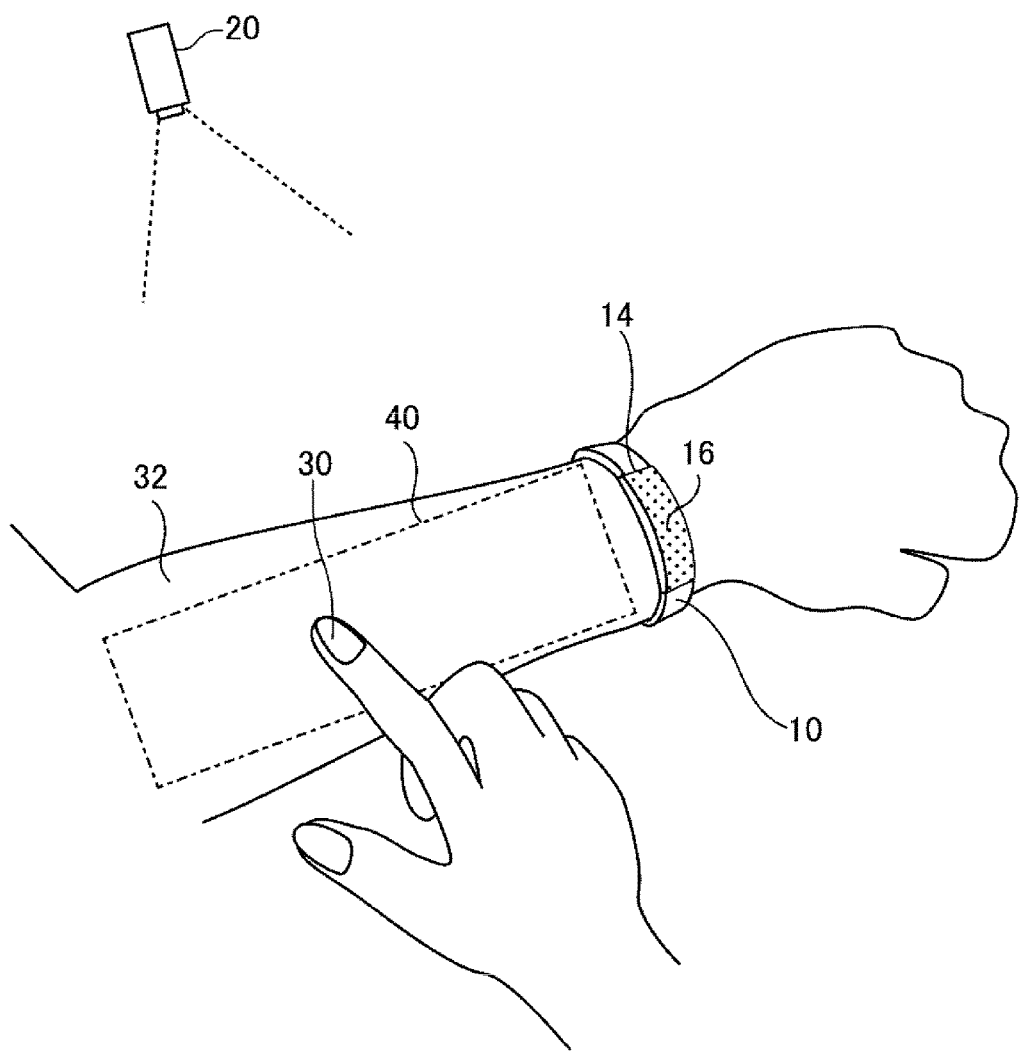
FIG. 2 is a diagram for conceptually explaining the information processing system.

FIG. 2 is a diagram for conceptually explaining the information processing system 3000. In the example illustrated in FIG. 2, a watch type device 10 is attached to the wrist of the user using the information processing system 3000. In the example illustrated in FIG. 2, the marker 3020 is an image (hereinafter, a marker image) displayed on a touch panel 14 of the device 10. In the example illustrated in FIG. 2, the operation body is the finger 30.

The operation region extraction unit 2020 extracts an operation region 40 from a captured image generated by a camera 20. The recognition unit 2040 calculates a position or motion of the finger 30 from the operation region 40, and recognizes an input operation on the basis of the position or the motion.

Here, the recognition unit 2040 detects the finger 30 from the inside of the operation region 40. In the above-described way, an image region on which image processing is to be performed in order to calculate a position or motion of the finger 30 is narrower than the entire captured image. Therefore, a process required to recognize an input operation is lightened. As a result, there is an advantage that the time required to recognize an input operation is reduced, or the amount of computer resources required to recognize an input operation is reduced.

Note that an operation of the information processing system 3000 described with reference to FIG. 2 is an example for better understanding of the information processing system 3000, and an operation of the information processing system 3000 is not limited to the above-described example. Details or variations of an operation of the information processing system 3000 will be described later.

Advantageous Effects

The information processing system 3000 of the present example embodiment extracts the operation region 40 from a captured image on the basis of a position of the marker 3020. The recognition unit 2040 calculates a position or motion of an operation body from the inside of the operation region 40. In the above-described way, a process required to recognize an input operation is lightened. As a result, there is an advantage that the time required to recognize an input operation is reduced, or the amount of computer resources required to recognize an input operation is reduced.

According to the information processing system 3000 of the present example embodiment, a user is not required to touch an input device when the user performs an input operation unlike a case where the user performs an input operation by using the input device such as a keyboard, a mouse, or a touch panel. Therefore, the information processing system 3000 of the present example embodiment is suitable to be used in an environment in which a user is required not to touch an input device.

The environment in which a user is required not to touch an input device includes, for example, a medical site, or a food handling site (a food processing site or the like). In such an environment, the hands of a user (a doctor, a nurse, an emergency personnel, a food processing worker, or the like) are required to be maintained clean, or work is required to be performed in an aseptic state. In a medical site, work may be performed in a place where infections are expected. In such an environment, if a user has to use an input device such as a keyboard, the user is required to clean the hands thereof or to replace gloves when performing an input operation, and thus work efficiency is lowered. In such an environment, even if the work efficiency is not lowered, there is a real circumstance that it is groundlessly disgusted to touch objects.

Regarding other environments in which a user is required not to touch an input device, there is an environment such as a construction site in which the hands of a user are dirty. If a user (a construction worker or the like) touches an input device, the input device becomes dirty, and thus the input device easily fails. There is an environment in which it is not preferable for a user (a radiation cleaning worker or the like) to touch peripheral objects, such as a site in which radiation cleaning is performed.

In a case of using the information processing system 3000 of the present example embodiment, in an environment in which a user is required not to touch an input device as in the above-described various environments, the user can perform an input operation without touching the input device. Therefore, by using the information processing system 3000 of the present example embodiment, it is possible to perform work accompanied by an input operation on a computer in various environments.

Hereinafter, the information processing apparatus 2000 of the present example embodiment will be described more in detail.

<Example of Hardware Configuration of Information Processing Apparatus 2000>

Each functional configuration unit of the information processing apparatus 2000 may be realized by hardware (for example, a hardware electronic circuit) realizing each functional unit, or may be realized by a combination of hardware and software (for example, a combination of an electronic circuit and a program for controlling the electronic circuit). Hereinafter, a further description will be made of a case where each functional configuration unit of the information processing apparatus 2000 is realized by a combination of hardware and software.

A computer 1000 is various computers such as a head mounted display, a tablet terminal, a smart phone, a personal computer (PC), or a server machine. The computer 1000 may be a special purpose computer designed to realize the information processing apparatus 2000, or may be a general purpose computer.

Figure 3:
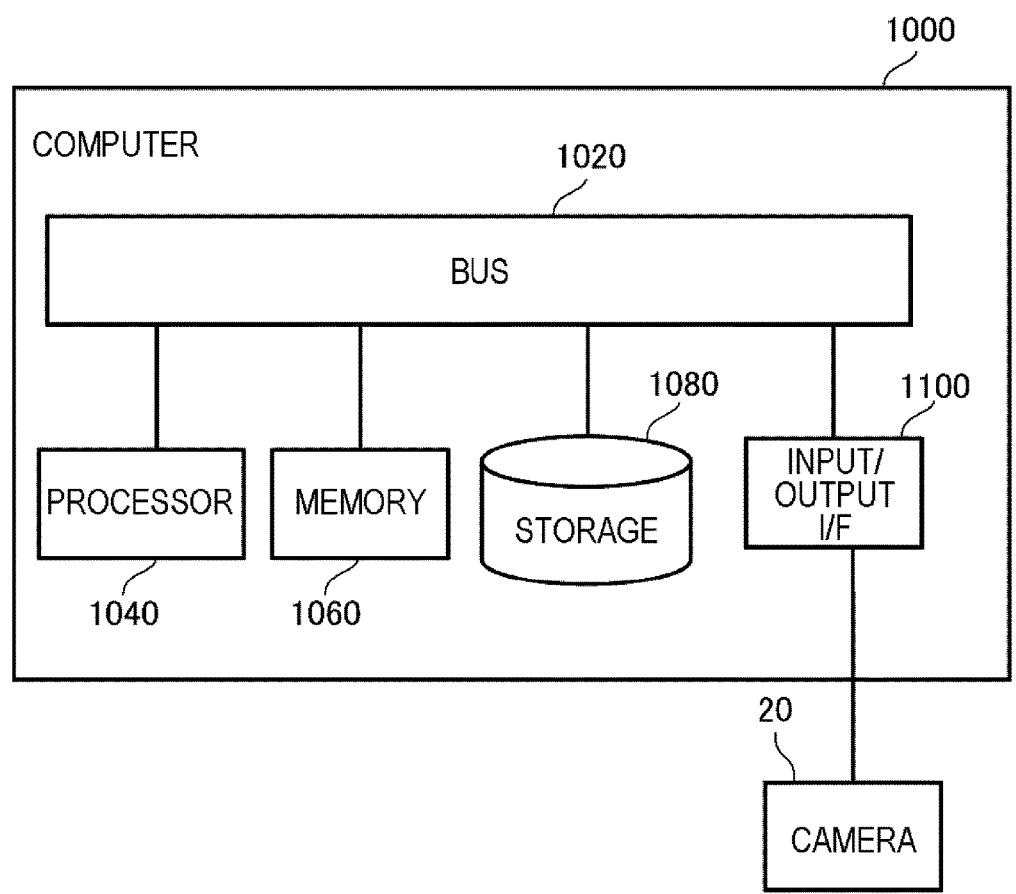
FIG. 3 is a diagram illustrating a configuration of a computer realizing an information processing apparatus.

FIG. 3 is a diagram illustrating a configuration of the computer 1000 realizing the information processing apparatus 2000. The computer 1000 includes a bus 1020, a processor 1040, a memory 1060, a storage 1080, and an input/output interface 1100. The bus 1020 is a data transmission path for transmitting and receiving data among the processor 1040, the memory 1060, and the storage 1080. However, a method of connecting the processor 1040 and the like to each other is not limited to connection using a bus. The processor 1040 is, for example, a processor such as a central processing unit (CPU) or a graphics processing unit (GPU). The memory 1060 is, for example, a random access memory (RAM) or a read only memory (ROM). The storage 1080 is, for example, a storage device such as a hard disk, a solid state drive (SSD), or a memory card. The storage 1080 may be a memory such as a RAM or a ROM.

The input/output interface 1100 connects the computer 1000 to input and output devices. In FIG. 3, the input/output interface 1100 is connected to the camera 20. The camera 20 is any camera which repeatedly performs imaging, and generates a captured image indicating each imaging result. For example, the camera 20 performs imaging at a frequency of 30 frames/sec (fps) so as to generate a video formed of a plurality of captured images arranged in a time series. Note that the camera 20 may be a two-dimensional camera, or may be a three-dimensional camera.

The camera 20 is provided at any position. For example, the camera 20 is attached to an object attached to the user. The object attached to the user is, for example, a head mounted display or an employee ID card held from the neck of the user.

Figure 4:
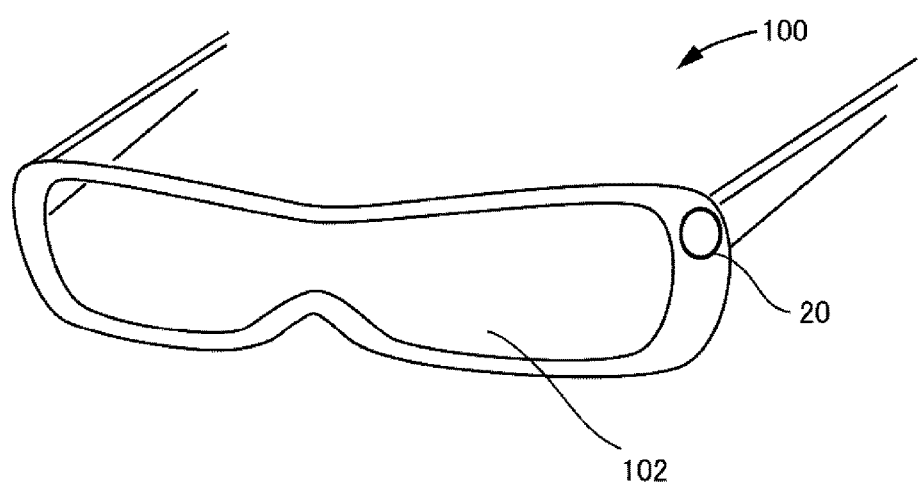
FIG. 4 is a diagram illustrating a head mounted display provided with a camera.

FIG. 4 is a diagram illustrating a head mounted display provided with the camera 20. A head mounted display 100 is a spectacle type head mounted display. A lens portion of the head mounted display 100 is a display device 102. The camera 20 is provided near the display device 102. In the above-described way, scenery included in a captured image generated by the camera 20 is the same as scenery located in a sight direction of the user wearing the head mounted display 100.

A position where the camera 20 is provided is not limited to an object attached to the user. For example, the camera 20 may be provided on a wall of a room in which the user performs an input operation on the information processing apparatus 2000. In the latter case, it is preferable that an imaging range (an imaging direction or a zoom ratio) of the camera 20 can be changed through remote control using a remote controller.

The storage 1080 stores a program module for realizing each function of the information processing apparatus 2000. The processor 1040 executes each program module so as to realize each function corresponding to the program module. The processor 1040 executes the module after reading the module to the memory 1060.

A hardware configuration of the computer 1000 is not limited to the configuration illustrated in FIG. 3. For example, each program module may be stored in the memory 1060. In this case, the computer 1000 may not include the storage 1080.

<Flow of Process>

Figure 5:
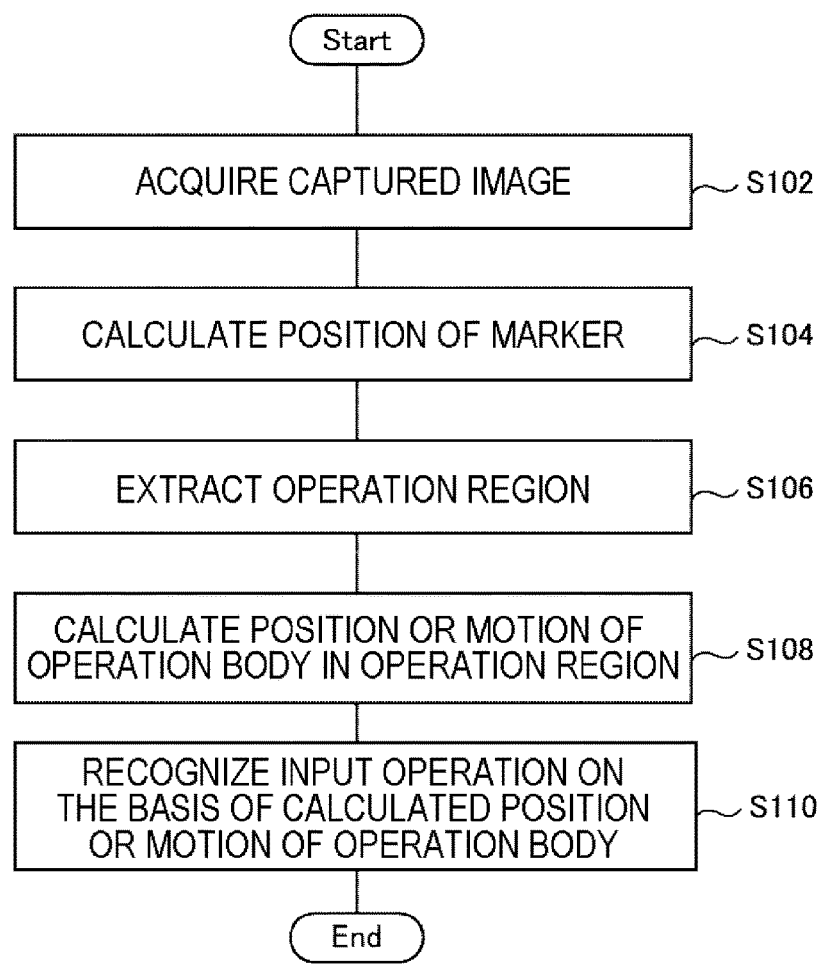
FIG. 5 is a flowchart illustrating a flow of a process performed by the information processing apparatus of Example Embodiment 1.

FIG. 5 is a flowchart illustrating a flow of a process performed by the information processing apparatus 2000 of Example Embodiment 1. The information processing apparatus 2000 acquires a captured image (S102). The operation region extraction unit 2020 calculates a position of the marker 3020 (S104). The operation region extraction unit 2020 extracts the operation region 40 from the captured image on the basis of the calculated position of the marker 3020 (S106). The recognition unit 2040 calculates a position or motion of an operation body in the operation region 40 (S108). The recognition unit 2040 recognizes an input operation on the basis of the calculated position or motion of the operation body (S110).

<Method of Acquiring Captured Image: S102>

The information processing apparatus 2000 acquires a captured image generated by the camera 20 (S104). There are various methods of the information processing apparatus 2000 acquiring a captured image. For example, the information processing apparatus 2000 acquires a captured image from the camera 20. In this case, the information processing apparatus 2000 is communicably connected to the camera 20.

In a case where the camera 20 stores a captured image in an external storage device, the information processing apparatus 2000 acquires the captured image from the storage device. In this case, the information processing apparatus 2000 is communicably connected to the storage device.

Note that the information processing apparatus 2000 may acquire all captured images generated by the camera 20, or may acquire only some thereof. In the latter case, for example, the information processing apparatus 2000 acquires only operation images at a timing at which a position of the marker 3020 is calculated by the operation region extraction unit 2020 and at the subsequent timings. In this case, a position of the marker 3020 is calculated without using a captured image.

<Method of Calculating Position of Marker 3020: S104>

The marker 3020 is any object the position of which can be calculated by the operation region extraction unit 2020. An object to be used as the marker 3020 differs depending on a method of the operation region extraction unit 2020 calculating a position of the marker 3020. Hereinafter, an object to be used as the marker 3020 will be described while specifically describing a method of calculating a position of the marker 3020. Note that information indicating an object recognized as the marker 3020 by the operation region extraction unit 2020 may be set in the marker 3020 in advance, may be stored in a storage device which can be accessed from the operation region extraction unit 2020, or may be set by the user. A single object or a plurality of objects may be handled as the marker 3020 by the operation region extraction unit 2020.

<<Calculation Through Analysis of Captured Image>>

The operation region extraction unit 2020 calculates a position of the marker 3020 by analyzing a captured image. In this case, the marker 3020 is any object at least the position of which can be determined in a captured image generated by the camera 20. For example, the marker 3020 is a marker which can be used for determination of a three-dimensional coordinate system. A marker which can be used for determination of a three-dimensional coordinate system is, for example, an augmented reality (AR) marker. However, a marker which can be used for determination of a three-dimensional coordinate system may be a marker causing three directions orthogonal to each other from a certain reference point to be obtained in a constant manner, and is not limited to the AR marker. The marker 3020 is not necessarily used for determination of a three-dimensional coordinate system as long as a position thereof can be determined in a captured image.

In a case where the marker 3020 is attached to the user's body, the marker 3020 may be attached to any location of the user's body. For example, the marker is attached to the arm portion the user. Here, the arm portion indicates a part from the hand to the shoulder.

For example, in this case, the marker is an image displayed on a display of the device 10 attached to the user's arm portion. The device 10 is any electronic device having a function of displaying an image on the display. Note that the device 10 may be directly attached to the arm of the user, or may be attached to the arm of the user through clothes.

For example, in FIG. 2, the marker 3020 is a marker image displayed on the touch panel 14 of the device 10. The marker image may be an image stored in the device 10 in advance, or may be an image stored in an external storage device of the device 10. In the latter case, the device 10 acquires the marker image from the storage device, and displays the marker image.

The marker 3020 is not limited to being displayed on the device as described above. The marker 3020 may be directly drawn on the arm portion of the user, or may be drawn on any object present on the arm portion of the user. In the latter case, for example, the marker 3020 is drawn on a ring attached to the finger of the user, a wrist band attached to the wrist of the user, or a sleeve of clothes worn by the user. Note that the marker 3020 may be drawn by the hand, or may be printed. The marker 3020 may be a specific part of the user's body. For example, the marker 3020 is the back of the hand of the user. As mentioned above, in a case where the marker 3020 is realized by objects other than a marker image displayed on the device 10, the device 10 may not be attached when the information processing system 3000 is used. Consequently, for example, it is possible to reduce cost required to realize the information processing system 3000.

The marker 3020 may be a light emitting device (a light emitting diode (LED) or the like) emitting light. Note that, in a case where the marker 3020 is a light emitting device, and the operation region extraction unit 2020 determines a three-dimensional coordinate system on the basis of the marker 3020, the marker 3020 is formed by using three or more light emitting devices. The operation region extraction unit 2020 calculates a position of light emitted from each of the three or more light emitting devices included in a captured image. The operation region extraction unit 2020 may determine a three-dimensional coordinate system on the basis of a position of each light emitting device. Note that a known method may be used as a method of determining a three-dimensional coordinate system by using three or more objects, and thus a description of a specific method thereof will not be repeated.

In order to detect the marker 3020 from a captured image, the operation region extraction unit 2020 uses information (information regarding a shape, a size, a color, or the like of the marker 3020; hereinafter, marker information) for determining an object handled as the marker 3020. The information may be set in the operation region extraction unit 2020 in advance, may be stored in a storage device which can be accessed from the operation region extraction unit 2020, or may be set by the user.

The operation region extraction unit 2020 detects the marker 3020 in a captured image by analyzing the captured image by using the marker information. The operation region extraction unit 2020 calculates a position of the detected marker 3020. Here, as a technique of detecting a predetermined object from the inside of an image, and calculating a position of the object in the image, various known techniques may be used.

Figure 6:
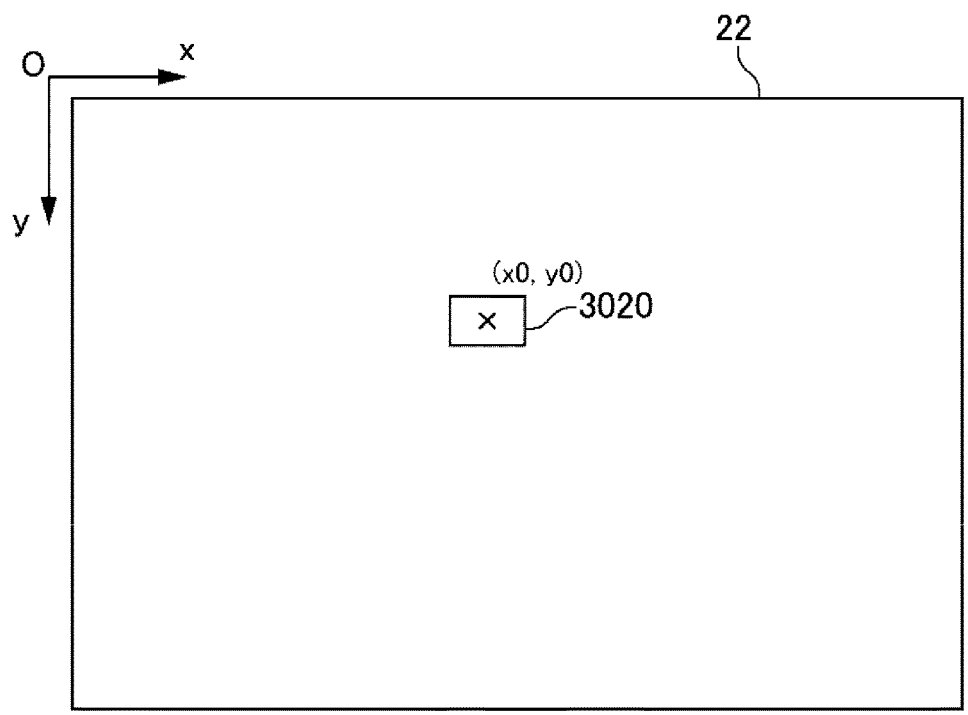
FIG. 6 is a diagram illustrating a position on a captured image.

Any method of indicating a position of the marker 3020 may be used. For example, a position of the marker 3020 is expressed by a position (coordinate) on a captured image. FIG. 6 is a diagram illustrating a position on a captured image. In FIG. 6, a captured image 22 is the captured image. A position on the captured image 22 is indicated by a coordinate defined in a coordinate system having an upper left end of the captured image 22 as the origin, a rightward direction of the captured image 22 as an x direction, and a downward direction of the captured image 22 as a y direction. However, a method of defining a position on the captured image 22 is not limited to the method of defining the position on the basis of the coordinate system illustrated in FIG. 6.

According to the method of calculating a position of the marker 3020 by analyzing a captured image, an input operation performed by the user is recognized by the information processing apparatus 2000 only in a case where the marker 3020 is included in an imaging range of the camera 20. In a case where the marker 3020 is not included in the imaging range of the camera 20, an input operation performed by the user is not recognized. Thus, the user can separate work using the information processing apparatus 2000 from other pieces of work on the basis of whether or not the marker 3020 is included in the imaging range of the camera 20. Consequently, it is possible to reduce a probability that an input operation may be wrongly detected by the information processing apparatus 2000.

For example, in a case where the finger 30 is moved in work of writing a document, the user causes the marker 3020 not to be included in the imaging range of the camera 20. In the above-described way, the information processing apparatus 2000 does not recognize an input operation.

In a case of using the method of calculating a position of the marker 3020 by analyzing a captured image, it is more preferable that the camera 20 is provided to capture an image in a view direction of the user (for example, the camera 20 in FIG. 4). In the above-described way, the user can easily perform an operation of causing the marker 3020 to enter the imaging range of the camera 20 or the marker 3020 to come out of the imaging range of the camera 20. In a case where the marker 3020 is desired to be included in the imaging range of the camera 20, the user may cause the marker 3020 to be included in a view of the user. On the other hand, in a case where the marker 3020 is desired not to be included in the imaging range of the camera 20, the user may cause the marker 3020 not to be included in the view of the user.

<<Calculation Through Detection of Sounds>>

The operation region extraction unit 2020 may calculate a position of the marker 3020 by using sounds emitted from the marker 3020. In this case, the marker 3020 is any sound source. Here, as a technique of calculating a position of a sound source on the basis of sounds emitted from the sound source, various known techniques may be used.

For example, three microphones are provided near the camera 20. The microphones detect sounds emitted from the marker 3020. The operation region extraction unit 2020 calculates a coordinate of the marker 3020 in a coordinate system defined by positions of the three microphones on the basis of differences among time points at which sounds emitted from the marker 3020 are respectively detected by the three microphones.

The operation region extraction unit 2020 converts a coordinate in the coordinate system defined by the positions of the three microphones into a coordinate in a coordinate system defined in a captured image by using a relationship between the positions of the microphones and a position of the camera 20, and information such as an angle of view of the camera 20. The operation region extraction unit 2020 calculates a position of the marker 3020 in a plane (the xy plane in FIG. 6) indicated by a captured image. Note that a known technique may be used as a method of converting a coordinate in a certain coordinate system into a coordinate in another coordinate system. Positions where the microphones and the camera 20 are provided may be determined such that a coordinate system defined by the positions of the microphones is equivalent or substantially equivalent to a coordinate system defined in a captured image. In the above-described way, the above-described coordinate conversion is not necessary.

Figure 7:
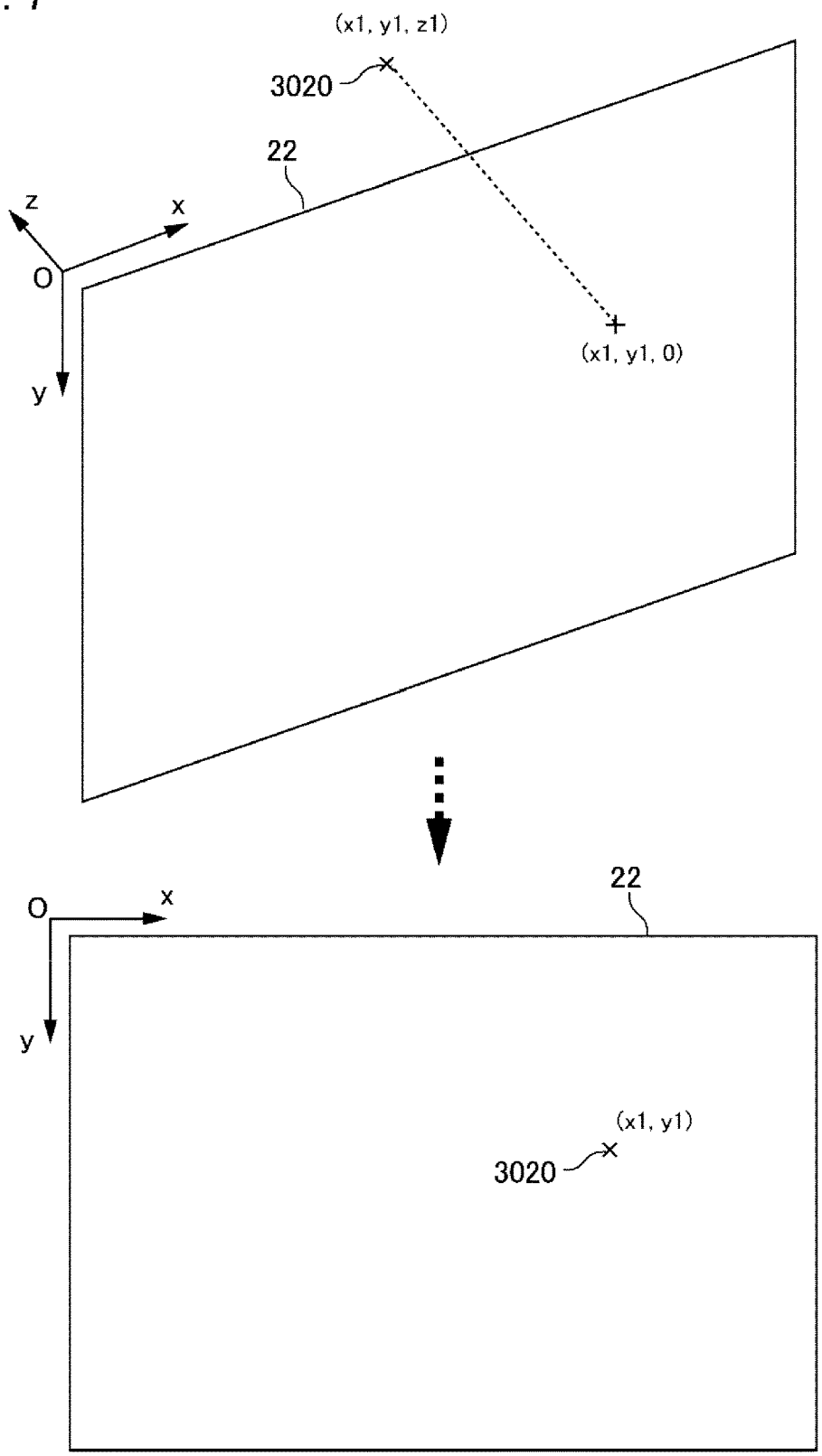
FIG. 7 is a diagram illustrating a position of a marker on a coordinate system in a captured image.

FIG. 7 is a diagram illustrating a position of the marker 3020 in a coordinate system in a captured image. In FIG. 7, a coordinate system in a captured image has an upper left end of the captured image as the origin, a rightward direction of the captured image as an x direction, a downward direction of the captured image as a y direction, and a plan view direction of the captured image as a z direction. A position of the marker 3020 in this coordinate system is (x1,y1,z1). The operation region extraction unit 2020 handles a coordinate (x1,y1) of the marker 3020 on the xy plane indicated by the captured image 22 as a position of the marker 3020 on the captured image 22.

According to the method of calculating a position of the marker 3020 on the basis of sounds, it is not necessary that the marker 3020 can be detected from a captured image. Thus, the marker 3020 may be provided at a position (for example, the inside of the device 10) not included in a captured image. The marker 3020 can be miniaturized. A resolution required for the camera 20 can be reduced.

<Method of Extracting Operation Region 40: S106>

The operation region extraction unit 2020 extracts the operation region 40 from the captured image on the basis of the calculated position of the marker 3020 on the captured image (S106). The operation region 40 is any region defined with a position of the marker 3020 as a reference. For example, the operation region 40 is a region defined in a predetermined shape having a position (for example, a central position) of the marker 3020 as a central position. The predetermined shape is any shape such as a circular shape or a rectangular shape.

Figure 8:
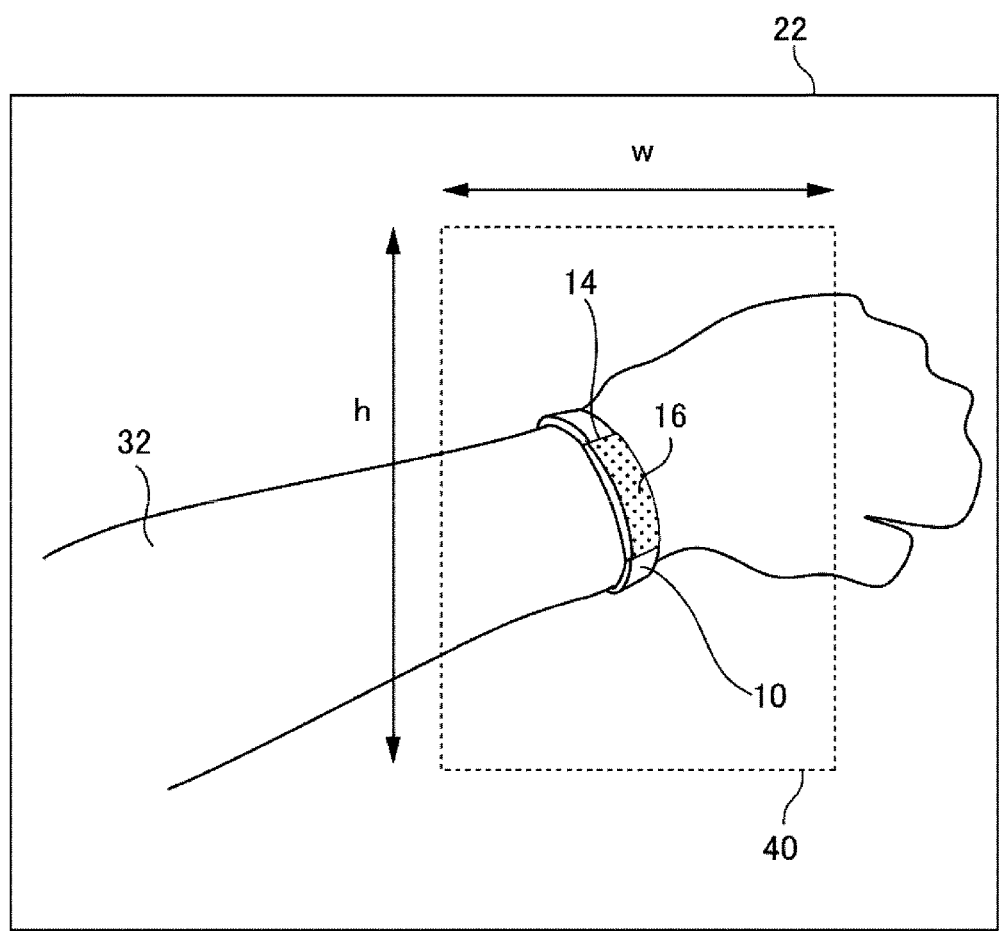
FIG. 8 is a diagram illustrating an operation region centering on a marker.

FIG. 8 is a diagram illustrating the operation region 40 centering on the marker 3020. In FIG. 8, the operation region 40 has a central position of the marker 3020 as a central position thereof, and has a rectangular shape the width of which is a predetermined length w, and the height of which is a predetermined length h.

However, a position defined by a position of the marker 3020 is not limited to a central position of the operation region 40. For example, a position such as an upper left end of the operation region 40 may be defined by a position of the marker 3020.

Figure 9:
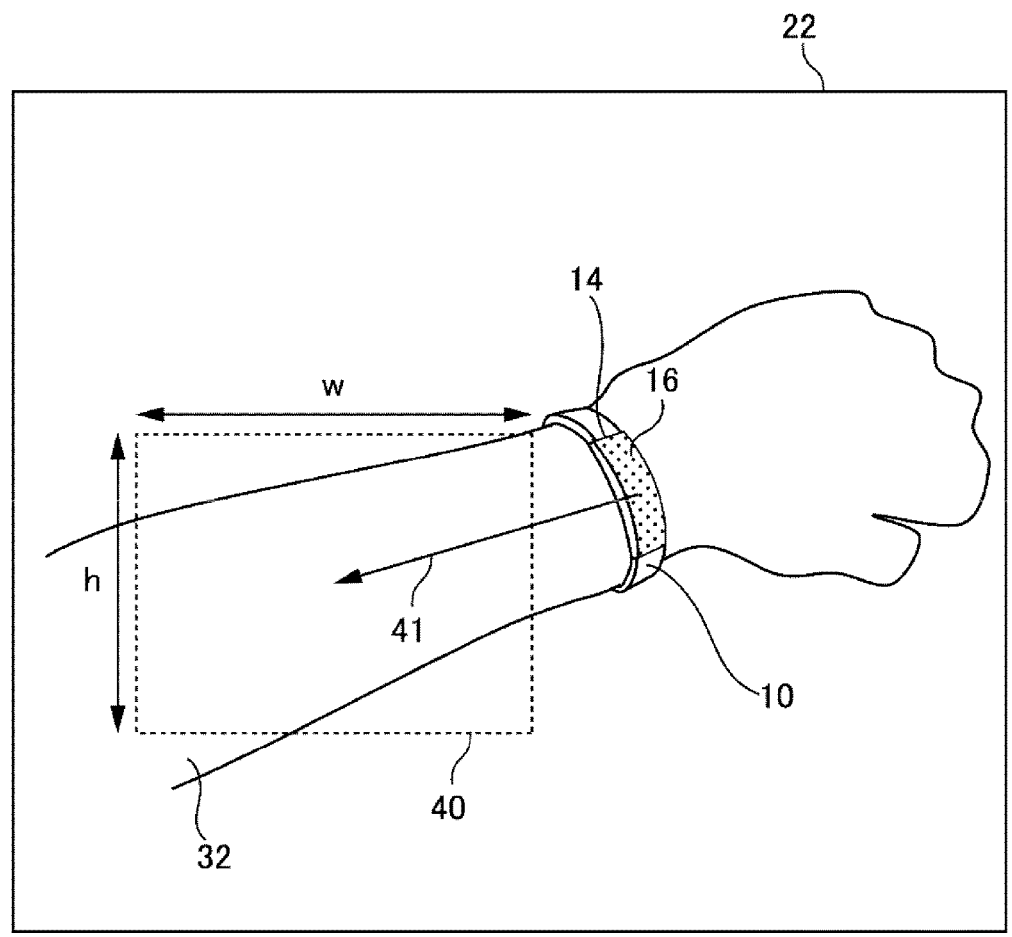
FIG. 9 is a diagram illustrating an operation region centering on a location separated from a marker.

For example, the operation region 40 may be a region the central position or the like of which is present at a location separated from a position of the marker 3020 in a predetermined direction by a predetermined distance. FIG. 9 is a diagram illustrating the operation region 40 having a location separated from the marker 3020 as a central position thereof. Also in FIG. 9, a shape of the operation region 40 is a rectangular shape the width of which is a predetermined length w, and the height of which is a predetermined length h. However, the central position of the operation region 40 in FIG. 9 is a position moved by a distance d in a direction defined by an arrow 41 from the marker 3020.

Note that, in FIGS. 8 and 9, the operation region 40 has a predetermined shape in a plane (the xy plane in FIG. 6) indicated by the captured image. However, the operation region 40 may have a predetermined shape in a plane other than the plane indicated by the captured image.

Figure 10:
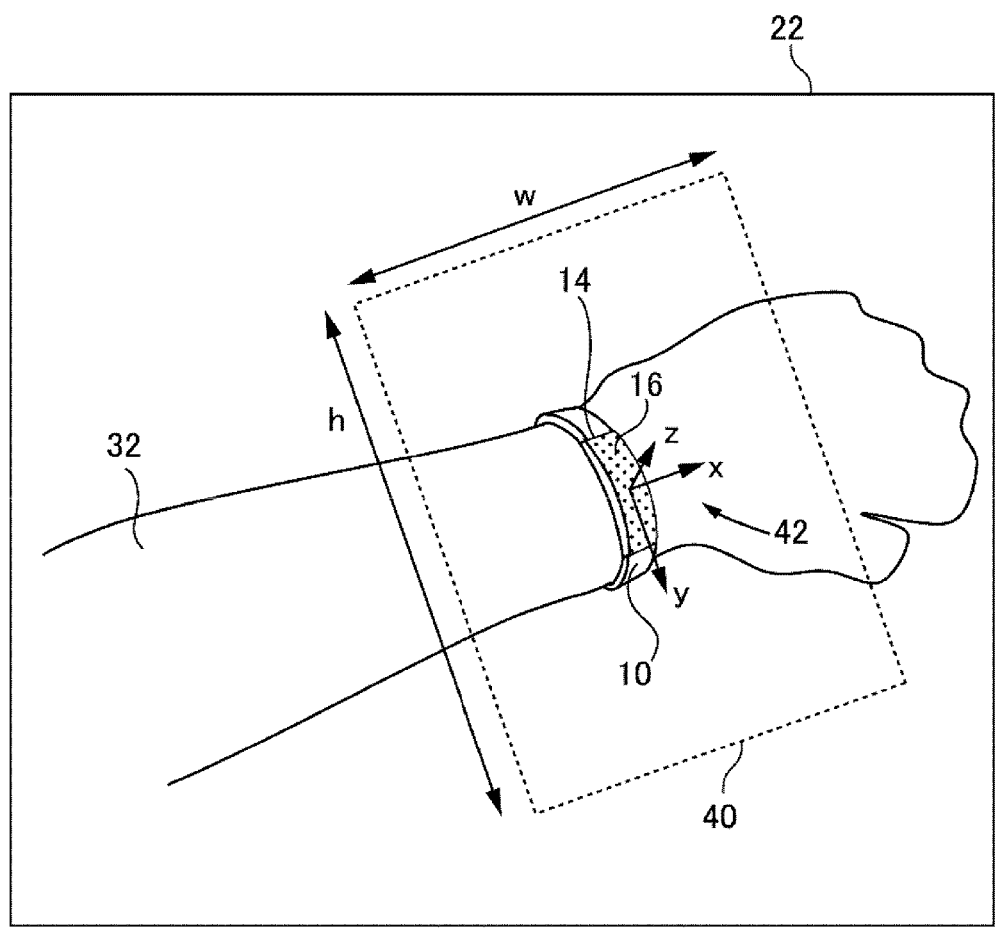
FIG. 10 is a first diagram illustrating a case where an operation region has a predetermined shape defined by a marker on an xy plane in a three-dimensional coordinate system.

For example, the operation region 40 may have a predetermined shape on a plane in a three-dimensional coordinate system defined by the marker 3020. FIG. 10 is a first diagram illustrating a case where the operation region 40 has a predetermined shape on the xy plane in a three-dimensional coordinate system defined by the marker 3020. In the same manner as the operation region 40 in FIG. 8, the operation region 40 in FIG. 10 has a central position of the marker 3020 as a central position thereof, and has a rectangular shape the width of which is a predetermined length w, and the height of which is a predetermined length h. However, in FIG. 10, the operation region 40 has the rectangular shape on the xy plane in a coordinate system 42 defined by the marker 3020. More specifically, the operation region 40 has the origin of the coordinate system 42 as a central position thereof, w as a length in an x axis direction of the coordinate system 42, and h as a length in a y axis direction of the coordinate system 42.

Figure 11:
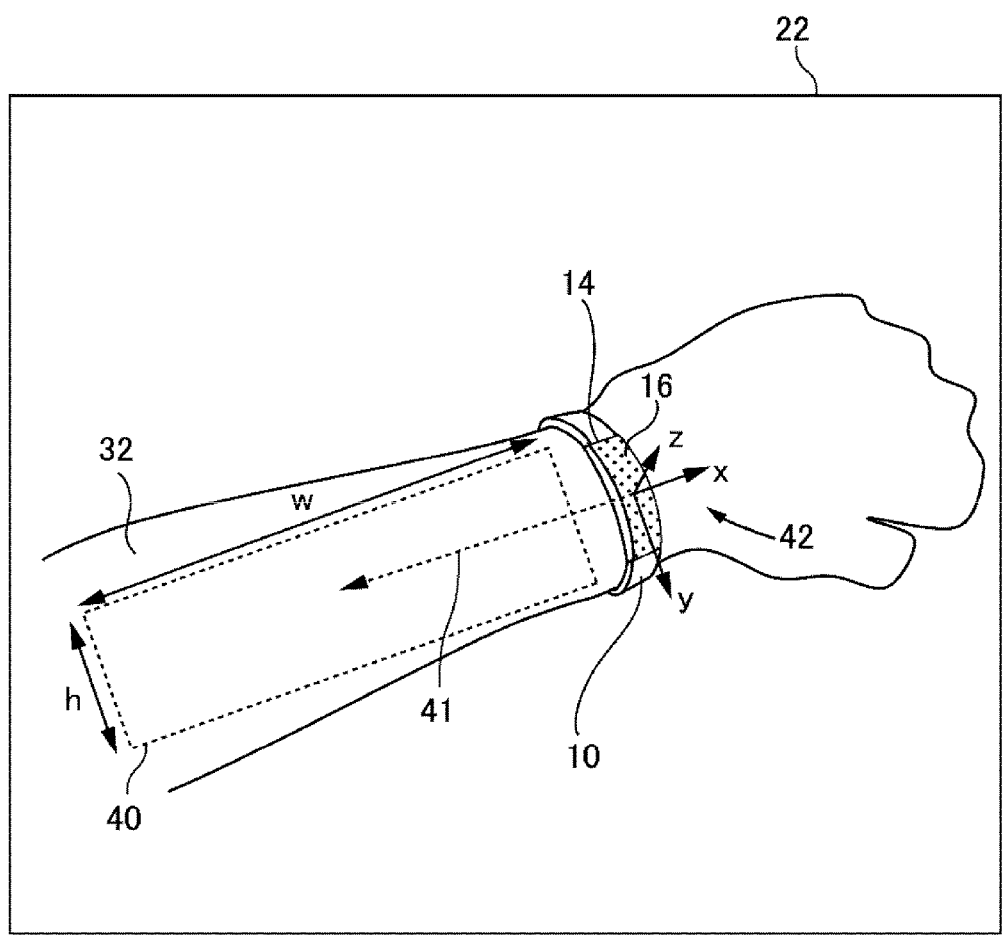
FIG. 11 is a second diagram illustrating a case where an operation region has a predetermined shape defined by a marker on an xy plane in a three-dimensional coordinate system.

FIG. 11 is a second diagram illustrating a case where the operation region 40 has a predetermined shape on the xy plane in a three-dimensional coordinate system defined by the marker 3020. In the same manner as the operation region 40 in FIG. 9, the operation region 40 in FIG. 11 has a location moved by the distance d in a direction defined by the arrow 41 from the marker 3020 as a central position thereof, and has a rectangular shape the width of which is a predetermined length w, and the height of which is a predetermined length h. However, in FIG. 11, the direction indicated by the arrow 41 is a direction in the coordinate system 42. The operation region 40 has w as a length in the x axis direction of the coordinate system 42, and h as a length in the y axis direction of the coordinate system 42.

Figure 12A:
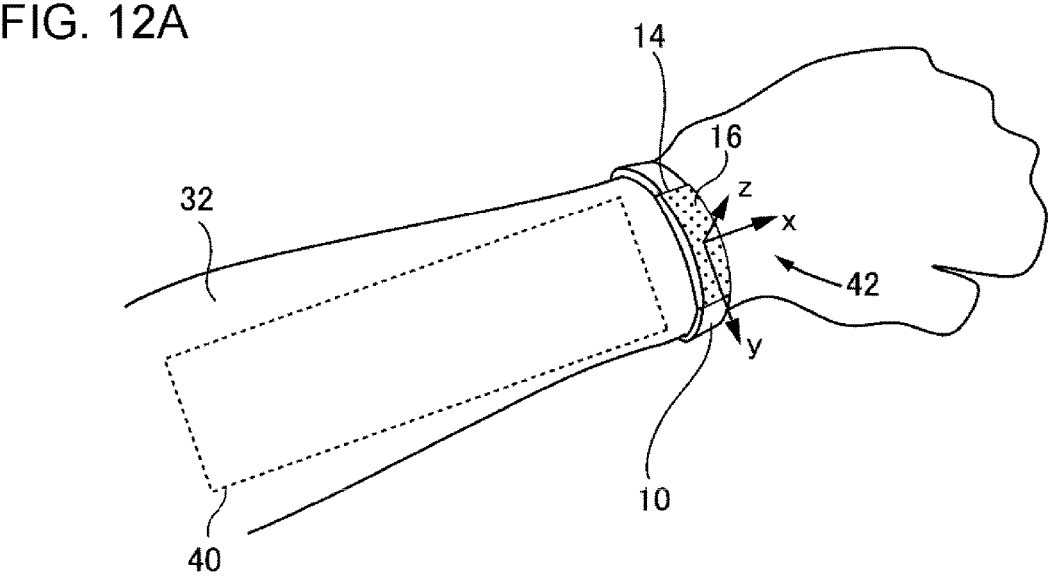
FIG. 12 is a diagram illustrating a scene in which a posture of an operation region changes in accordance with an inclination of a marker.
Figure 12B:
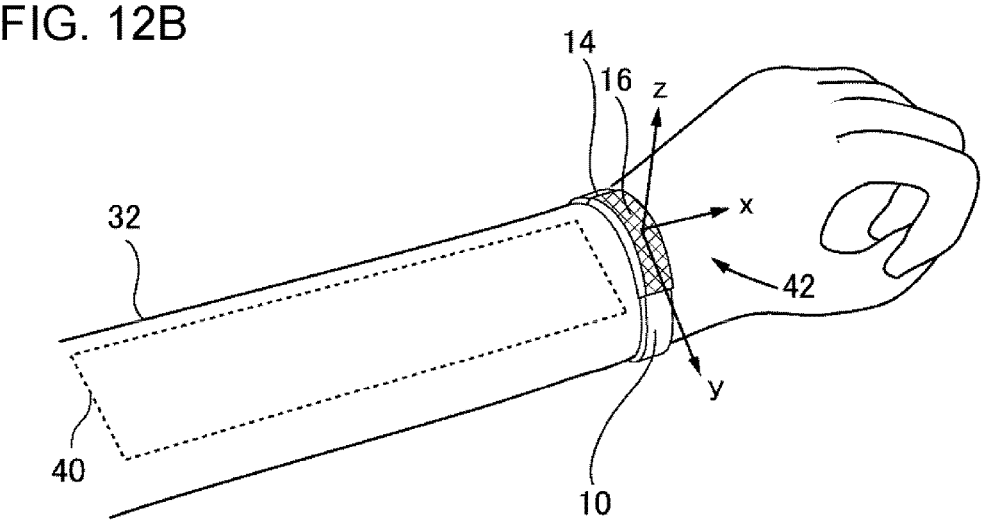

As mentioned above, the operation region 40 is extracted by using the coordinate system 42 defined by the marker 3020, and thus a posture of the operation region 40 tracks a change in a posture of the marker 3020. For example, as illustrated in FIG. 11, it is assumed that the operation region 40 is fixed to be located on the arm of the user. In this case, if the user twists the wrist on which the device 10 is provided, a posture of the operation region 40 changes in accordance with the twisting. FIG. 12 is a diagram illustrating a scene in which a posture of the operation region 40 changes in accordance with an inclination of the marker 3020.

As mentioned above, if a posture of the operation region 40 changes in accordance with a change in a posture of the marker 3020, the operation region 40 is stuck to a constant location. For example, in FIG. 12, the operation region 40 is stuck to the arm of the user at a constant location at all times. Therefore, the same location on the arm is always the operation region 40 from the user's point of view. Consequently, the user can more intuitively perform an input operation using the information processing apparatus 2000.

Note that information indicating the predetermined shape or information indicating a location (for example, information regarding the arrow 41) used as the center of the marker 3020 may be set in the operation region extraction unit 2020 in advance, may be stored in a storage device which can be accessed from the operation region extraction unit 2020, or may be set by the user. In a case where the coordinate system 42 of the marker 3020 is used, the marker 3020 is a marker (for example, an AR marker) which can be used for determination of a three-dimensional coordinate.

A size (the above-described width w or the height h) of the operation region 40 may be defined in an absolute value (for example, the number of pixels), or may be defined in a relative value. In the latter case, for example, a size of the operation region 40 is indicated by a relative value for a size of a captured image. The relative value for a size of a captured image is, for example, a relative value with a width or a height of the captured image as 1. For example, a size of the operation region 40 may be indicated by a relative value for a size of the marker 3020. The relative value for a size of the marker 3020 is, for example, a relative value with a width, a height, a diagonal line, or a diameter of the marker 3020 as 1. In a case where a size of the operation region 40 is defined in the relative value for a size of the marker 3020, the operation region 40 increases if the marker 3020 comes close to the camera 20, and the operation region 40 is reduced if the marker 3020 becomes distant from the camera 20.

Figure 13:
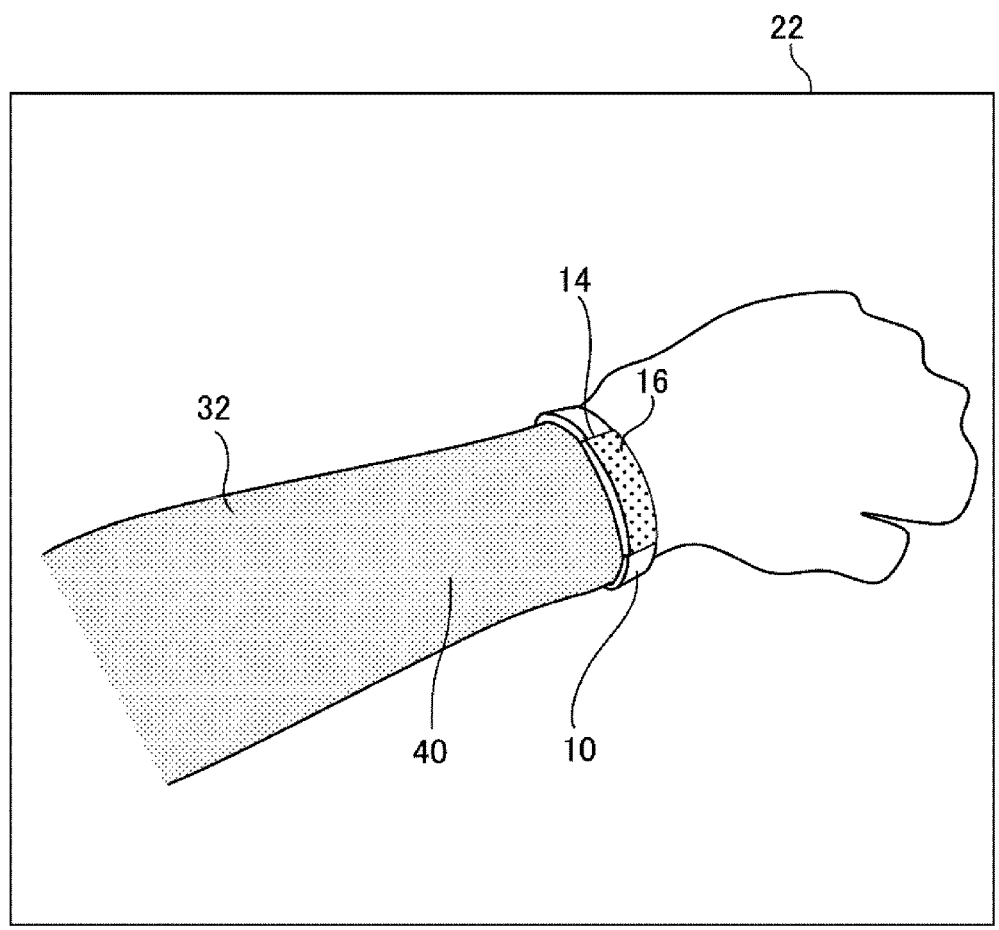
FIG. 13 is a diagram illustrating a case where an operation region is a user's arm.

The operation region extraction unit 2020 may extract a predetermined region included in a captured image as the operation region 40. For example, the operation region extraction unit 2020 extracts the arm of the arm portion of the user on which the marker 3020 is provided, as the operation region 40. FIG. 13 is a diagram illustrating a case where the operation region 40 is the user's arm. In FIG. 13, the arm 32 is the operation region 40.

The operation region extraction unit 2020 uses the marker 3020 for detection of the arm of the user. For example, the operation region extraction unit 2020 extracts a region (for example, a flesh-colored region) indicating the arm portion of the user from the captured image 22. The operation region extraction unit 2020 distinguishes the hand and the arm of the user from each other by handling the marker 3020 as a boundary in the region. In a case of FIG. 13, the marker 3020 (marker image 16) is provided on the left wrist of the user. Thus, in the region indicating the arm portion of the user, a region present on the left of the marker image 16 is the arm, and a region present on the right of the marker image 16 is the hand. For example, in a case where the user's arm is used as the operation region 40, the operation region extraction unit 2020 extracts the region present on the left of the marker image 16 as the operation region 40 in the region indicating the arm portion of the user (refer to FIG. 13).

Note that a positional relationship (which side is the arm and which side is the hand) of the arm and the hand with the marker 3020 as a boundary differs depending on the arm portion on which the marker 3020 is provided. For example, the operation region extraction unit 2020 recognizes on which arm portion the marker 3020 is provided by using information indicating on which arm portion the marker 3020 is provided. The information may be set in the operation region extraction unit 2020 in advance, may be stored in a storage device which can be accessed from the operation region extraction unit 2020, or may be set by the user. For example, the operation region extraction unit 2020 may divide a region indicating the arm portion of the user into two regions with the marker 3020 as a boundary, or may recognize a wider region of the separate regions as a region indicating the arm.

Note that the operation region extraction unit 2020 may extract the hand as the operation region 40 instead of the arm.

A preferable location as the operation region 40 extracted by the operation region extraction unit 2020 may be, for example, a region included in the arm or the hand of the user. A person's arm or hand has a monotonous color or pattern compared with general scenery. Therefore, a region included in the person's arm or hand is used as the operation region 40, and thus a color or a shape of the background of an operation body is monotonous. Thus, the recognition unit 2040 can easily detect the operation body.

Here, with respect to the person's hand or arm, a bare skin is not required to be viewed, and a glove or a long sleeve may be worn. Generally, a pattern of gloves or clothes has a monotonous color or shape compared with surrounding scenery. Thus, similarly, an operation body can be easily detected in a case where a pattern of gloves or clothes is the background of the operation body.

Note that a person's arm or hand is an example of a preferable location as the operation region 40, and the operation region 40 is not limited to a region included in the person's arm or hand.

<Operation Body>

There are various objects handled as an operation body by the recognition unit 2040. For example, the recognition unit 2040 handles a part (for example, the finger) of the user's arm portion or an object (for example, a pen) held by the user's arm portion as an operation body. In this case, the user performs an input operation by moving the finger or the pen within an imaging range of the camera 20.

For example, the recognition unit 2040 may handle a marker attached to an object or the user's body as an operation body. For example, the marker is attached to the user's body (for example, the finger). For example, the marker is attached to an object (for example, a pen) held by the user. For example, the marker is attached to an object attached to the user. The object attached to the user is, for example, a ring attached to the finger of the user.

Note that, in a case where the operation region extraction unit 2020 calculates a position of the marker 3020 by analyzing a captured image, an object handled as a marker handled as an operation body and an object handled as the marker 3020 are respectively defined such that the marker handled as an operation body can be distinguished from the marker 3020 on a captured image (in terms of appearances). For example, in an object handled as the marker handled as an operation body and an object handled as the marker 3020, shapes, colors, or patterns are made different from each other.

Information indicating an object handled as an operation body by the recognition unit 2040 may be set in the recognition unit 2040 in advance, may be stored in a storage device which can be accessed from the recognition unit 2040, or may be set by the user.

Note that a single object or a plurality of objects may be handled as an operation body by the recognition unit 2040.

A preferable location as the operation region 40 extracted by the operation region extraction unit 2020 may be, for example, a region included in the arm or the hand of the user. A person's arm or hand has a monotonous color or shape compared with general scenery. Therefore, a region included in the person's arm or hand is used as the operation region 40, and thus a color or a shape of the background of an operation body is monotonous. Thus, the recognition unit 2040 can easily detect the operation body.

Here, with respect to the person's hand or arm, a bare skin is not required to be viewed, and a glove or a long sleeve may be worn. Generally, a pattern of gloves or clothes has a monotonous color or shape compared with surrounding scenery. Thus, similarly, an operation body can be easily detected in a case where a pattern of gloves or clothes is the background of the operation body.

Note that a person's arm or hand is an example of a preferable location as the operation region 40, and the operation region 40 is not limited to a region included in the person's arm or hand.

<Method of Calculating Position of Operation Body: S108>

The recognition unit 2040 detects an operation body from the operation region 40, and calculates a position of the operation body (S108). Here, a known technique may be used as a technique of detecting a predetermined object included in a predetermined region of an image.

There are various methods of the recognition unit 2040 defining a position of an operation body. For example, the recognition unit 2040 calculates a region indicating an operation body in the operation region 40. The recognition unit 2040 handles a point included in the calculated region as a position of the operation body. In this case, a position of the operation body may be any point included in the region indicating the operation body.

For example, in a case where the operation body is a part of the user's body or an object held by the user, the recognition unit 2040 calculates the center of the region indicating the operation body. The recognition unit 2040 handles a point which is included in the region indicating the operation body and is farthest from the center of the region as a position of the operation body. According to this method, for example, a fingertip or a pentip is a position of the operation body.

Figure 14:
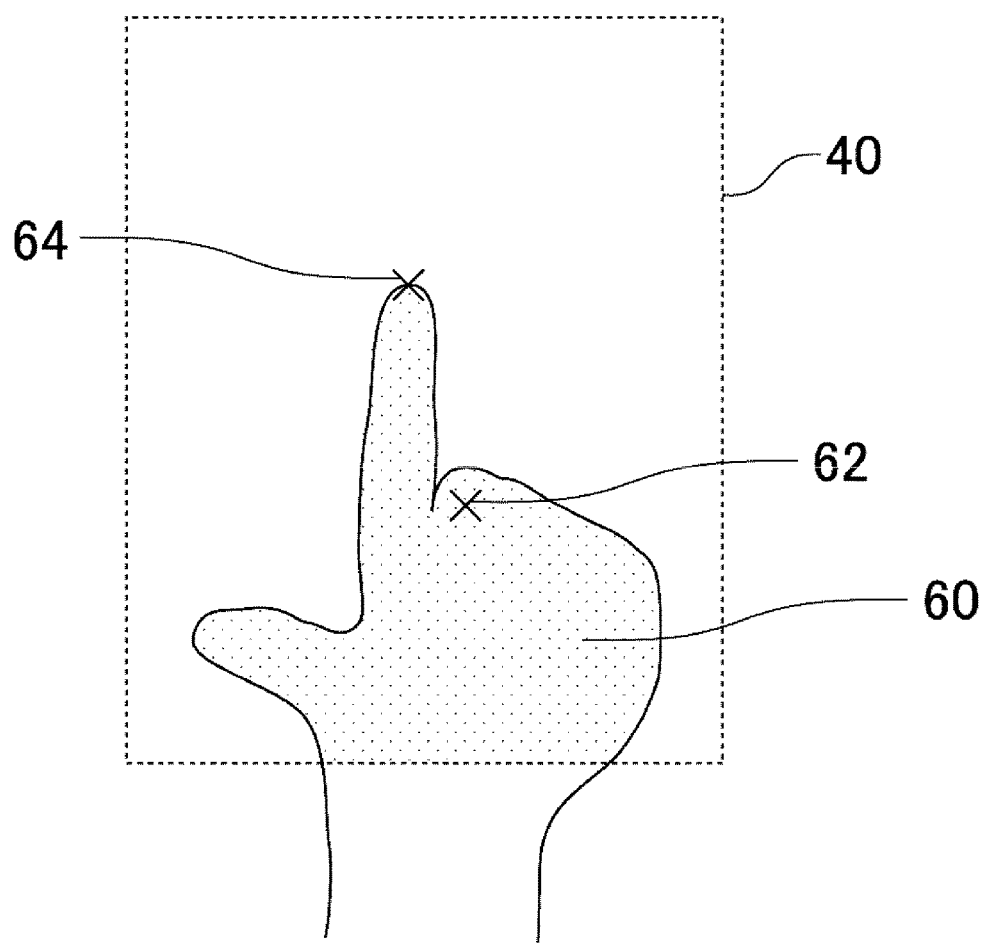
FIG. 14 is a first diagram illustrating a method of defining a position of an operation body.

FIG. 14 is a first diagram illustrating a method of defining a position of the operation body. In FIG. 14, the operation body is the user's hand. First, the recognition unit 2040 determines a region 60 indicating the user's hand in the operation region 40. Next, the recognition unit 2040 calculates the center 62 of the region 60. The recognition unit 2040 handles a point 64 which is included in the region 60 and is farthest from the center 62 as a position of the operation body. In a case where there are a plurality of points farthest from the center 62 in the region 60, for example, the recognition unit 2040 handles a point farthest from the marker 3020 among the plurality of points as a position of the operation body.

Here, for example, as in a case where an input operation is performed with a finger cushion, there is a case where a location slightly deviated from a fingertip is preferably handled as a position of the operation body. Therefore, the recognition unit 2040 may calculate the point 64 farthest from the center of the operation body, or may set a position (for example, a position deviated by a predetermined distance in a direction of coming close to the marker 3020) slightly deviated from the point as a position of the operation body. Information indicating a positional relationship between the point 64 farthest from the center of the operation body and a position of the operation body may be set in the recognition unit 2040 in advance, may be stored in a storage device which can be accessed from the recognition unit 2040, or may be set by the user.

In a case where the operation body is a marker attached to an object or the user's body, for example, the recognition unit 2040 determines a region indicating the marker from a captured image, and handles a central position or the like of the region as a position of the operation body.

The recognition unit 2040 is assumed to detect the operation body by using a reference image indicating an object to be detected as the operation body. In this case, a position of the operation body may be defined in advance in this reference image. The recognition unit 2040 determines a region similar to the reference image in the operation region 40. The recognition unit 2040 determines a point corresponding to the position of the operation body defined in the reference image in the region, and handles the point as a position of the operation body.

Figure 15:
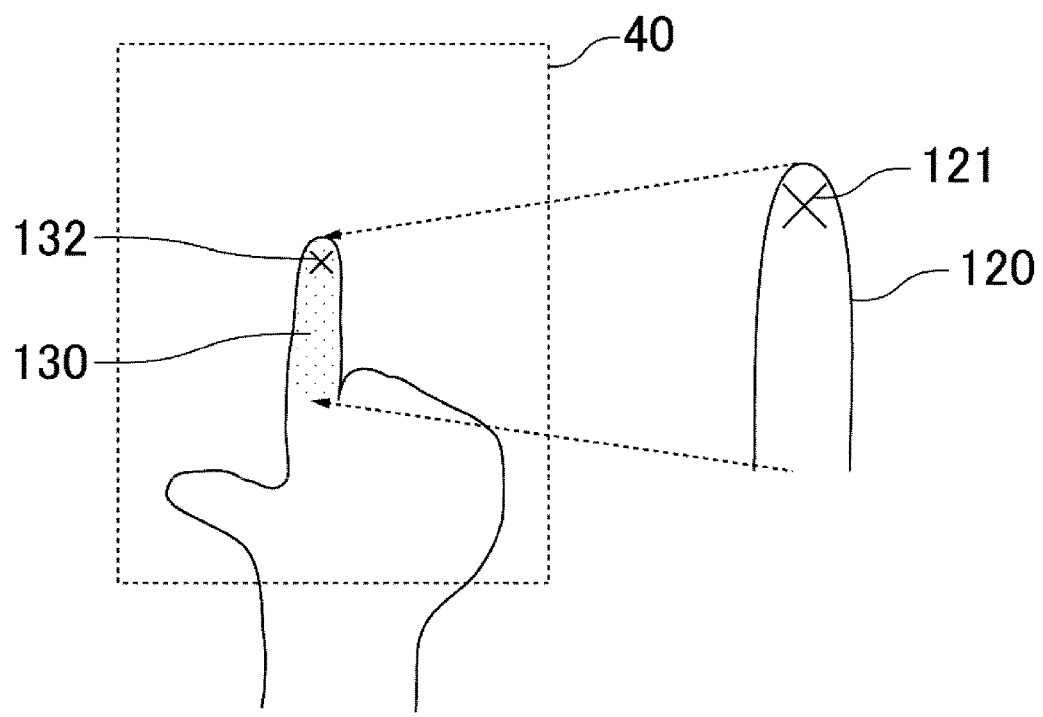
FIG. 15 is a second diagram illustrating a method of defining a position of an operation body.

FIG. 15 is a second diagram illustrating a method of defining a position of the operation body. In this example, the operation body is the user's finger. A reference image 120 is a reference image indicating a shape or the like of the user's finger. A position 121 of the operation body is a position of the operation body defined in the reference image in advance.

The recognition unit 2040 determines a region 130 similar to the reference image 120 in the operation region 40. The region 130 indicates the user's finger. The recognition unit 2040 determines a point 131 corresponding to the position 121 of the operation body when the reference image 120 is mapped onto the region 130. The recognition unit 2040 handles the point 131 as a position of the operation body.

Information regarding a method of the recognition unit 2040 defining a position of the operation body may be set in the recognition unit 2040 in advance, may be stored in a storage device which can be accessed from the recognition unit 2040, or may be set by the user.

<Method of Calculating Motion of Operation Body: S108>

The recognition unit 2040 detects an operation body from the operation region 40 on a captured image, and calculates motion of the operation body. The recognition unit 2040 may calculate motion of the operation body by using a plurality of captured images, or may calculate motion of the operation body by using a single captured image. In the former case, for example, the recognition unit 2040 performs image analysis on each of the plurality of captured images so as to calculate a position of the operation body in each captured image. The recognition unit 2040 uses information indicating a change in a position of the operation body as information indicating motion of the operation body. The information indicating a change in a position of the operation body is, for example, information in which positions of the operation body are arranged in a time series.

As described above, the recognition unit 2040 may calculate motion of the operation body by using a single captured image. In a case where the operation body is moving, the blurring operation body is often included in a single captured image. Therefore, the recognition unit 2040 calculates motion of the operation body from a single captured image including the blurring operation body.

Figure 16:
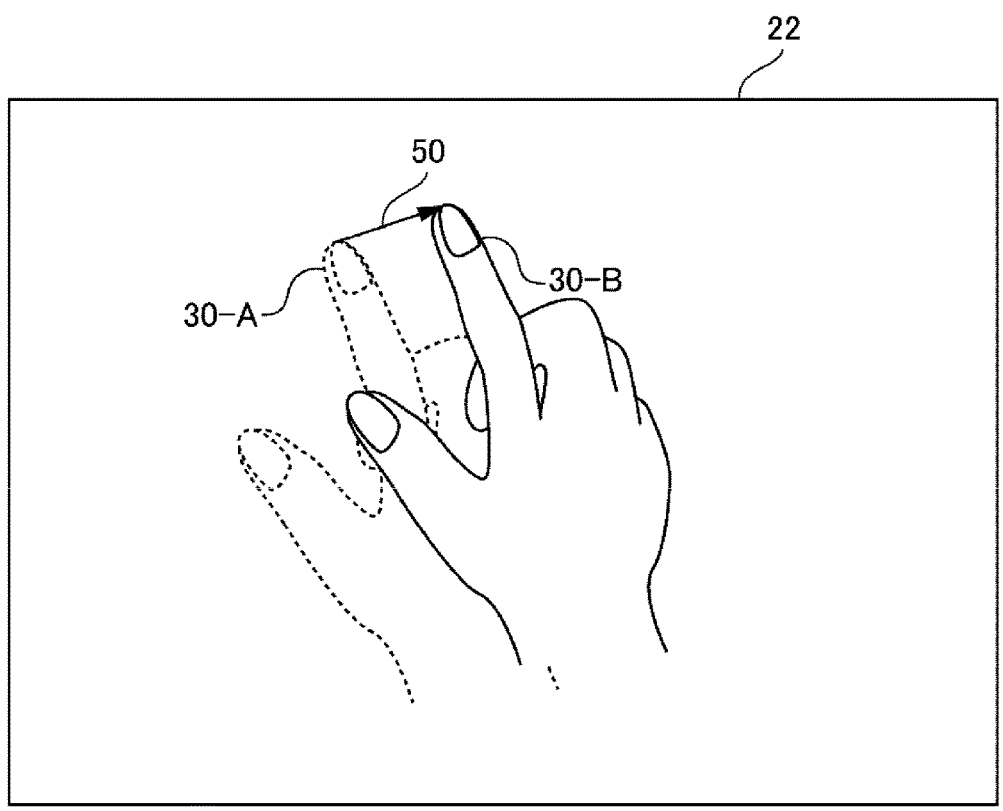
FIG. 16 is a diagram illustrating a captured image including a shaken finger of a user.

FIG. 16 is a diagram illustrating the captured image 22 including the blurring finger of the user. In the captured image 22, the finger 30 of the user blurs so that it moves from the finger 30-A to the finger 30-B. The recognition unit 2040 calculates changes in positions of a feature point common to the finger 30-A and the finger 30-B as motion of the operation body. For example, the recognition unit 2040 calculates motion 50 defined by changes in position of a fingertip of the finger 30-A and a fingertip of the finger 30-B.

<Input Operation Recognized by Recognition Unit 2040: S112>

The recognition unit 2040 recognizes an input operation on the basis of the calculated position or motion of the operation body (S112). The recognition unit 2040 may recognize various input operations defined on the basis of a position or motion of the operation body. Hereinafter, a description will be made of various input operations which can be recognized by the recognition unit 2040.

<<Input Operation Defined on the Basis of Position of Operation Body>>

There are various input operations recognized on the basis of a position of the operation body by the recognition unit 2040. For example, the recognition unit 2040 receives an input operation (hereinafter, a selection operation) of selecting one option from among a plurality of options on the basis of a position of the operation body. For example, the selection operation includes an operation of selecting YES or NO.

For example, the recognition unit 2040 recognizes an operation of selecting a first option in a case where the operation body is located in a left half portion of the operation region 40, and recognizes an operation of selecting a second option in a case where the operation body is located in a right half portion of the operation region 40.

Figure 17A:
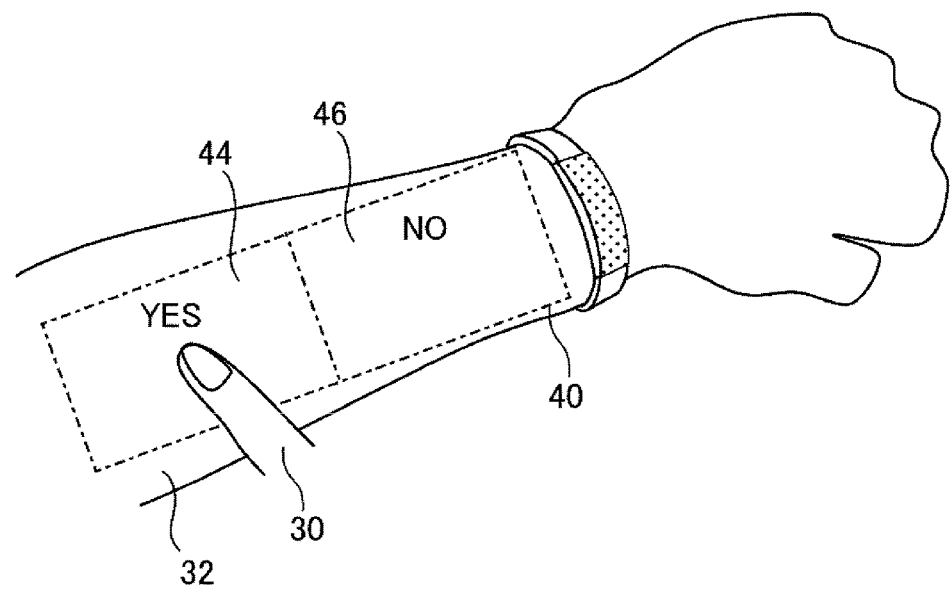
FIG. 17 are diagrams illustrating an operation defined on the basis of a position of an operation body.
Figure 17B:
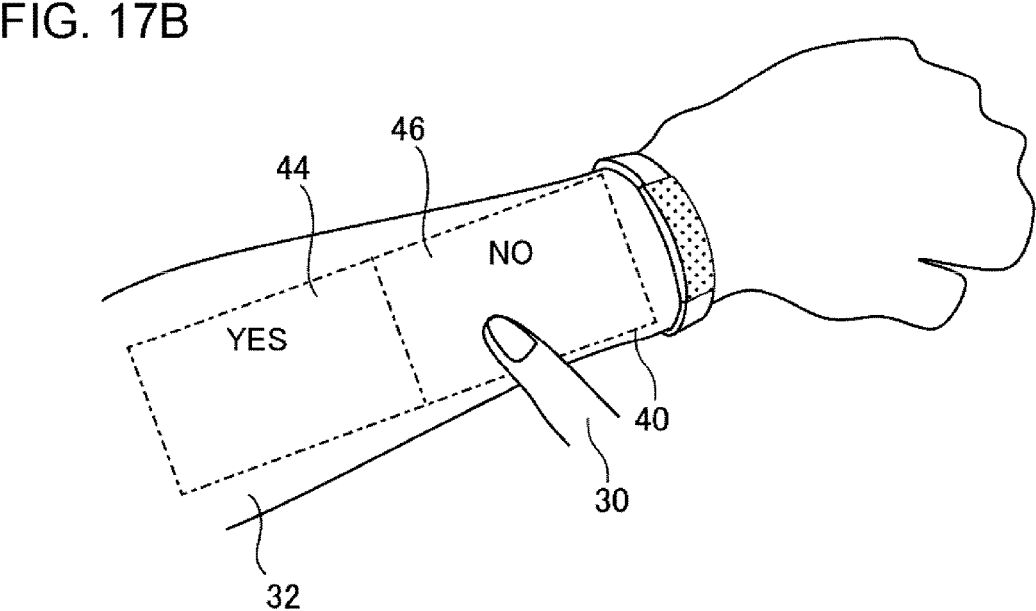

FIG. 17 are diagrams illustrating an operation defined on the basis of a position of the operation body. In FIG. 17, the operation body is the finger 30. A region 44 is a left half portion of the operation region 40, and is a region for selecting YES. A region 46 is a right half portion of the operation region 40, and is a region for selecting NO. Thus, as illustrated in FIG. 17A, if the finger 30 is located in the region 44, the recognition unit 2040 recognizes a selection operation of selecting YES. On the other hand, as illustrated in FIG. 17B, if the finger 30 is located in the region 46, the recognition unit 2040 recognizes a selection operation of selecting NO.

Here, the operation region 40 is displayed in FIG. 17 for convenience, but the operation region 40 may not necessarily be displayed. In a case where the operation region 40 is displayed, the information processing system 3000 includes a display device 3040 described in an example embodiment which will be described later. A display method for the operation region 40 using the display device 3040 will be described in an example embodiment which will be described later.

In a case where the operation region 40 is not displayed, for example, the information processing system 3000 may output an input operation to be performed or a result of an input operation to the user as voices. In this case, the information processing system 3000 includes a speaker or the like outputting voices. For example, in the example illustrated in FIG. 14, the information processing system 3000 outputs a voice guidance that "If YES is to be selected, locate the finger on the left, and if NO is to be selected, locate the finger on the right". For example, in a case where the user locates the finger 30 in the left half portion, and the recognition unit 2040 recognizes the input operation, the information processing system 3000 outputs a voice guidance that "YES is selected".

Note that, as illustrated in FIG. 17, a method of dividing the operation region 40 is not limited to a method of dividing the operation region into two portions such as left and right portions. For example, the recognition unit 2040 may divide the operation region 40 into two portions such as upper and lower portions, or may divide the operation region 40 into four portions such as upper, lower, right and left portions.

An input operation recognized by the recognition unit 2040 on the basis of a position of the operation body is not limited to a selection operation. Other examples of input operations recognized on the basis of a position of the operation body will be described in an example embodiment which will be described later.

<<Input Operation Defined on the Basis of Motion of Operation Body>>

The recognition unit 2040 1) may recognize an input operation of inputting a shape based on calculated motion of the operation body, and 2) may recognize a predetermined input operation corresponding to calculated motion of the operation body. Hereinafter, each thereof will be described.

<<Case of Recognizing Input Operation of Inputting Shape Based on Motion of Operation Body>>

Figure 18A:
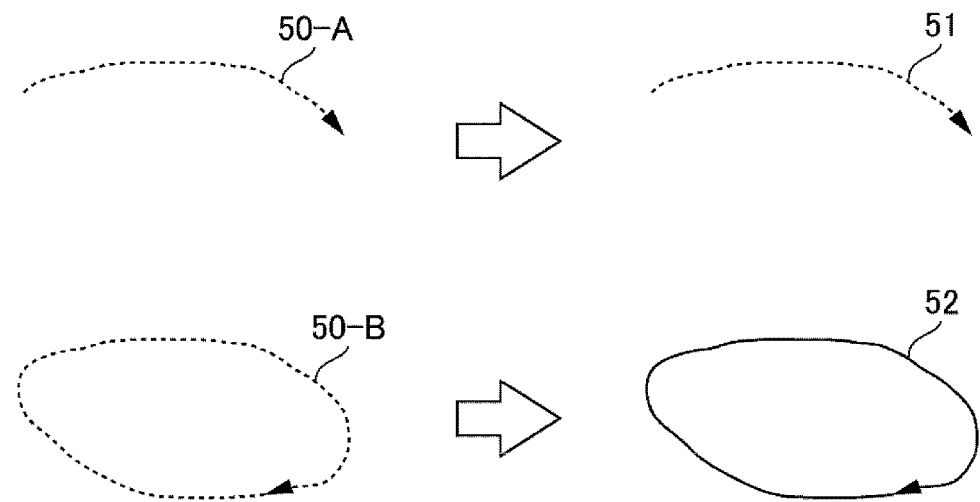
FIG. 18 are diagrams illustrating a case where an input operation of inputting a shape defined by motion of an operation body is recognized.

FIG. 18 are diagrams illustrating a case of recognizing an input operation of inputting a shape defined by motion of the operation body. In FIG. 18A, the recognition unit 2040 recognizes an input operation of inputting a shape 51 indicated by motion 50-A of the marker or a shape 52 indicated by motion 50-B. For example, this input operation is used to perform handwriting.

Figure 18B:
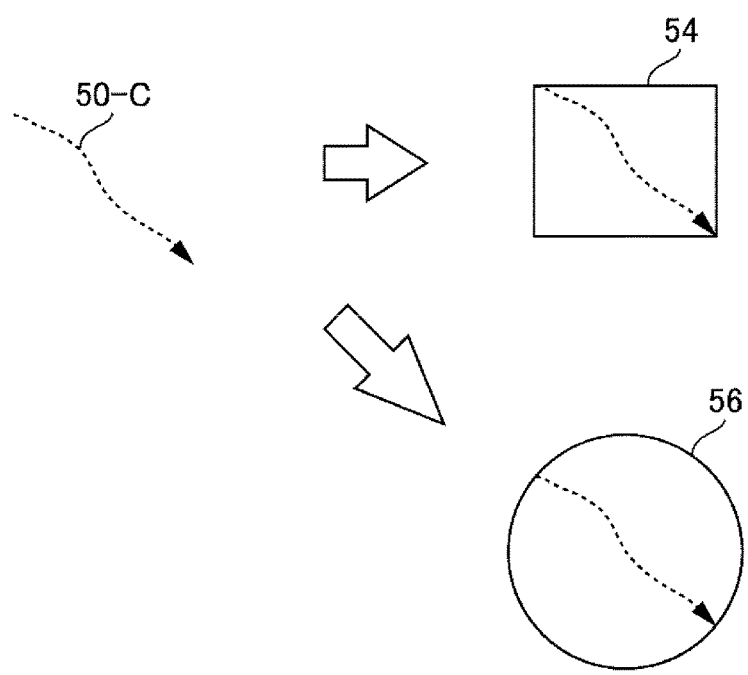

In FIG. 18B, the recognition unit 2040 recognizes an input operation of inputting a shape which is different from motion of the operation body, but a shape the shape and the size of which are defined by motion of the operation body. Specifically, the recognition unit 2040 recognizes an input operation of inputting a rectangular shape 54 having both ends of motion 50-C as both ends of a diagonal line or a circular shape 56 having both ends of motion 50-C as both ends of a diameter. For example, this input operation is used for the user to perform input (a selection operation or the like) indicating a certain range or to draw a predetermined graphic.

Information indicating which one of the method illustrated in FIG. 18A and the method illustrated in FIG. 18B is used may be set in the recognition unit 2040 in advance, may be stored in a storage device which can be accessed from the recognition unit 2040, or may be set by the user.

<<Case where Predetermined Input Operation Corresponding to Motion of Operation Body is Recognized>>

Figure 19A:
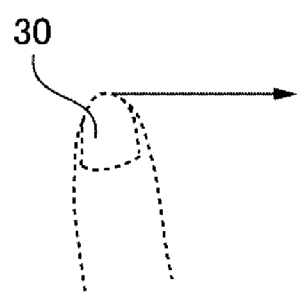
FIG. 19 are diagrams illustrating gesture input.
Figure 19B:
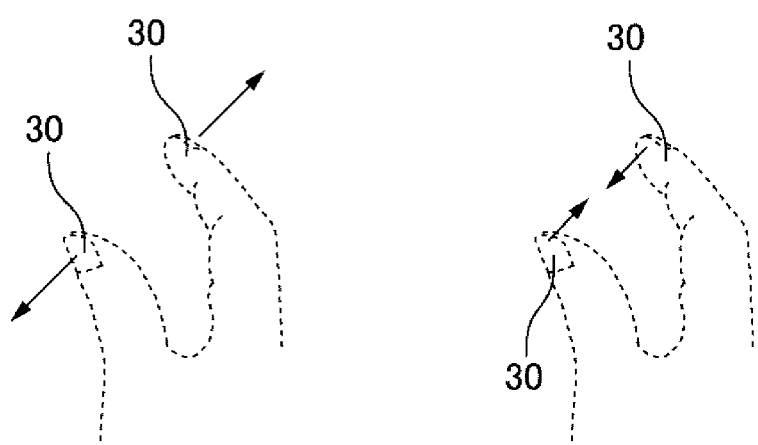

A predetermined input operation corresponding to calculated motion of the operation body is an input operation based on so-called gesture input. FIG. 19 are diagrams illustrating gesture input. FIG. 19A illustrates a flick action, and FIG. 19B illustrates a pinch-in/pinch-out action. Note that the arrows indicate motion of the operation body.

Information in which motion of the operation body is correlated with a predetermined input operation corresponding to the motion may be set in the recognition unit 2040 in advance, may be stored in advance in a storage device which can be accessed from the recognition unit 2040, or may be set by the user.

<<Handling of Location where Action of Moving Operation Body is Performed>>

The recognition unit 2040 1) may recognize only motion of the operation body as input regardless of a position where an action of moving the operation body is performed, and 2) may recognize a combination of motion of the operation body and a position where an action of moving the operation body is performed as input. In the former case, even if an action of moving the operation body is performed at any location on a captured image, the same motion of the operation body indicates the same input. On the other hand, in the latter case, a location where an action of moving the operation body is performed on the captured image has a meaning. For example, in a case where the user performs input of surrounding a specific object included in a captured image with a circle, not only a shape such as the circle but also what is surrounded by the circle has a meaning.

In a case of 1), for example, as described above, the recognition unit 2040 recognizes a shape defined by motion of the operation body calculated by the recognition unit 2040 or a gesture defined by motion of the operation body as input. For example, the recognition unit 2040 may recognize transition in a relative coordinate of the operation body with a start point of motion of the operation body as a reference, as input.

On the other hand, in a case of 2), the recognition unit 2040 recognizes transition in a coordinate of the operation body on a captured image, calculated by the recognition unit 2040, as input. However, also in the case of 1), in the same manner as in the case of 2), the recognition unit 2040 may recognize transition in a coordinate of the operation body on a captured image, as input.

A method of 1) and 2) in which the recognition unit 2040 recognizes input may be set in the recognition unit 2040 in advance, may be stored in a storage device which can be accessed from the recognition unit 2040, or may be set by the user.

<Method of Indicating Position or Motion of Operation Body>

Any method of indicating a position or motion of the operation body recognized by the recognition unit 2040 may be used. For example, the recognition unit 2040 indicates a position or motion of the operation body by using a relative position or motion in the operation region 40.

FIG. 20 are diagrams illustrating a scene in which a position or motion of the operation body is indicated by a relative position or motion in the operation region 40. In FIG. 20, the operation region 40 is indicated by a rectangular shape.

Figure 20A:
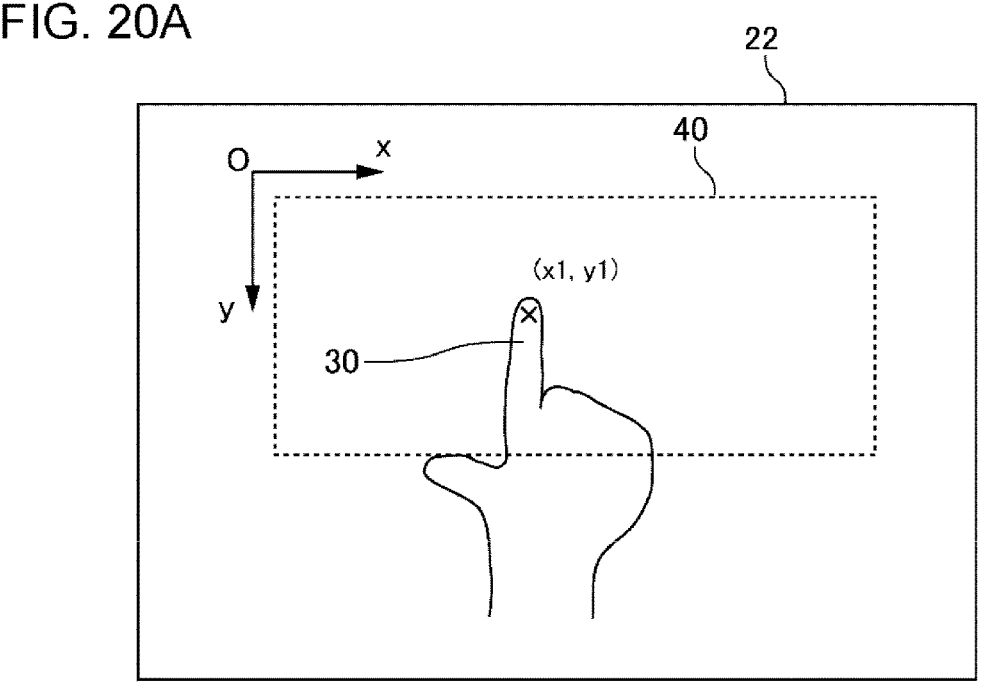
FIG. 20 are diagrams illustrating a scene in which a position or motion of an operation body is indicated by a relative position or motion in an operation region.

FIG. 20A illustrates a case where a position of the operation body is recognized as an input operation. In FIG. 20A, a coordinate (x1,y1) which is a position of the operation body is a coordinate in a coordinate system having an upper left end of the operation region 40 as the origin, a rightward direction in a plan view of the operation region 40 as an x direction, and a downward direction in a plan view of the operation region 40 as a y direction. Note that a relative position in the operation region 40 may be indicated by a coordinate in the coordinate system 42 defined by the marker 3020.

Figure 20B:
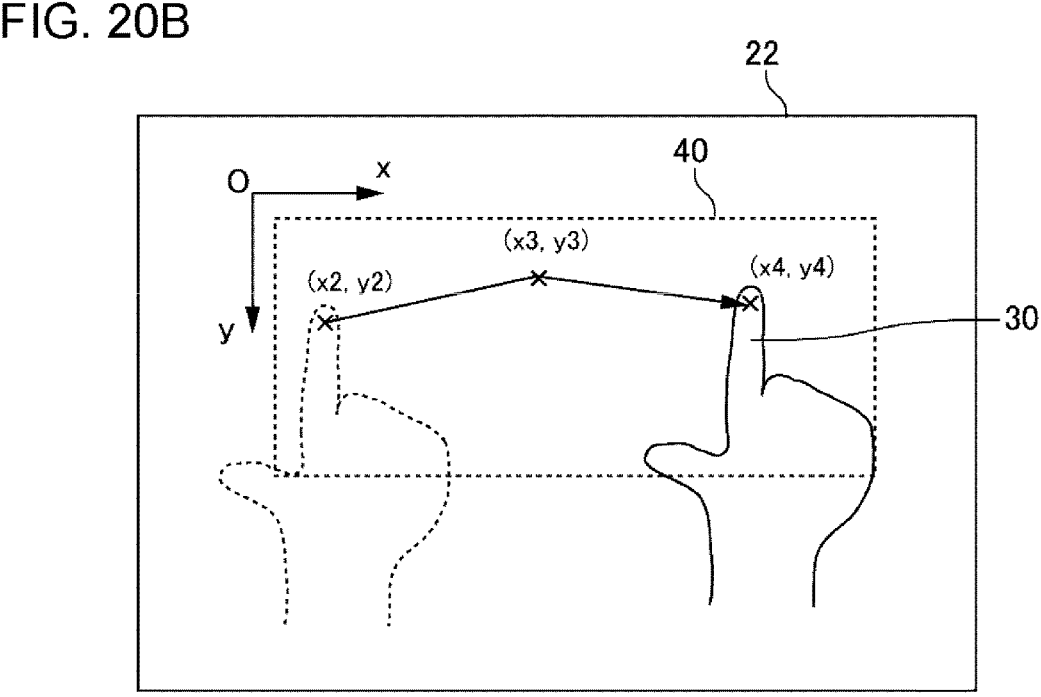

FIG. 20B illustrates a case where motion of the operation body is recognized as an input operation. In FIG. 20B, a position of the operation body changes in the order of (x2,y2), (x3,y3), and (x4,y4). Each of these coordinates is a coordinate in the coordinate system described in FIG. 20A. Motion of the operation body is indicated by information in which, for example, the coordinates are arranged in a time series. Note that an arrow indicates a trajectory of the operation body. However, in order for the drawing to be easily viewed, the arrow is drawn at a position deviated from an actual locus of the operation body.

A position or motion of the operation body is indicated as a relative position in the operation region 40, and thus there is an advantage that an input operation intended by the user is easily recognized by the recognition unit 2040. Hereinafter, a reason for this will be described. First, as illustrated in FIG. 2, it is assumed that the finger 30 is the operation body, the operation region 40 is present on the arm 32 of the user, and the marker image 16 displayed on the touch panel 14 of the device 10 is the marker 3020. In this situation, it is assumed that the user performs an input operation of retaining the finger 30 at the same location on the arm 32. In this case, if the user moves the arm 32, a position of the finger 30 in the captured image 22 is moved. However, if the arm 32 is moved, not only the finger 30 but also the marker image 16 is moved, and thus a relative position of the finger 30 in the operation region 40 is not changed. Therefore, the input operation of "the finger 30 being retained at the same location", intended by the user, is accurately recognized by the recognition unit 2040.

Figure 21A:
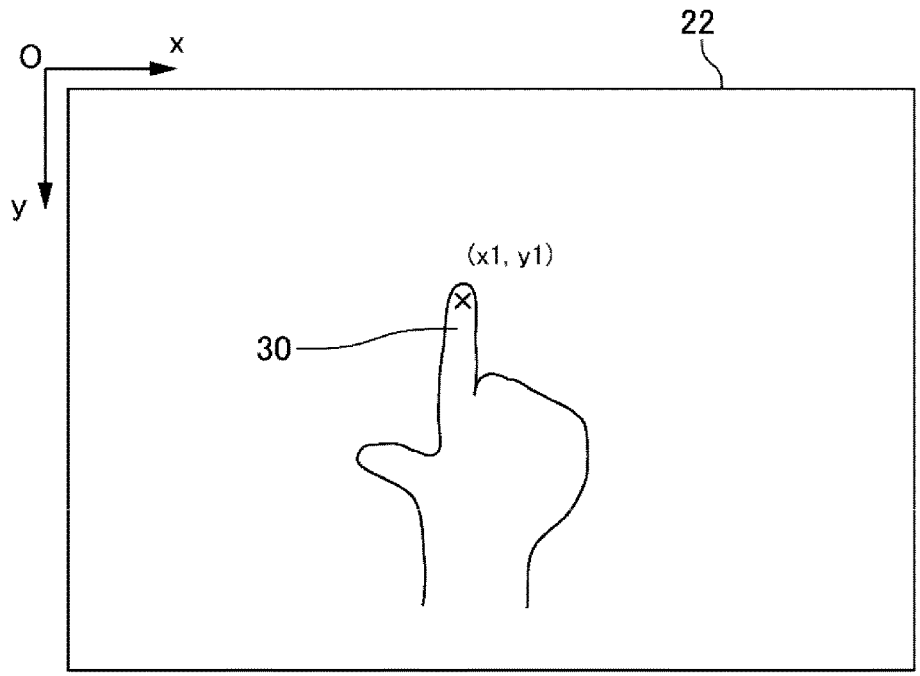
FIG. 21 are diagrams illustrating a scene in which a position or motion of an operation body is indicated by a relative position or motion in the entire captured image.

A method of indicating a position or motion of the operation body is not limited to a relative position in the operation region 40. FIG. 21 are diagrams illustrating a scene in which a position or motion of the operation body is indicated by a relative position or motion in the entire captured image. FIG. 21A illustrates a case where a position of the operation body is recognized as an input operation. In FIG. 21A, a coordinate (x1,x1) which is a position of the operation body is a coordinate in a coordinate system having an upper left end of the captured image 22 as the origin, a rightward direction in a plan view of the captured image 22 as an x direction, and a downward direction in a plan view of the captured image 22 as a y direction.

Figure 21B:
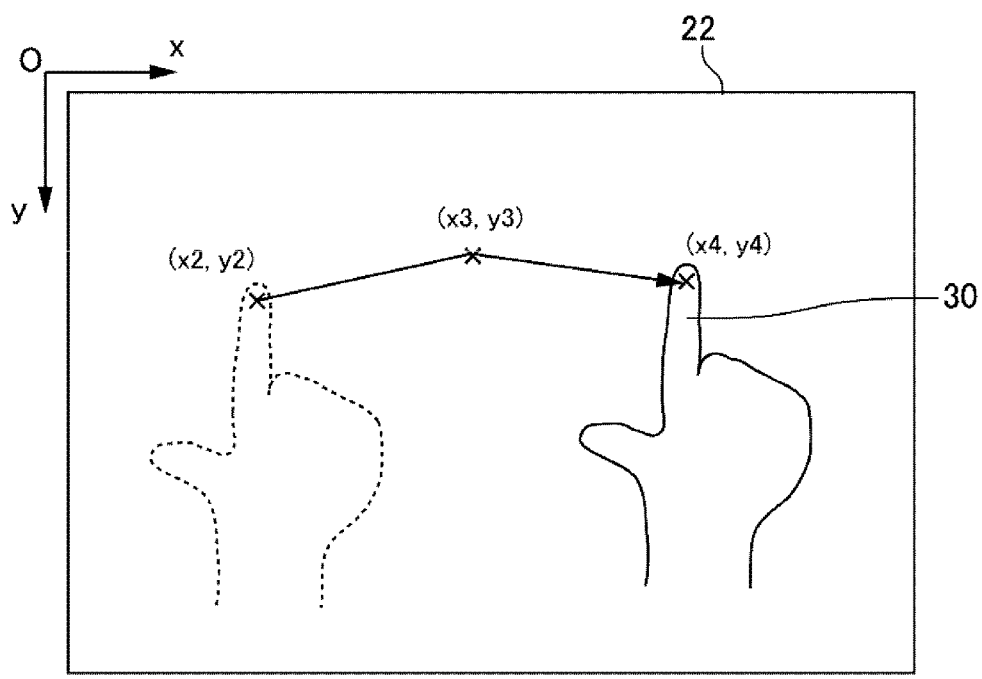

FIG. 21B illustrates a case where motion of the operation body is recognized as an input operation. In FIG. 21B, a position of the operation body changes in the order of (x2,y2), (x3,y3), and (x4,y4). Each of these coordinates is a coordinate in the coordinate system described in FIG. 21A. Motion of the operation body is indicated by information in which, for example, the coordinates are arranged in a time series. Note that an arrow indicates a trajectory of the operation body in the same manner as in FIG. 20B.

Information indicating whether a position or motion of the operation body is indicated by a relative position or motion in the operation region 40 or is indicated by a relative position or motion in the entire captured image may be set in the recognition unit 2040 in advance, may be stored in a storage device which can be accessed from the recognition unit 2040, or may be set by the user.

When motion of the operation body is recognized as an input operation, in a case where only the motion of the operation body is recognized as input regardless of a position where an action of moving the operation body is performed, the motion of the operation body may be indicated by a relative position with a start point of the motion as the origin.

Note that the above-described methods of indicating a position or motion of the operation body are only examples. A method of indicating a position or motion of the operation body may be any method of being capable of indicating a position or motion of the operation body, and is not limited to the above-described methods.

<Recognition of Input Operation Based on which One of Position and Motion of Operation Body>

The recognition unit 2040 recognizes an input operation on the basis of a position or motion of the operation body. Here, there are various methods of determining which one of a position and motion of the operation body is used to recognize an input operation. For example, which one of a position and motion of the operation body is used to recognize an input operation is defined in advance. Here, information indicating which one of a position and motion of the operation body is used to recognize an input operation may be set in the recognition unit 2040 in advance, may be stored in a storage device which can be accessed from the recognition unit 2040, or may be set by the user.

For example, the recognition unit 2040 may determine which one of a position and motion of the operation body is used to recognize an input operation on the basis of the degree of motion of the operation body. For example, in a case where a size of a movement range of the operation body within a predetermined time is less than a predetermined value, the recognition unit 2040 recognizes an input operation by using a position of the operation body. Consequently, for example, if the user retains the operation body at a certain position, an input operation indicating the position is recognized by the recognition unit 2040. This operation is, for example, an operation of pressing a certain location for a long time with a mouse, or something like that.

In this case, a position of the operation body recognized as an input operation by the recognition unit 2040 is defined by a position of the operation body within a predetermined time. For example, the recognition unit 2040 handles one (for example, an initial position or the last position) of positions of the operation body within the predetermined time as a position of the operation body. For example, the recognition unit 2040 handles a statistical value (an average value or the most frequent value) calculated on the basis of positions of the operation body within the predetermined time as a position of the operation body.

On the other hand, in a case where the size of the movement range of the operation body within the predetermined time is equal to or more than the predetermined value, the recognition unit 2040 recognizes the input operation by using motion of the operation body.

Information indicating the predetermined time or the predetermined value may be set in the recognition unit 2040 in advance, may be stored in a storage device which can be accessed from the recognition unit 2040, or may be set by the user.

Example Embodiment 2

Figure 22:
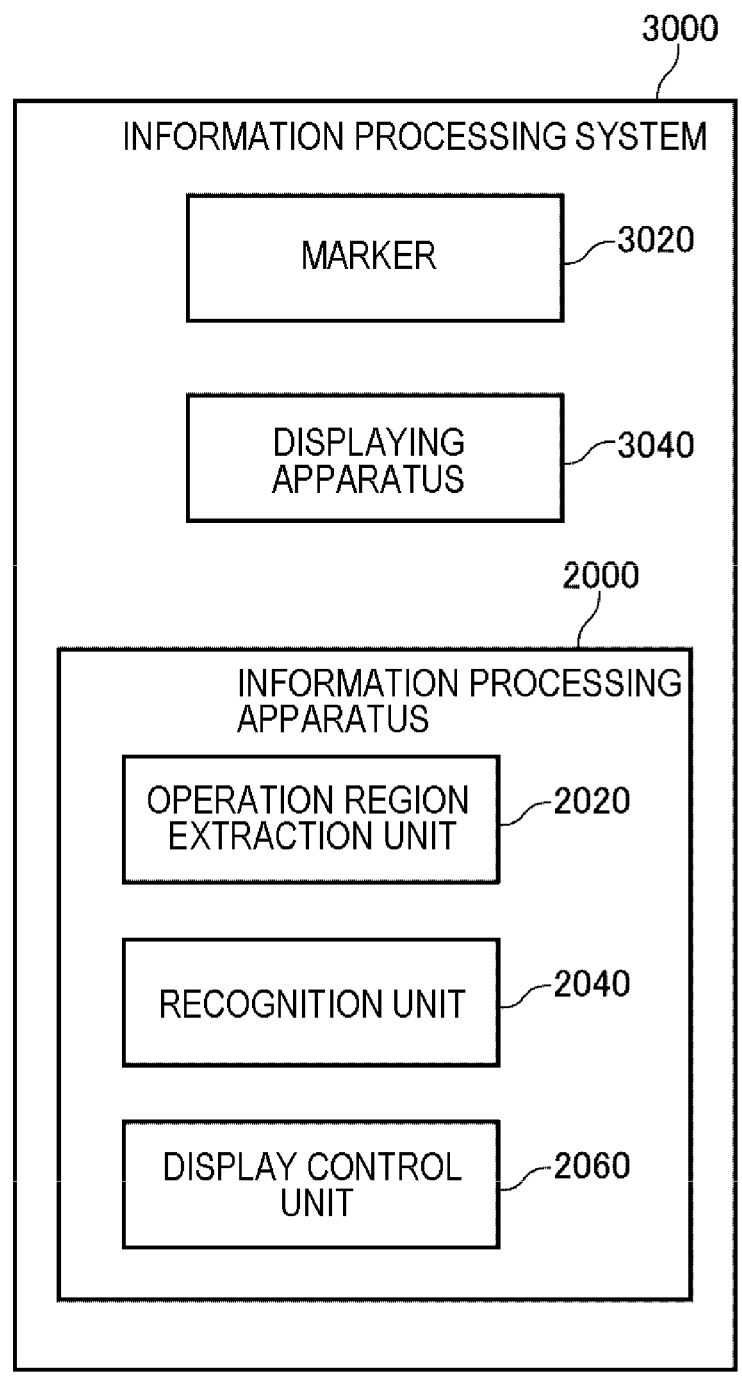
FIG. 22 is a block diagram illustrating an information processing system according to Example Embodiment 2.

FIG. 22 is a block diagram illustrating an information processing system 3000 according to Example Embodiment 2. The information processing system 3000 of Example Embodiment 2 has the same function as that of the information processing system 3000 of Example Embodiment 1 except for the following description.

The information processing system 3000 of Example Embodiment 2 includes a display device 3040. The display device 3040 is any device outputting an image. For example, the display device 3040 is a device such as a projector projecting an image. For example, the display device 3040 is a display device displaying an image. For example, the display device is the display device 102 provided on the head mounted display 100.

The information processing apparatus 2000 of Example Embodiment 2 includes a display control unit 2060. The display control unit 2060 outputs an image to the display device 3040. In the present example embodiment, the display control unit 2060 displays an image indicating the operation region 40 on the display device 3040. Consequently, the user can visually recognize the operation region 40. Hereinafter, the image indicating the operation region will be referred to as an operation region image.

<Flow of Process>

Figure 23:
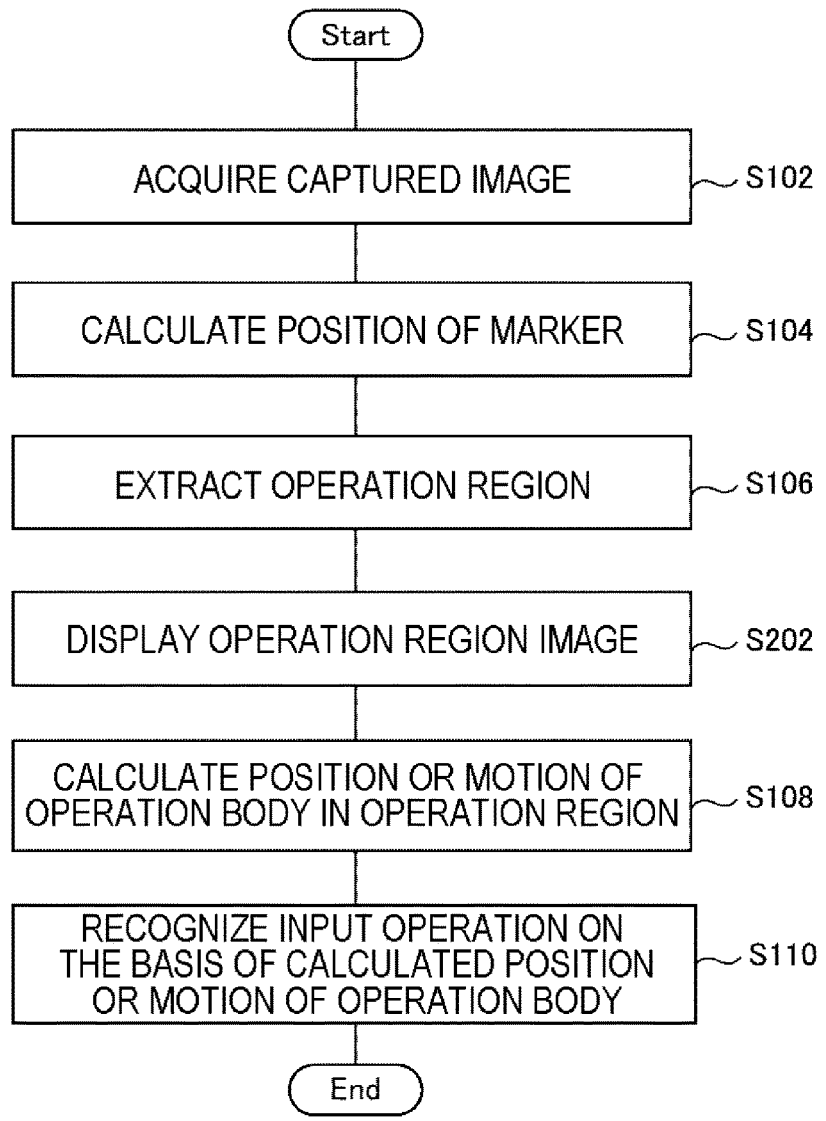
FIG. 23 is a flowchart illustrating a flow of a process performed by an information processing apparatus of Example Embodiment 2.

FIG. 23 is a flowchart illustrating a flow of a process performed by the information processing apparatus 2000 of Example Embodiment 2. The flowchart of FIG. 23 includes S202 between S106 and S108 in the flowchart of FIG. 5. In S202, the display control unit 2060 displays an extracted operation region image on the display device 3040.

<Details of Display Control Unit 2060>

A method of the display control unit 2060 displaying an operation region image on the display device 3040 includes a method of displaying the operation region image without being superimposed on a captured image and a method of displaying the operation region image with being superimposed on a captured image. Hereinafter, each method will be described.

<<Method of Displaying Operation Region Image without being Superimposed on Captured Image>>

It is assumed that the information processing apparatus 2000 is implemented by using the head mounted display 100, and the display device 102 of the head mounted display 100 is a transmissive display device (the head mounted display 100 is a transmissive head mounted display). In this case, the display device 3040 is implemented by the display device 102 (lens portion) of the transmissive head mounted display 100. In this case, the camera 20 generating a captured image is provided to image the same scenery as the scenery captured in the eyes of the user (for example, the camera 20 in FIG. 4). In a case of using such a transmissive head mounted display 100, the user views a real object (scenery of the real world) viewed in front of the display device 102 so as to be able to recognize the peripheral scenery, and the scenery is the same as scenery included in a captured image. Thus, it is not necessary to display a captured image on the display device 102.

Therefore, the display control unit 2060 displays an operation region image without being superimposed on a captured image. Specifically, the display control unit 2060 converts a position of the operation region 40 on the captured image into a position on the display device 102, and displays the operation region image at the position calculated through the conversion on the display device 102.

A correspondence relationship between a coordinate on the captured image and a coordinate on the display device 102 may be defined on the basis of various parameters (an angle of view or a focal length) related to the camera 20, or a positional relationship between the display device 102 and the camera 20. The correspondence relationship may be calculated by the display control unit 2060 by using the parameters or the like, or may be set in advance as a set value.

<<Method of Displaying Operation Region Image with being Superimposed on Captured Image>>

In a case where the user cannot directly view the peripheral scenery, or scenery included in a captured image is not the same as scenery captured in the eyes of the user (in a case where an image is not captured by the camera 20 in a view direction of the user), the user performs an input operation while viewing the captured image. For example, it is assumed that the information processing apparatus 2000 is implemented by using the head mounted display 100, and the display device 102 of the head mounted display 100 is a non-transmissive display device (the head mounted display 100 is a non-transmissive head mounted display). In this case, the user cannot directly view the peripheral scenery. Thus, a captured image generated by the camera 20, which captures an image in a view direction of the user, is displayed on the display device 102. The user recognizes the peripheral scenery by viewing the captured image. Therefore, the user performs an input operation while viewing the captured image.

In a case where the camera 20 is provided on an employee ID card or the like of the user, it cannot necessarily be said that the camera 20 captures an image in the view direction of the user. In this case, the user performs an input operation while viewing a captured image generated by the camera 20. Note that, in this case, the display device 3040 is implemented by, for example, a projector, a cradle type display device (for example, a display device of a PC), or a display device of a portable terminal.

As described above, in a case where the user performs an input operation while viewing a captured image, the captured image is displayed on the display device 3040. Therefore, the display control unit 2060 displays an operation region image by displaying the operation region image to be superimposed on the captured image on the display device 3040. In this case, the display control unit 2060 superimposes the operation region image on a region from which the operation region 40 is extracted by the operation region extraction unit 2020 in a region included in the captured image.

<Operation Region Image>

The operation region image may be any image. Any method of the display control unit 2060 acquiring the operation region image may be used. For example, the operation region image may be set in the display control unit 2060 in advance, may be stored in a storage device which can be accessed from the display control unit 2060, or may be set by the user. The display control unit 2060 may automatically generate an image indicating the same shape as that of the operation region 40 extracted from a captured image, or may use the image as the operation region image. For example, the display control unit 2060 generates, as the operation region image, an image which indicates the same shape as that of the operation region 40, and the shape is painted in a predetermined color.

<Hardware Configuration>

A hardware configuration of a computer implementing the information processing apparatus 2000 of Example Embodiment 2 is illustrated in FIG. 3, for example, in the same manner as in Example Embodiment 1. However, the storage 1080 of the computer 1000 implementing the information processing apparatus 2000 of the present example embodiment stores a program module for realizing each function of the information processing apparatus 2000 of the present example embodiment. The display device 3040 is connected to the computer 1000 via the input/output interface 1100. However, a method of connecting the display device 3040 to the computer 1000 is not limited to a connection method using the input/output interface 1100. For example, the display device 3040 may be connected to the computer 1000 through a network. In this case, the computer 1000 includes a network interface for connection to the network.

Advantageous Effects

According to the information processing system 3000 of the present example embodiment, the user can visually recognize an operation region. Therefore, the user can easily recognize a location where an input operation is preferably performed, and thus the operability of the information processing system 3000 is improved for the user.

Modification Examples

A method in which a user can visually recognize an operation region may be methods other than a method of displaying an operation region image. For example, the display control unit 2060 may output a predetermined color at a position where the operation region image is displayed, so that the user can visually recognize an operation region. In a case where a captured image is displayed on the display device 3040, the display control unit 2060 may change a color or a pattern of the captured image in a portion from which the operation region 40 is extracted, so that the user can visually recognize the operation region 40.

Example Embodiment 3

An information processing system 3000 of Example Embodiment 3 is illustrated in FIG. 22, for example, in the same manner as the information processing system 3000 of the Example Embodiment 2. The information processing system 3000 of Example Embodiment 3 has the same function as that of the information processing system 3000 of Example Embodiment 2 except for the following description. However, the display control unit 2060 of Example Embodiment 3 may not display an operation region image on the display device 3040.

The display control unit 2060 of Example Embodiment 3 displays an image indicating an input operation target on the display device 3040. In the above-described way, the user can visually recognize the input operation target. Hereinafter, the image indicating an input operation target will be referred to as an operation image.

<Flow of Process>

Figure 24:
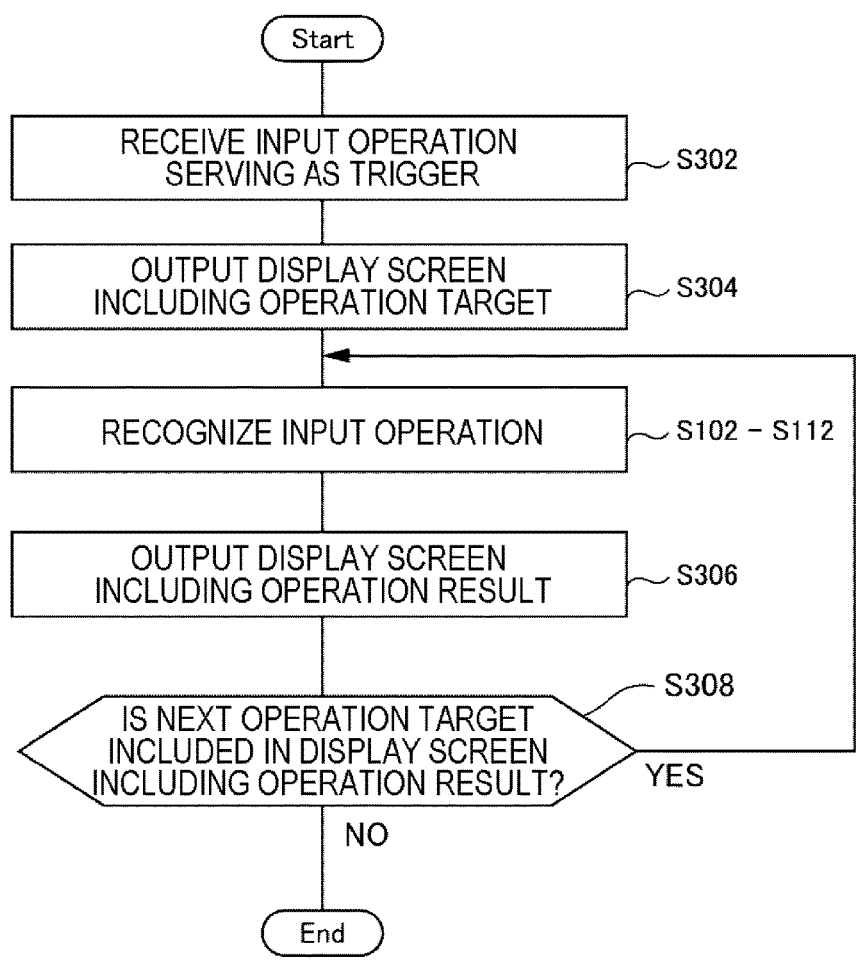
FIG. 24 is a flowchart illustrating a flow of a process performed by an information processing apparatus of Example Embodiment 3.

FIG. 24 is a flowchart illustrating a flow of a process performed by the information processing apparatus 2000 of Example Embodiment 3. First, the information processing apparatus 2000 receives an input operation which is a trigger to output an operation image to the display device 3040 (S302). The input operation may be an input operation recognized by the recognition unit 2040, or may be other input operations. In the latter case, for example, the input operation is an operation on an input device (a mouse, a keyboard, or the like) connected to the information processing apparatus 2000.

Next, the display control unit 2060 outputs an operation image to the display device 3040 (S304). The information processing apparatus 2000 recognizes an input operation on an operation target by performing a series of processes illustrated in FIG. 5 or 22. The display control unit 2060 displays an operation result on the display device 3040 according to the input operation recognized by the recognition unit 2040 (S306).

In a case where an operation image indicating the next input operation is included in the operation result displayed on the display device 3040 (S308: YES), the process in FIG. 24 proceeds to S102. On the other hand, in a case where an operation image indicating the next input operation is not included in the operation result (S308: NO), the process in FIG. 24 is finished.

Note that a trigger to perform the process in S304 is not limited to an input operation in S302. For example, the process in S304 may be automatically performed after the information processing apparatus 2000 is activated. As mentioned above, in a case where S304 is executed without using an input operation as a trigger, the flowchart of FIG. 24 may not include S302.

<<Position where Operation Image is Displayed>>

The display control unit 2060 displays an operation image at any position on the display device 3040. For example, the display control unit 2060 displays an operation image at a position with a position of the operation region 40 as a reference. More specifically, the display control unit 2060 displays the operation image near the operation region 40, or displays the operation image to be superimposed on the operation region 40. FIG. 25 are diagrams illustrating an operation image displayed at a position with the operation region 40 as a reference. In FIG. 25, operation images are a selection image 122-1 to a selection image 122-4.

Figure 25A:
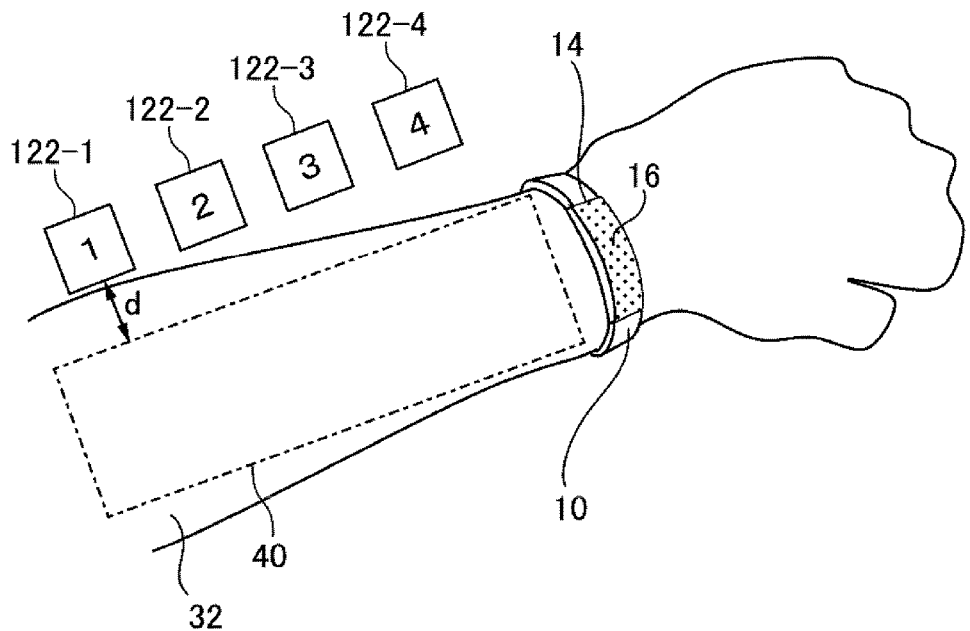
FIG. 25 are diagrams illustrating an operation image displayed at a position with an operation region as a reference.
Figure 25B:
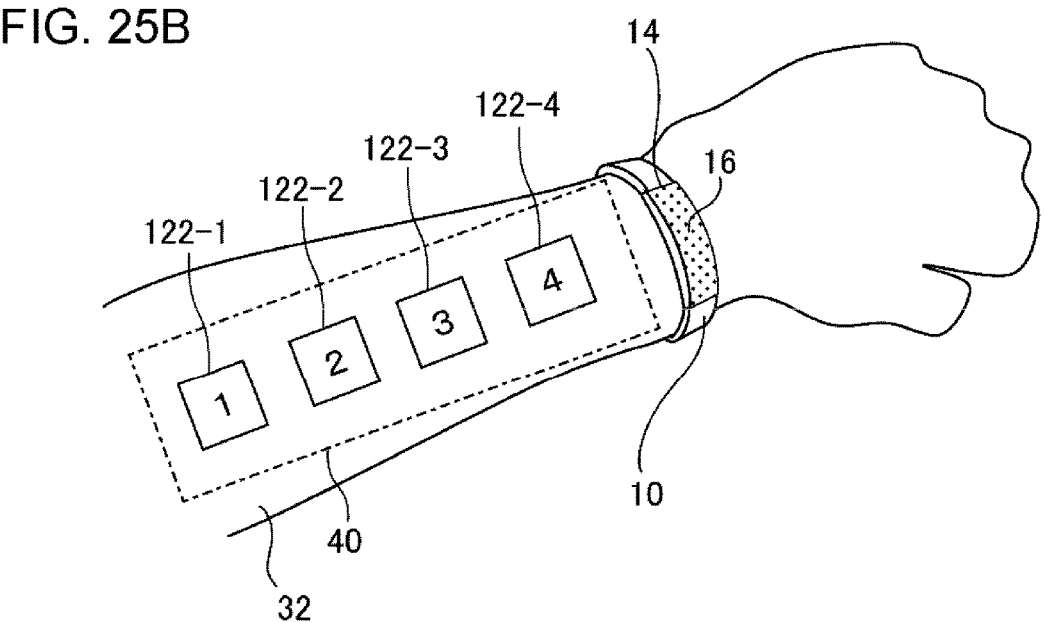

In FIG. 25A, each selection image 122 is displayed near the operation region 40. More specifically, the respective selection images 122 are displayed to be arranged at a position above the upper side of the operation region 40 by a predetermined distance d. Note that, herein, "over by the predetermined distance d" is indicated by a direction and a distance in the coordinate system 42 defined by the marker 3020 (marker image 16). On the other hand, in FIG. 25B, each selection image 122 is displayed to be superimposed on the operation region 40.

For example, the display control unit 2060 may display an operation image at any position regardless of a position of the operation region 40. For example, a position of an operation image is defined in advance as a predetermined position on a captured image.

Information for defining a display position of an operation image may be set in the display control unit 2060 in advance, may be stored in a storage device which can be accessed from the display control unit 2060, or may be set by the user.

The information (for example, the above-described predetermined distance d) for defining a display position of an operation image may be defined in an absolute value (for example, the number of pixels), or may be defined in a relative value. In the latter case, for example, a display position of an operation image is indicated by a relative value for a size of a captured image. For example, a display position of an operation image may be indicated by a relative value for a size of the marker 3020.

Here, a method of displaying an operation image with a position of the operation region 40 as a reference differs depending on whether an operation region image is displayed without being superimposed on a captured image or is displayed with being superimposed on a captured image in the same manner as in the method of displaying an operation region image in Example Embodiment 2. Hereinafter, each method will be described.

<<Method of Displaying Operation Region Image without being Superimposed on Captured Image>>

It is assumed that a position of a captured image is defined according to a relationship with a position of the operation region 40. In this case, the display control unit 2060 calculates a position of an operation image on a captured image by using a position of the operation region 40 on the captured image on the basis of a positional relationship between the position of the operation region 40 on the captured image and the position of the operation image. The display control unit 2060 converts the position of the operation image on the captured image into a position on the display device 102 of the transmissive head mounted display 100, and displays the operation image at the position calculated through the conversion on the display device 102.

It is assumed that a position of a captured image is defined as a predetermined position on the captured image. In this case, the display control unit 2060 converts the position of the operation image on the captured image into a position on the display device 102 of the transmissive head mounted display 100, and displays the operation image at the position calculated through the conversion on the display device 102.

A correspondence relationship between a coordinate on the captured image and a coordinate on the display device 102 may be defined on the basis of various parameters (an angle of view or a focal length) related to the camera 20, or a positional relationship between the display device 102 and the camera 20.

Information indicating a positional relationship between the operation region 40 and an operation image on a captured image may be set in the display control unit 2060 in advance, may be stored in a storage device which can be accessed from the display control unit 2060, or may be set by the user.

<<Method of Displaying Operation Region Image to be Superimposed on Captured Image>>

It is assumed that a position of a captured image is defined according to a relationship with a position of the operation region 40. In this case, the display control unit 2060 calculates a position of an operation image on a captured image on the basis of a positional relationship between the position of the operation region 40 on the captured image and the position of the operation image. The display control unit 2060 outputs the captured image on which the operation image is superimposed at the position to the display device 3040.

It is assumed that a position of a captured image is defined as a predetermined position on the captured image. The display control unit 2060 outputs the captured image on which the operation image is superimposed at the predetermined position to the display device 3040.

Note that information indicating a positional relationship between the operation region 40 and an operation image on a captured image is as described above.

<Method of Acquiring Operation Image>

Any method of the display control unit 2060 acquiring an operation image may be used. For example, an operation image may be set in the display control unit 2060 in advance, may be stored in a storage device which can be accessed from the display control unit 2060, or may be set by the user.

<Display Performed According to Input Operation>

The display control unit 2060 performs any process according to an input operation recognized by the recognition unit 2040. The display control unit 2060 causes the display device 3040 to perform display indicating a result thereof. Here, any correspondence between an input operation recognized by the recognition unit 2040 and a process performed by the display device 3040 according to the input operation may be used. This correspondence may be set in the display control unit 2060 in advance, may be stored in a storage device which can be accessed from the display control unit 2060, or may be set by the user.

<Hardware Configuration>

A hardware configuration of a computer implementing the information processing apparatus 2000 of Example Embodiment 3 is illustrated in FIG. 3, for example, in the same manner as in Example Embodiment 1. However, the storage 1080 of the computer 1000 implementing the information processing apparatus 2000 of the present example embodiment stores a program module for realizing each function of the information processing apparatus 2000 of the present example embodiment. In the same manner as in Example Embodiment 2, also in the present example embodiment, the display device 3040 is connected to the computer 1000 through the input/output interface 1100 or a network interface.

Advantageous Effects

According to the present example embodiment, information regarding an operation target is output to the display device 3040 from the display control unit 2060. Therefore, the user can perform an input operation while referring to the information regarding the operation target. In the above-described way, the convenience of the information processing system 3000 is improved for the user.

Example 1

Figure 26:
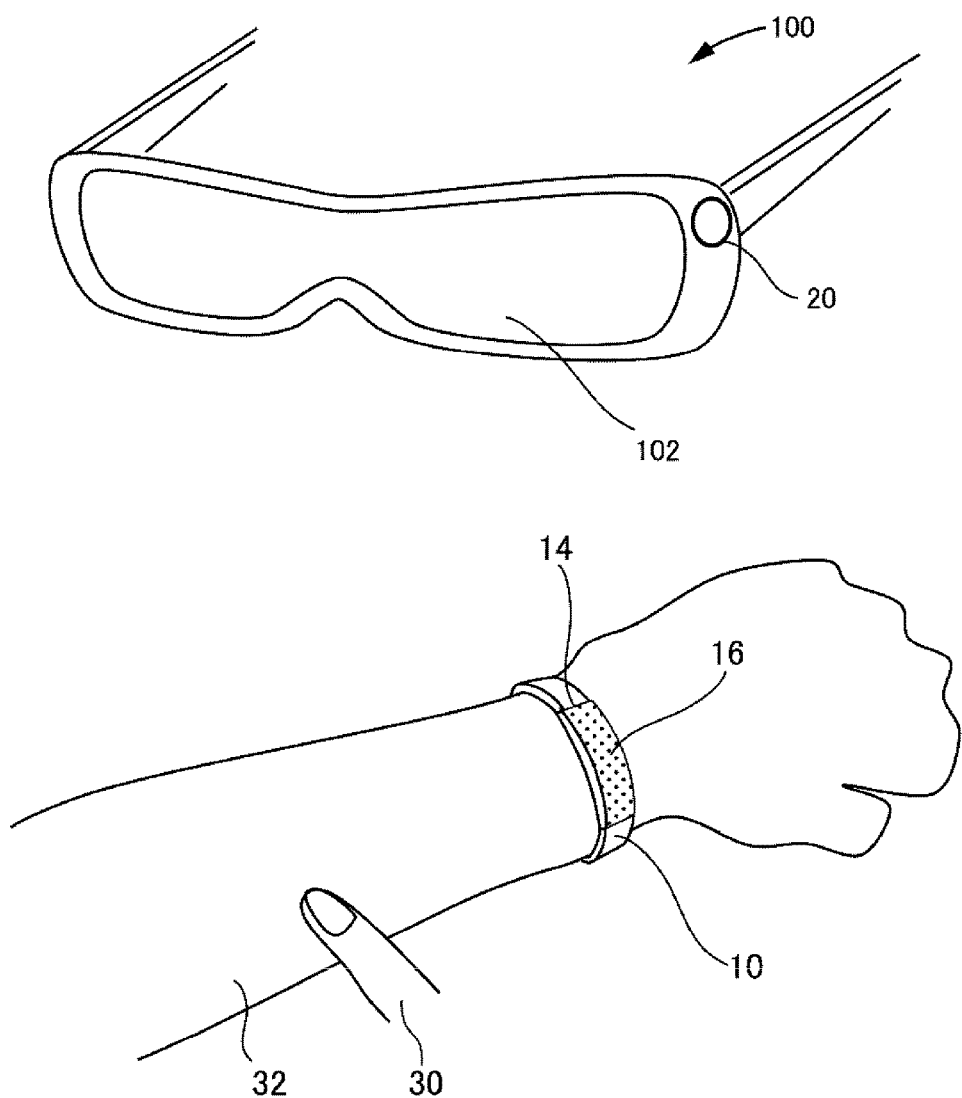
FIG. 26 is a diagram illustrating a use environment of an information processing system of an Example.

The information processing system 3000 of Example Embodiment 3 will be described more in detail through Examples. FIG. 26 is a diagram illustrating a use environment of the information processing system 3000 of the Example. In the present example, the information processing apparatus 2000 is built into the head mounted display 100. The display device 3040 is the display device 102 of the head mounted display 100. The camera 20 is provided near the display device 102 so as to capture an image in the view direction of the user. The user wears the device 10 on the left wrist. The marker 3020 the marker image 16 displayed on the touch panel 14 of the device 10.

The display control unit 2060 of the present example displays an operation region image and an operation image on the display device 3040. Note that, in the present example, the operation region 40 is located on the left arm 32 of the user.

In the present example, the user performs an operation of selecting one image from among a plurality of images displayed on the display device 102. In this case, first, the user performs a candidate selection operation of selecting a single image as a selection candidate. The user performs a determination operation on the selection candidate. As a result, the selection candidate which is a determination operation target is determined as a selection target, and various processes are performed on an image determined as the selection target. For example, the display control unit 2060 displays the selected image to be large at the center of the display device 102. Here, the user may use a certain image as a selection candidate, and then may perform an operation (hereinafter, a cancel operation) of returning the image to a state in which the image is not a selection candidate.

<Operation 1>

FIG. 27 are diagrams illustrating a candidate selection operation. Four selection images 122 are displayed on the display device 102. In order to select a selection candidate, the user performs an input operation in which "the finger 30 is retained for a predetermined time or more under any one of the selection image 122-1 to the selection image 122-4". The recognition unit 2040 recognizes the input operation. The display control unit 2060 changes the display on the display device 3040 in response to the input operation such that the user recognizes that the selection image 122 which is an input operation target becomes a selection candidate.

Figure 27A:
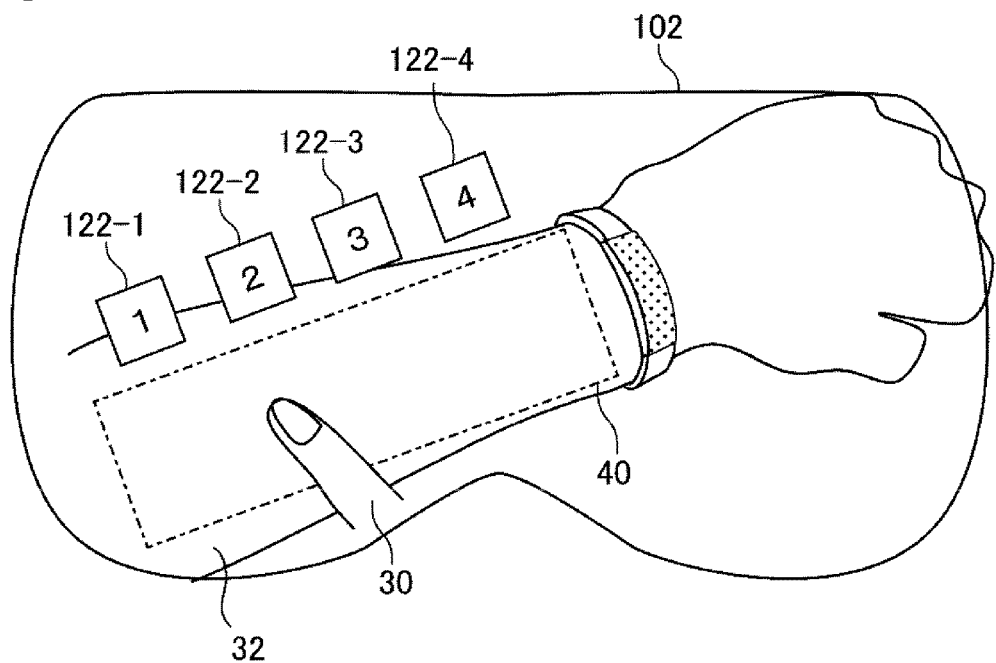
FIG. 27 are diagrams illustrating a candidate selection operation.
Figure 27B:
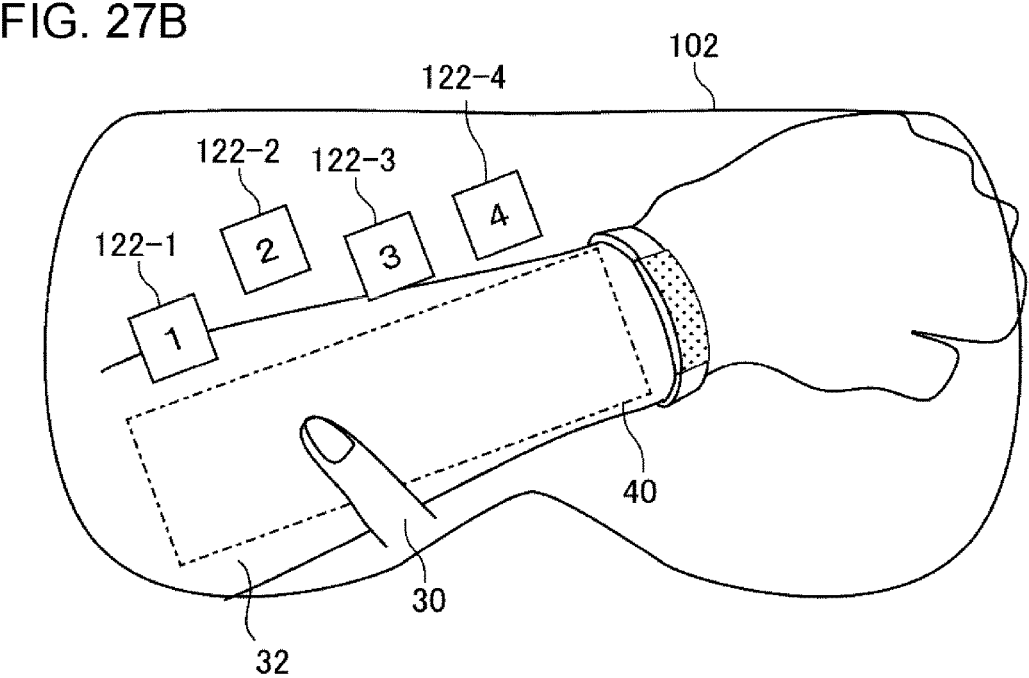

In FIG. 27A, the user retains the finger 30 under the selection image 122-2. This is a candidate selection operation for setting the selection image 122-2 as a selection candidate. The recognition unit 2040 recognizes the candidate selection operation. The display control unit 2060 performs a process of moving the display position of the selection image 122-2 which is a selection candidate slightly further upward than the other selection images 122 in response to the input operation (FIG. 27B).

<Operation 2>

Figure 28A:
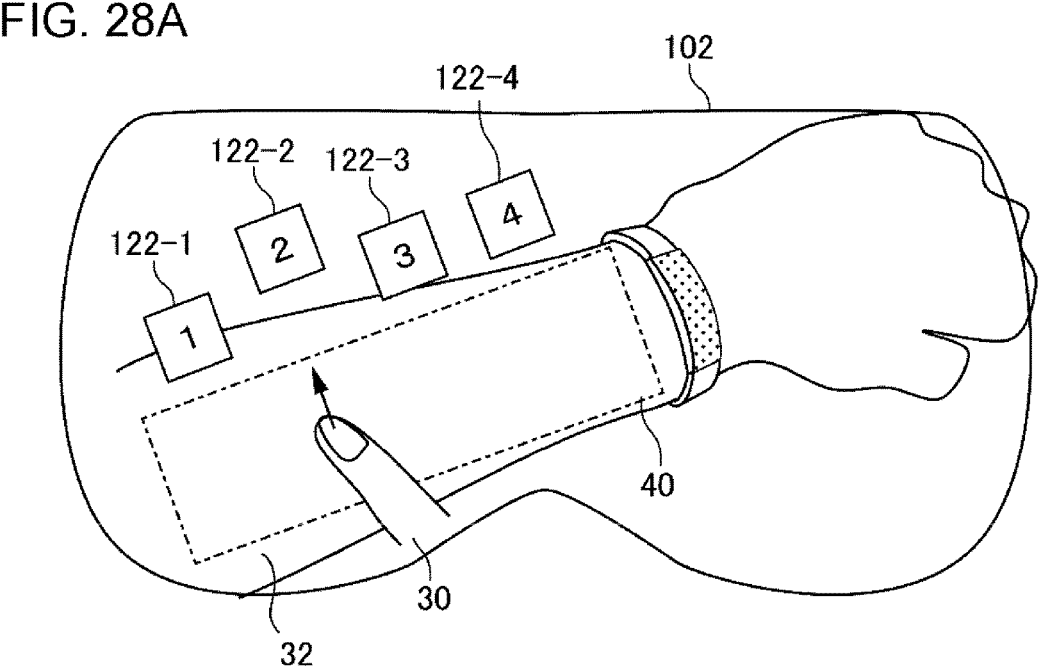
FIG. 28 are first diagrams illustrating a determination operation.
Figure 28B:
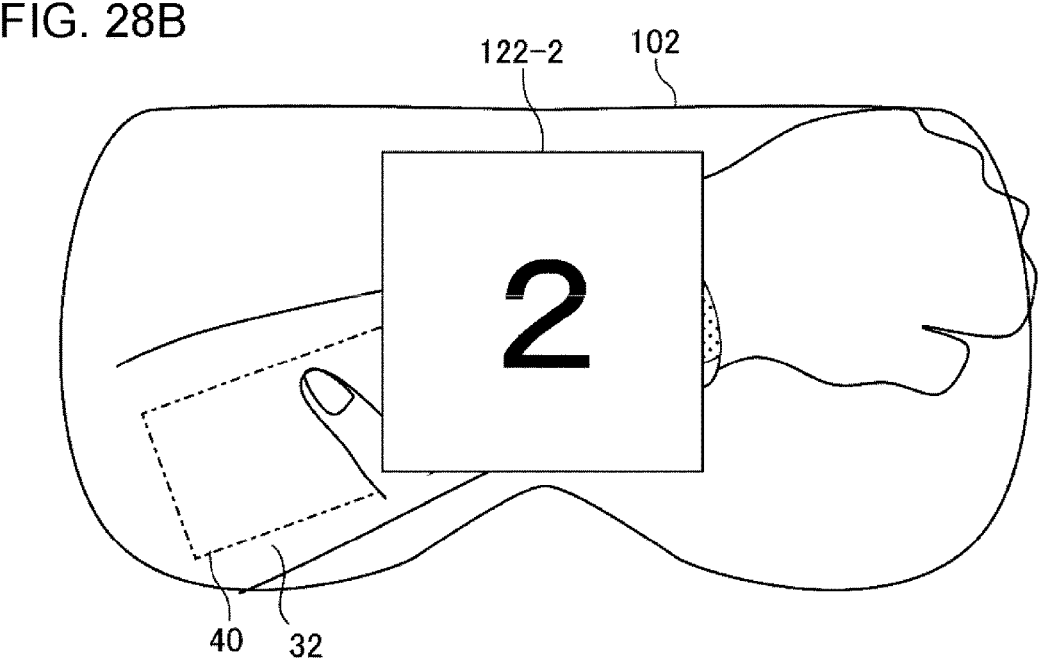

FIG. 28 are diagrams illustrating a determination operation. The user performs an input operation in which "the finger 30 moves a predetermined distance or more in the direction of coming close to the selection image 122 which is a selection candidate". The recognition unit 2040 recognizes this input operation. In a case of FIG. 28A, the user makes the finger 30 come close to the selection image 122-2. The display control unit 2060 displays the selection image 122-2 to be large at the center of the display device 102 in response to the input operation (FIG. 28B).

<Operation 3>

Another example of the above-described determination operation will be described. The display control unit 2060 handles, as a determination operation, an input operation in which "the finger 30 is retained in a predetermined region (hereinafter, an upper end region) at an upper end of the operation region 40".

Figure 29A:
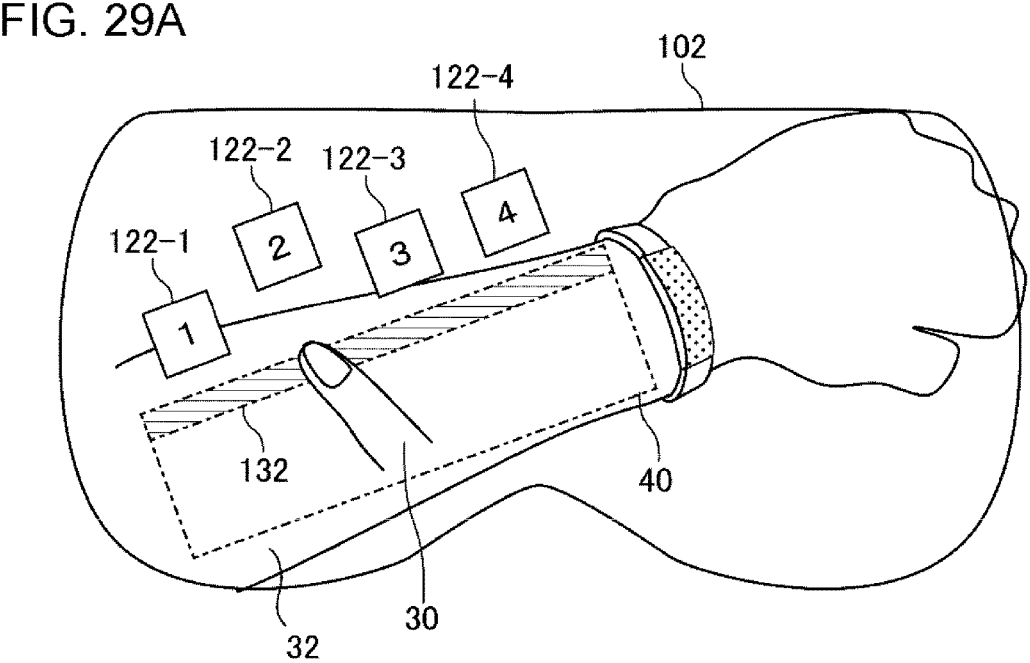
FIG. 29 are second diagrams illustrating a determination operation.
Figure 29B:
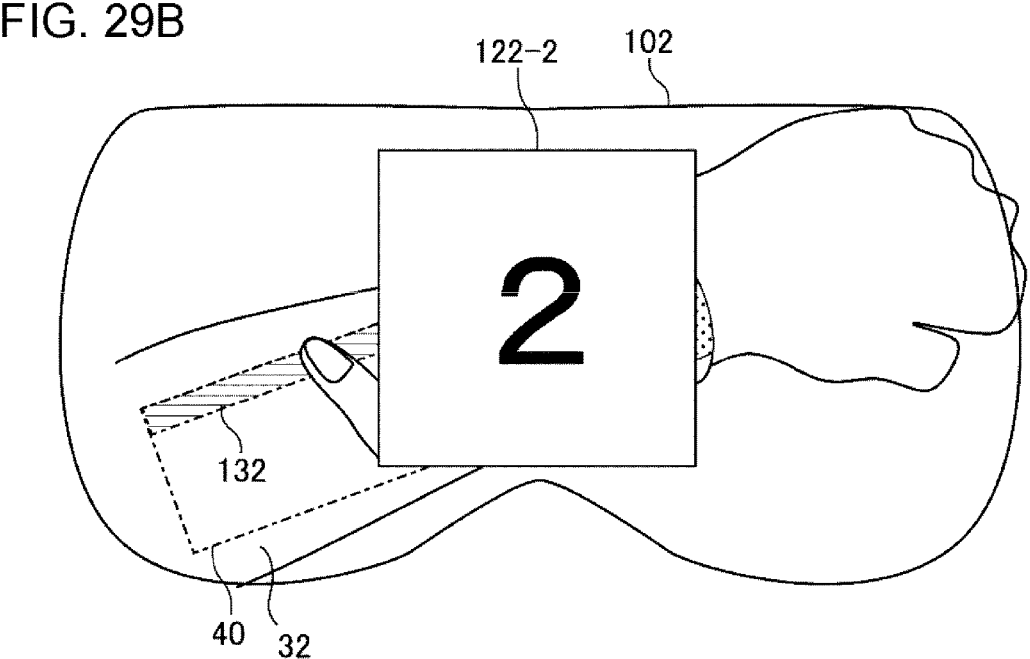

FIG. 29 are second diagrams illustrating the determination operation. The user retains the finger 30 in an upper end region 132 of the operation region 40 for a predetermined time or more (FIG. 29A). The recognition unit 2040 recognizes the input operation. Specifically, in a case where all positions of the finger 30 in respective captured images generated within a predetermined time are located in the upper end region 132, the recognition unit 2040 recognizes the input operation. The display control unit 2060 performs a process of displaying the selection image 122 to be large at the center of the display device 102 in response to the input operation in the same manner as in FIG. 28B (FIG. 29B).

<Operation 4>

Still another example of the determination operation will be described. The display control unit 2060 handles, as the determination operation, an input operation in which "a part of the finger 30 comes to the outside the operation region 40 from the upper end of the operation region 40".

Figure 30A:
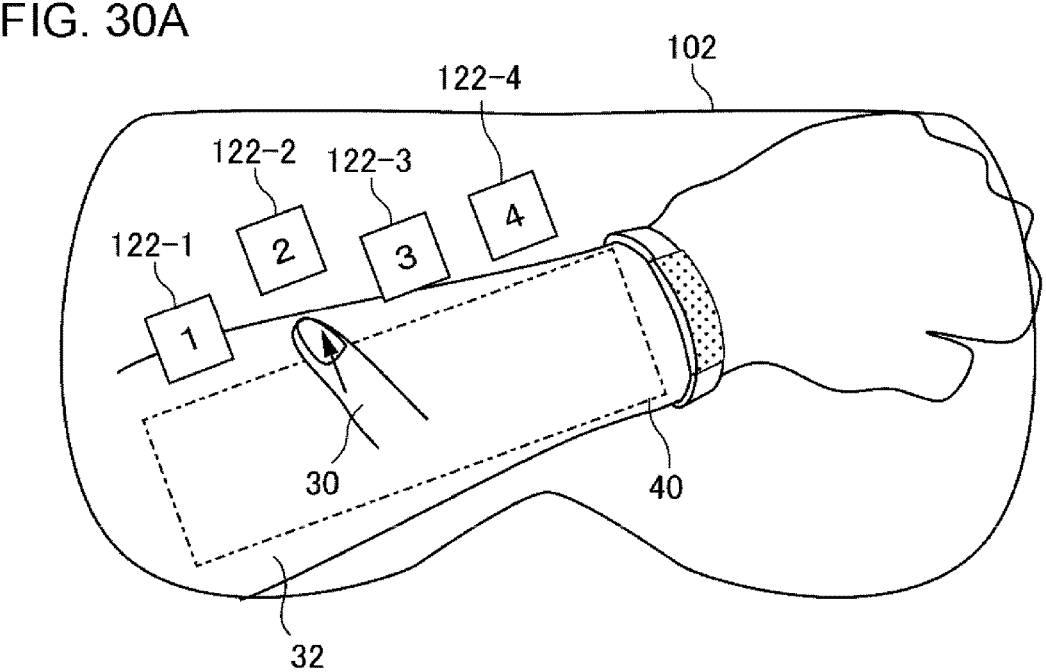
FIG. 30 is a third illustrating a determination operation.
Figure 30B:
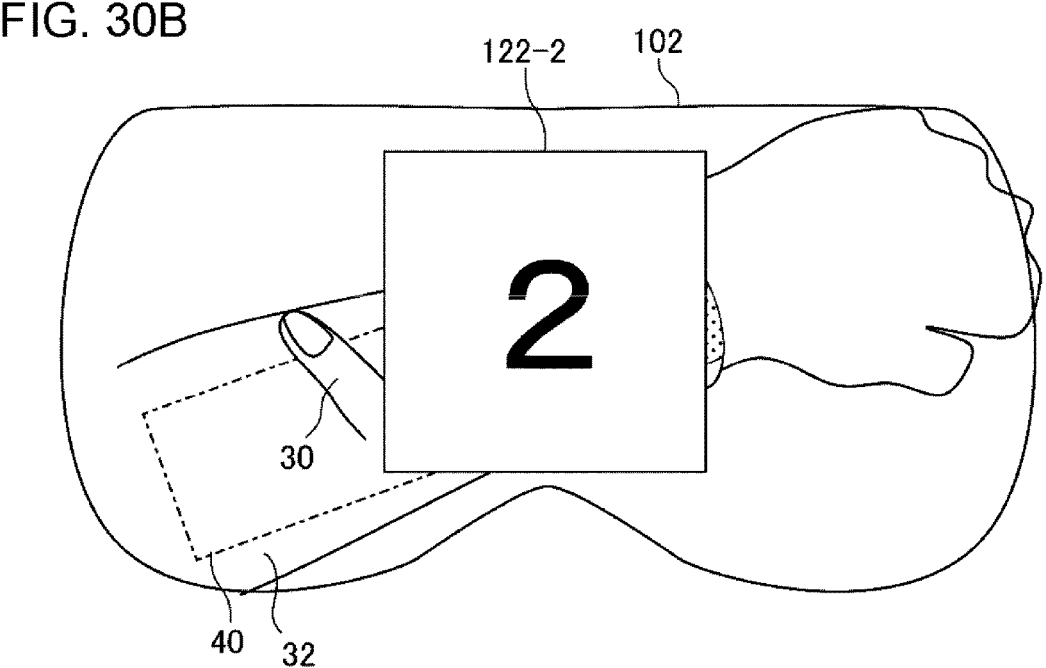

FIG. 30 is a third diagram illustrating the determination operation. The user performs an input operation in which "the finger 30 is moved such that a part of the finger 30 comes out of the upper end of the operation region 40". The recognition unit 2040 recognizes the input operation. The display control unit 2060 performs a process of displaying the selection image 122 to be large at the center of the display device 102 in response to the input operation in the same manner as in FIG. 28B (FIG. 29B).

Here, there are various methods of recognizing the input operation in which "a part of the finger 30 comes to the outside of the operation region 40 from the upper end of the operation region 40". For example, the recognition unit 2040 recognizes the input operation by recognizing that "the upper end of the finger 30 touches the upper end of the operation region 40, and then the finger 30 is further moved upward". For example, the recognition unit 2040 recognizes the input operation by recognizing that "the finger 30 is being moved upward, and an area of the finger 30 included in the operation region 40 is reduced". For example, the recognition unit 2040 may recognize the input operation by recognizing that "the finger 30 is included in the upper end region 132 of the operation region 40".

<Operation 5>

Figure 31A:
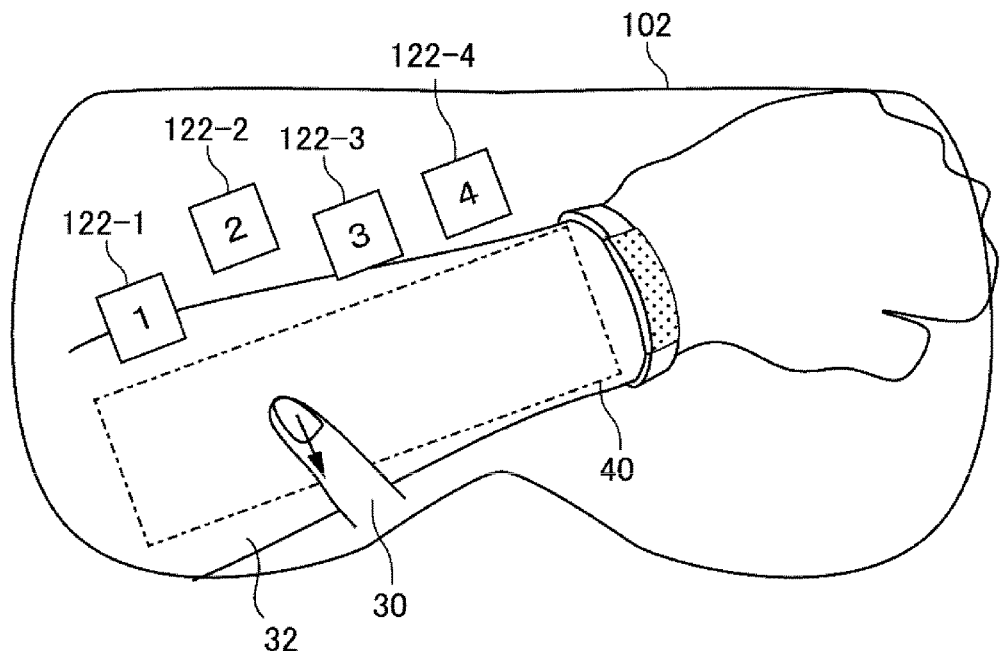
FIG. 31 are first diagrams illustrating a cancel operation.
Figure 31B:
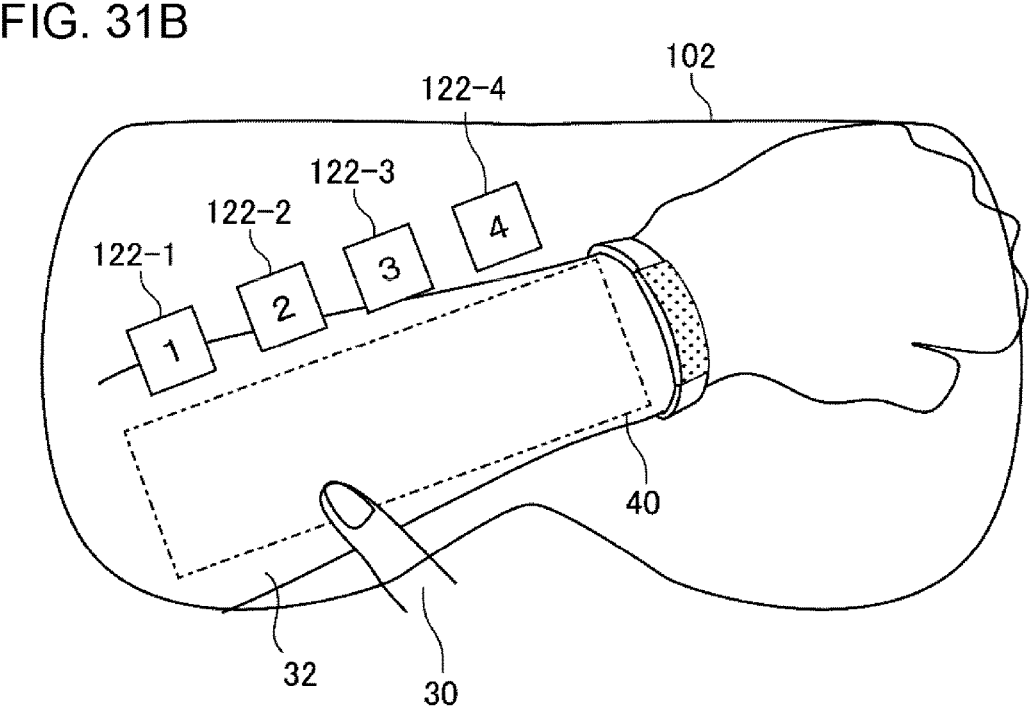

FIG. 31 are diagrams illustrating the cancel operation. In FIG. 31A, the user performs an input operation in which "the finger 30 becomes distant from the selection image 122-2 which is a selection candidate by a predetermined distance or more". The recognition unit 2040 recognizes the input operation. The display control unit 2060 performs a process of "returning the selection image 122-2 selected as a selection candidate to a state in which the selection image is not selected as a selection candidate" in response to the input operation (FIG. 31B).

<Operation 6>

Another example of the cancel operation will be described. The display control unit 2060 handles, as the cancel operation, an input operation in which "the finger 30 is retained in a predetermined region (hereinafter, a lower end region) at a lower end of the operation region 40".

Figure 32A:
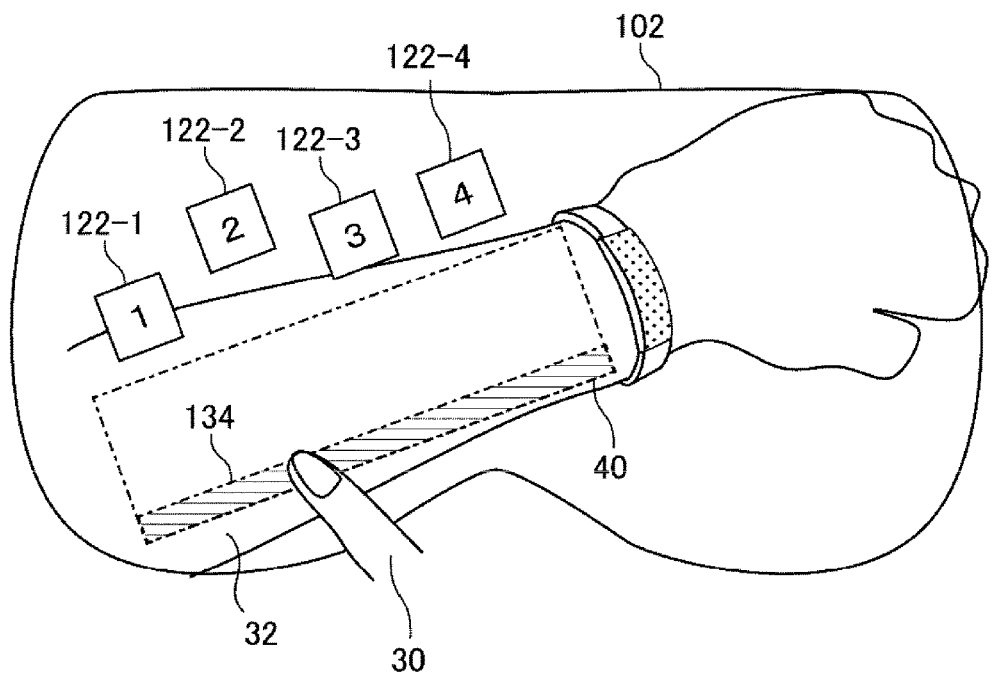
FIG. 32 are second diagrams illustrating a cancel operation.
Figure 32B:
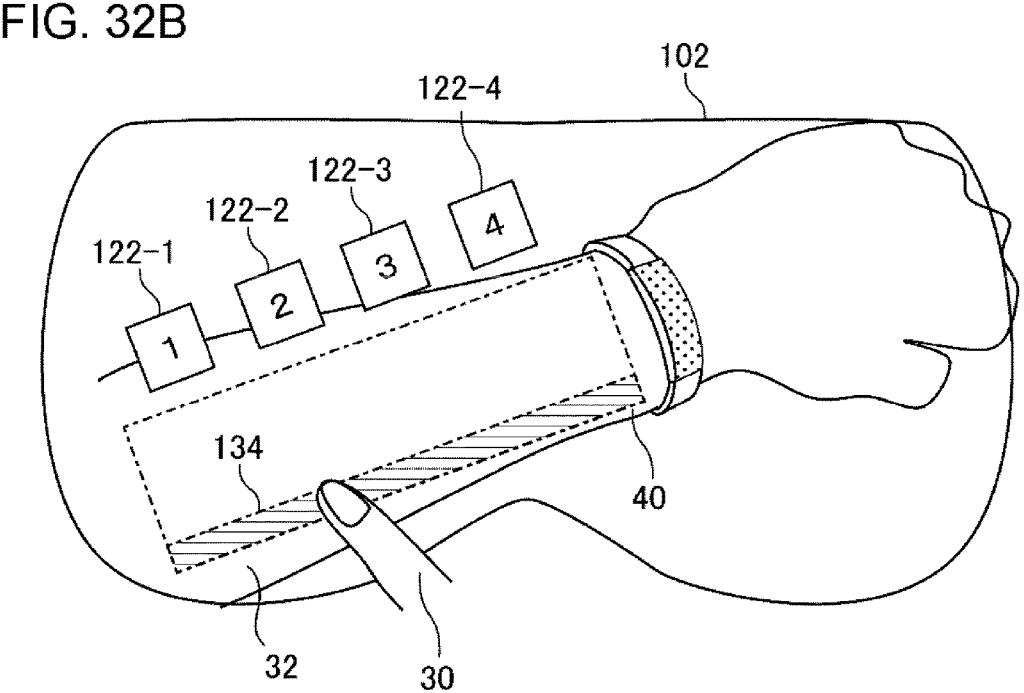

FIG. 32 are second diagrams illustrating the cancel operation. The user performs an input operation in which "the finger 30 is retained in a lower end region 134 of the operation region 40 for a predetermined time or more" (FIG. 32A). The recognition unit 2040 recognizes the input operation. Specifically, in a case where all positions of the finger 30 in respective captured images generated within a predetermined time are located in the lower end region 134, the recognition unit 2040 recognizes the input operation. The display control unit 2060 performs a process of "returning the selection image 122-2 selected as a selection candidate to a state in which the selection image is not selected as a selection candidate" in response to the input operation in the same manner as in FIG. 31B (FIG. 32B).

<Operation 7>

Still another example of the cancel operation will be described. The display control unit 2060 handles, as the cancel operation, an input operation in which "a part of the finger 30 comes to the outside the operation region 40 from the lower end of the operation region 40".

Figure 33A:
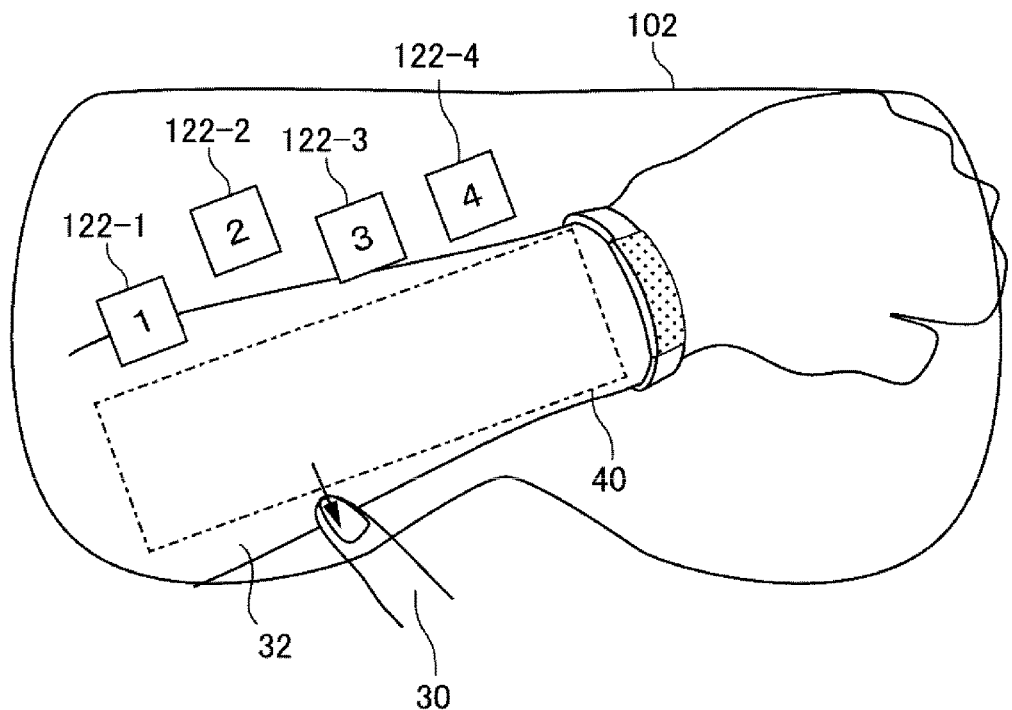
FIG. 33 are third diagrams illustrating a cancel operation.
Figure 33B:
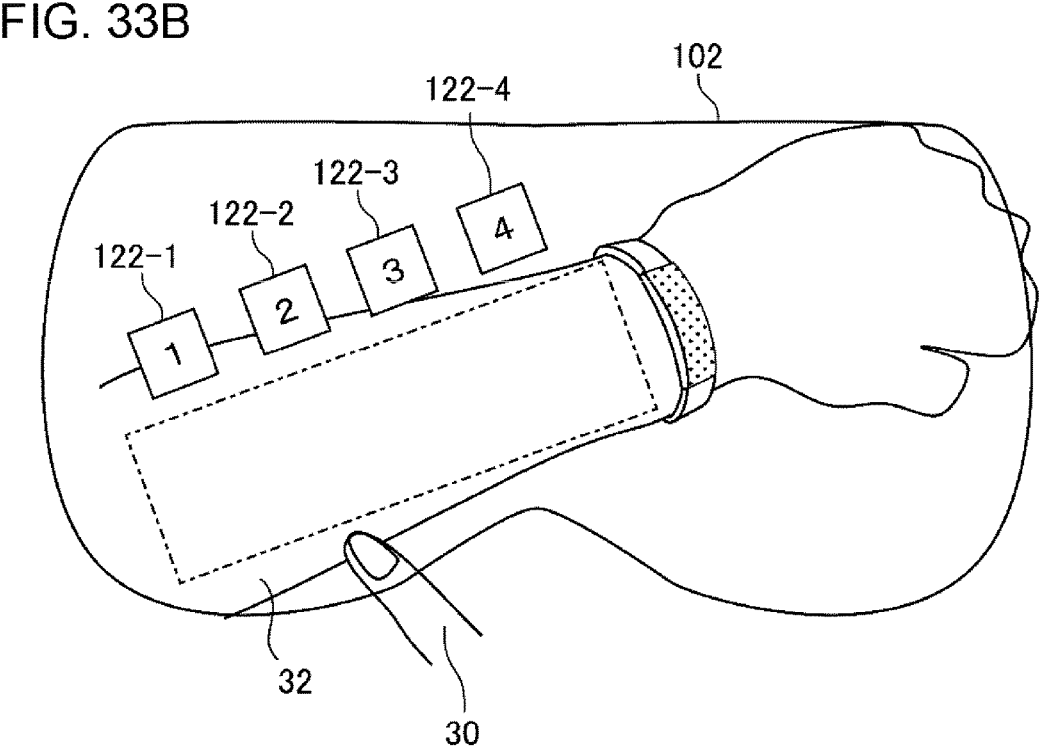

FIG. 33 are third diagrams illustrating the cancel operation. The user performs an input operation in which "the finger 30 is moved such that a part of the finger 30 comes out of the lower end of the operation region 40" (FIG. 33A). The recognition unit 2040 recognizes the input operation. The display control unit 2060 performs a process of "returning the selection image 122-2 selected as a selection candidate to a state in which the selection image is not selected as a selection candidate" in response to the input operation in the same manner as in FIG. 31B (FIG. 33B).

Here, there are various methods of recognizing the input operation in which "a part of the finger 30 comes to the outside of the operation region 40 from the lower end of the operation region 40". For example, the recognition unit 2040 recognizes the input operation by recognizing that "the finger 30 is moved downward, and then the finger 30 is not detected in the operation region 40". For example, the recognition unit 2040 recognizes the input operation by recognizing that "an area of the finger 30 detected in the predetermined region at the lower end of the operation region 40 is reduced by a predetermined value or greater". For example, the recognition unit 2040 may recognize the input operation by recognizing that "the finger 30 is included in the lower end region 134 of the operation region 40".

<Operation 8>

In the present example, it is assumed that there are other selection images 122 in addition to the selection image 122-1 to the selection image 122-4 illustrated in FIG. 27 and the like. For example, it is assumed that eight images including the selection image 122-1 to a selection image 122-8 are prepared in this order as the selection images 122. In this case, in the display method illustrated in FIG. 27 or the like, all of the selection images 122 cannot be displayed together.

Therefore, the user performs an input operation (hereinafter, a change operation) of changing the selection image 122 displayed on the display device 3040. For example, the user performs an input operation in which "the finger 30 is moved leftward or rightward at a speed of a predetermined value or greater". In a case where this input operation is recognized by the recognition unit 2040, the display control unit 2060 changes the selection image 122 to be displayed on the display device 3040.

Figure 34A:
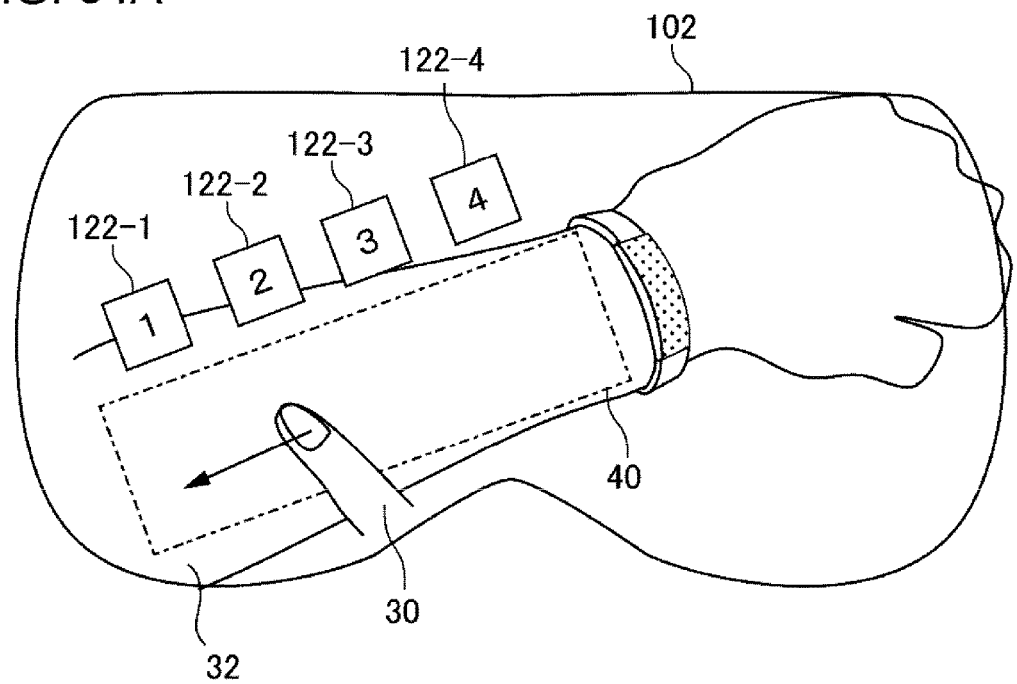
FIG. 34 are first diagrams illustrating a change operation.
Figure 34B:
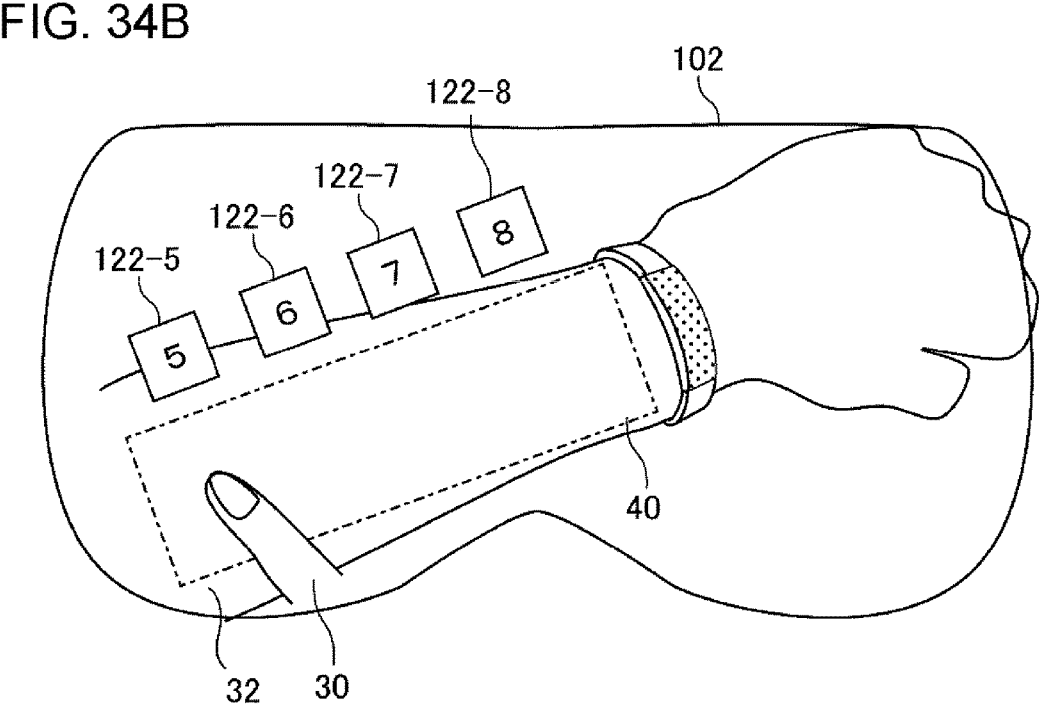

FIG. 34 are first diagrams illustrating the change operation. In FIG. 34A, the user performs an input operation in which "the finger 30 is moved in the leftward direction at a speed of a predetermined value or greater". The recognition unit 2040 recognizes this input operation. The display control unit 2060 performs a process of changing the selection images 122 displayed on the display device 3040 from the selection images 122-1 to 122-4 to the selection images (selection images 122-5 to 122-8) subsequent thereto in response to the input operation (FIG. 34B).

The recognition unit 2040 may calculate a speed of the finger 30 by calculating changes in positions of the finger 30 per unit time by using a plurality of captured images including the finger 30. For example, motion of the finger 30 in FIG. 34A is assumed to be indicated by changes in positions of the finger 30 in five consecutive captured images in a time series. In this case, for example, the recognition unit 2040 calculates a distance between a position of the finger 30 in the first captured image and a position of the finger 30 in the fifth captured image, and calculates a speed of the finger 30 by dividing the distance by a difference between time points at which the captured images are generated. Note that various techniques may be used as a technique of calculating a speed of an object included in a video, and thus a method of calculating a speed of the finger 30 is not limited to the above method.

Note that an input operation recognized by the recognition unit 2040 according to a speed of the finger 30 may include a plurality of types of operations depending on a speed thereof. For example, the recognition unit 2040 recognizes, as different input operations, an action of moving the finger 30 at a speed of below a first predetermined speed, an action of moving the finger 30 at a speed of the first predetermined speed or higher and below a second predetermined speed, and an action of moving the finger 30 at a speed of the second predetermined speed or higher.

Figure 35A:
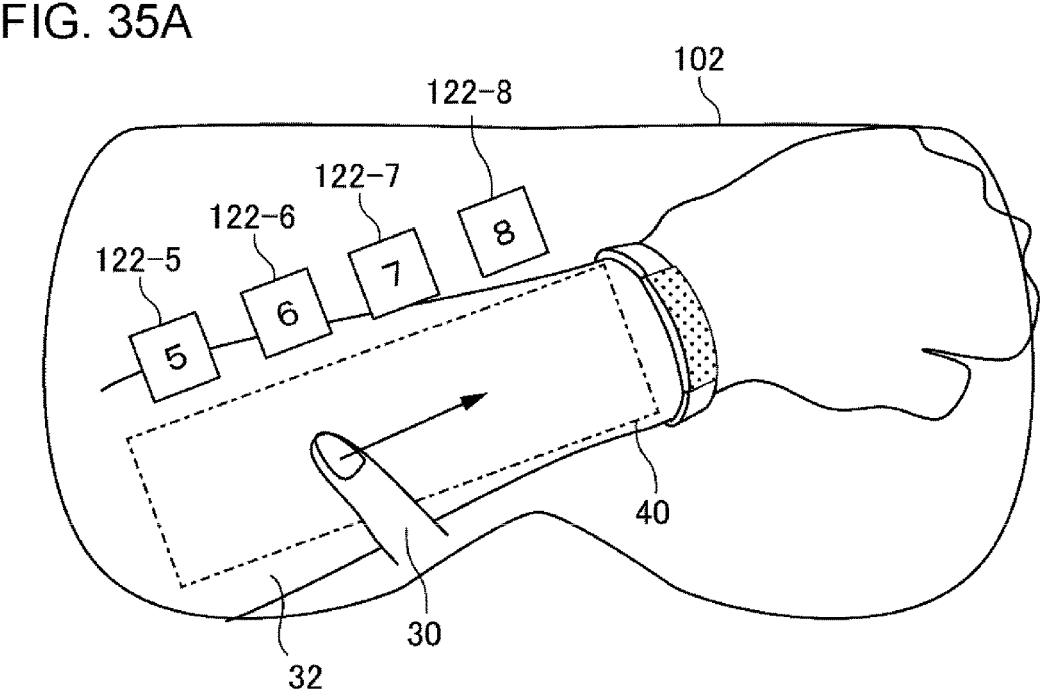
FIG. 35 are second diagrams illustrating a change operation.

FIG. 35 are second diagrams illustrating the change operation. In FIG. 35A, the selection images 122-5 to 122-8 are displayed. The user performs an input operation in which "the finger 30 is moved in the rightward direction at a speed of a predetermined value or greater". The recognition unit 2040 recognizes this input operation. The display control unit 2060 performs a process of changing the selection images 122 displayed on the display device 3040 from the selection images 122-5 to 122-8 to the selection images (selection images 122-1 to 122-4) prior thereto in response to the input operation (FIG. 33B).

<Operation 9>

Another example of the change operation will be described. The display control unit 2060 handles, as the change operation, an input operation in which "the finger 30 is retained at a left or right end of the operation region 40".

Figure 36A:
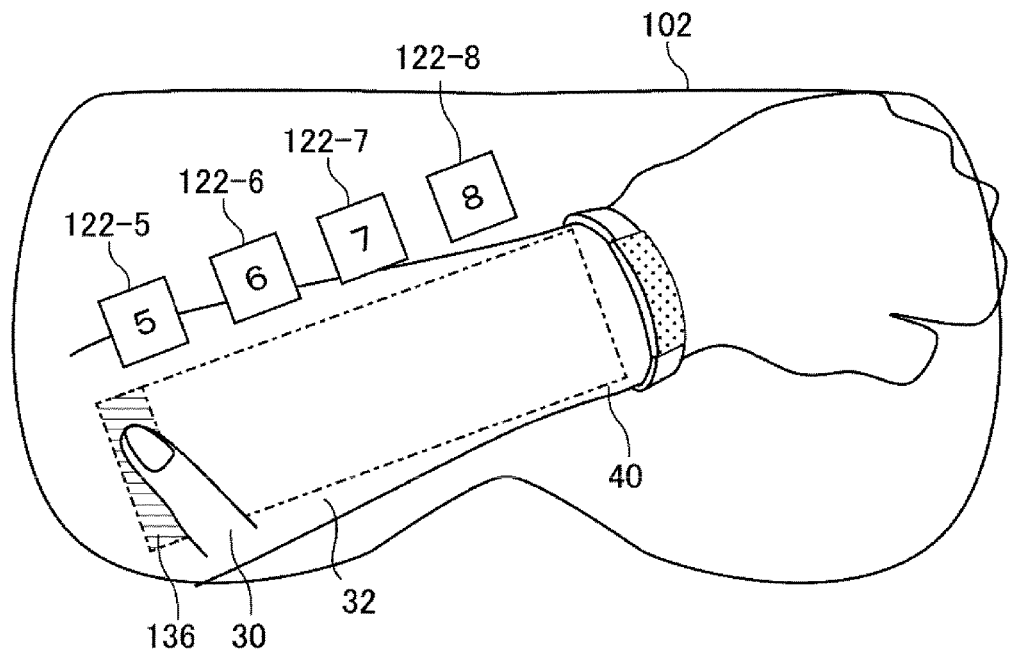
FIG. 36 are third diagrams illustrating a change operation.
Figure 36B:
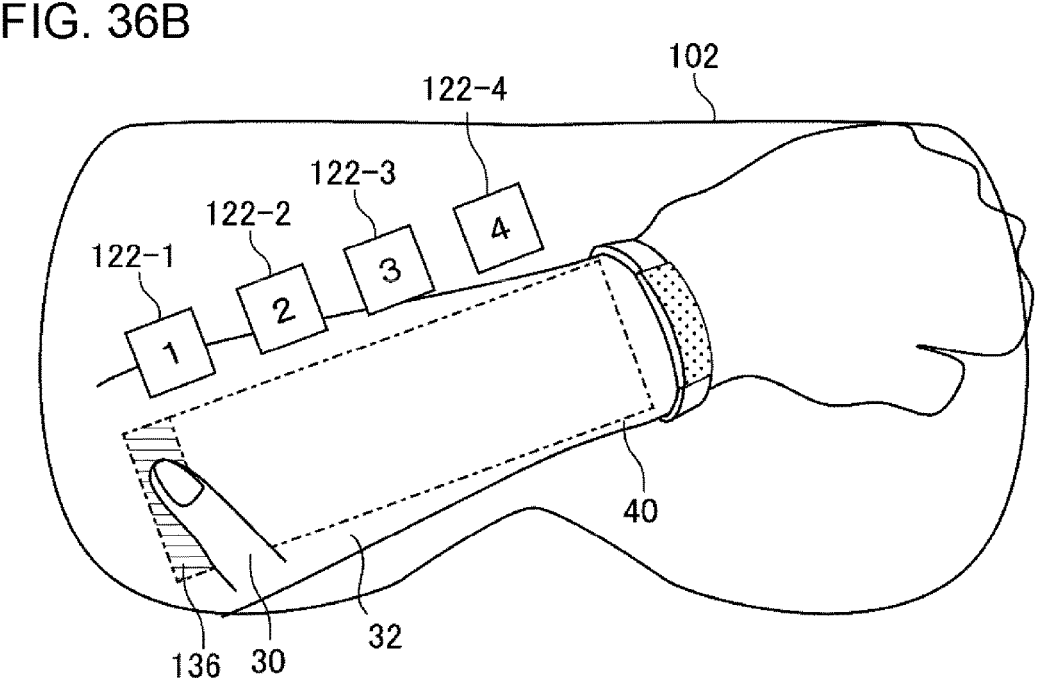

FIG. 36 are third diagrams illustrating the change operation. The user performs an input operation in which "the finger 30 is retained in a predetermined range (hereinafter, a left end region 136) at the left end of the operation region 40 for a predetermined time or more" (FIG. 36A). The recognition unit 2040 recognizes this input operation. Specifically, in a case where all positions of the finger 30 in respective captured images generated within a predetermined time are located in the left end region 136, the recognition unit 2040 recognizes the input operation. The display control unit 2060 performs a process of changing the selection images 122 displayed on the display device 3040 from the selection images 122-1 to 122-4 to the selection images (selection images 122-5 to 122-8) subsequent thereto in response to the input operation in the same manner as in FIG. 34B (FIG. 36B).

Figure 35B:
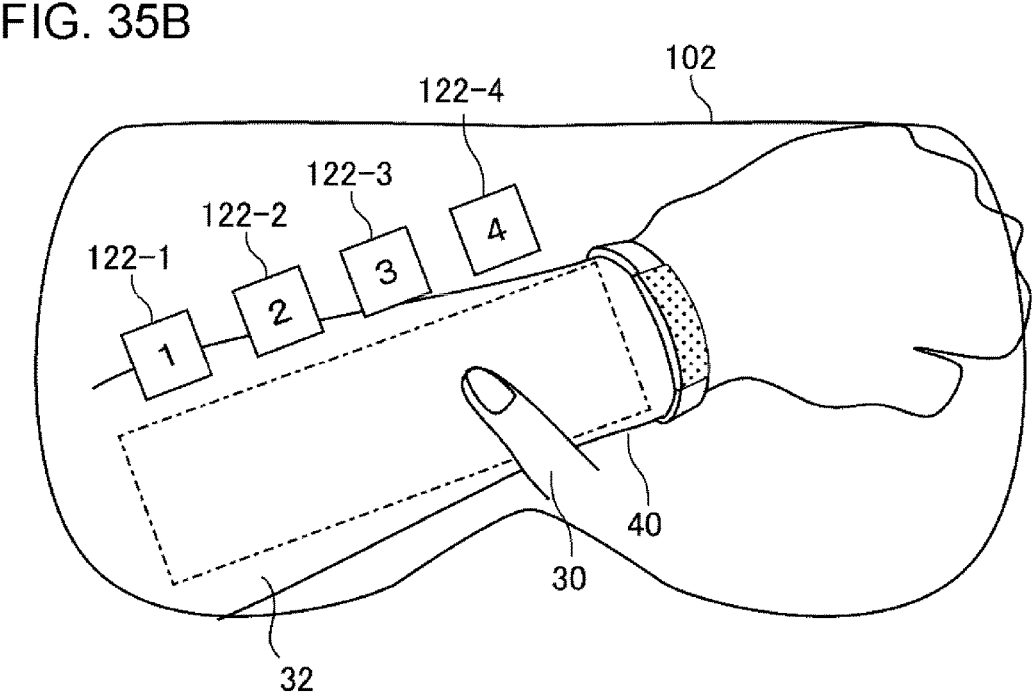
Figure 37A:
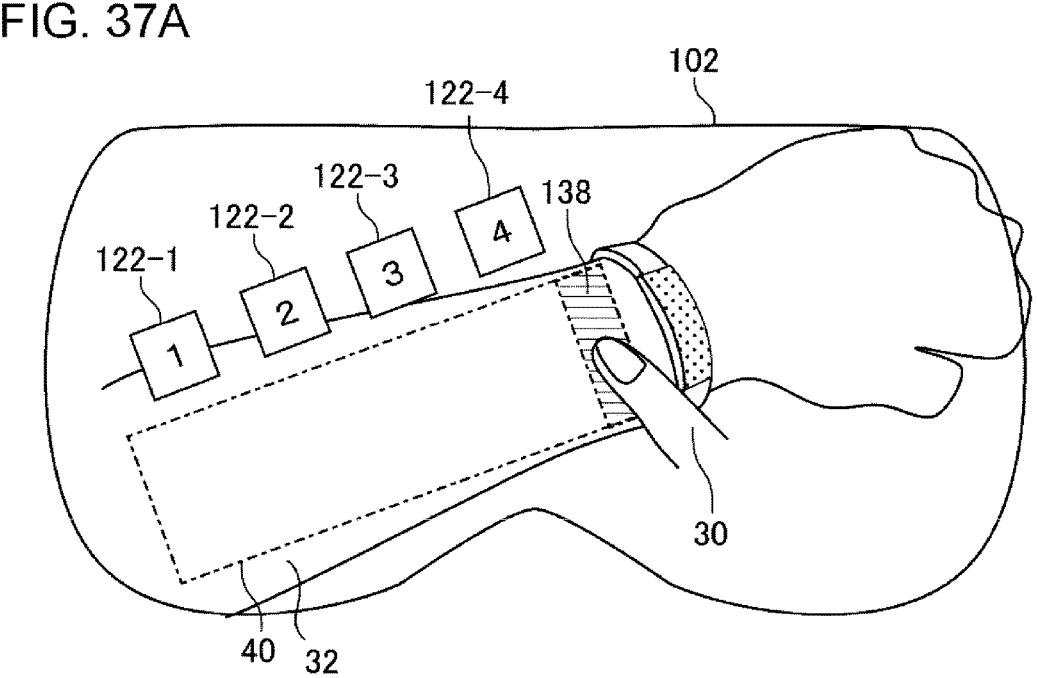
FIG. 37 are fourth diagrams illustrating a change operation.
Figure 37B:
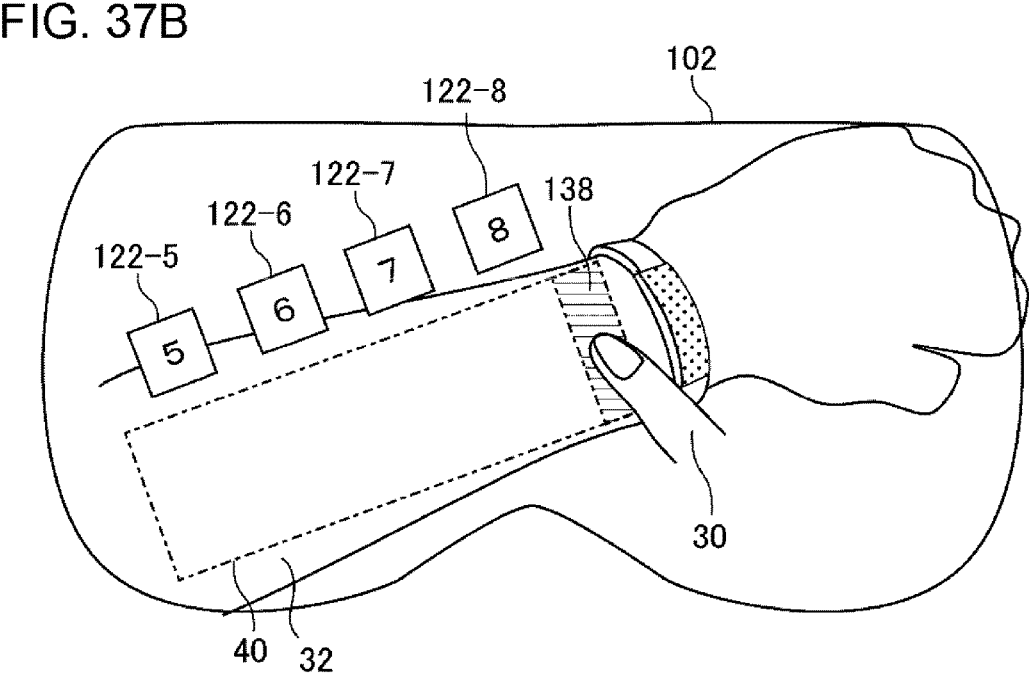

FIG. 37 are fourth diagrams illustrating the change operation. The user performs an input operation in which "the finger 30 is retained in a predetermined range (hereinafter, a right end region 138) at the right end of the operation region 40 for a predetermined time or more" (FIG. 37A). The recognition unit 2040 recognizes this input operation. Specifically, in a case where all positions of the finger 30 in respective captured images generated within a predetermined time are located in the right end region 138, the recognition unit 2040 recognizes the input operation. The display control unit 2060 performs a process of changing the selection images 122 displayed on the display device 3040 from the selection images 122-5 to 122-8 to the selection images (selection images 122-1 to 122-4) prior thereto in response to the input operation in the same manner as in FIG. 35B (FIG. 35B).

<Operation 10>

Still another example of the change operation will be described. The display control unit 2060 handles, as the change operation, an input operation in which "the finger 30 comes to the outside of the operation region 40 from the left or right end of the operation region 40".

Figure 38A:
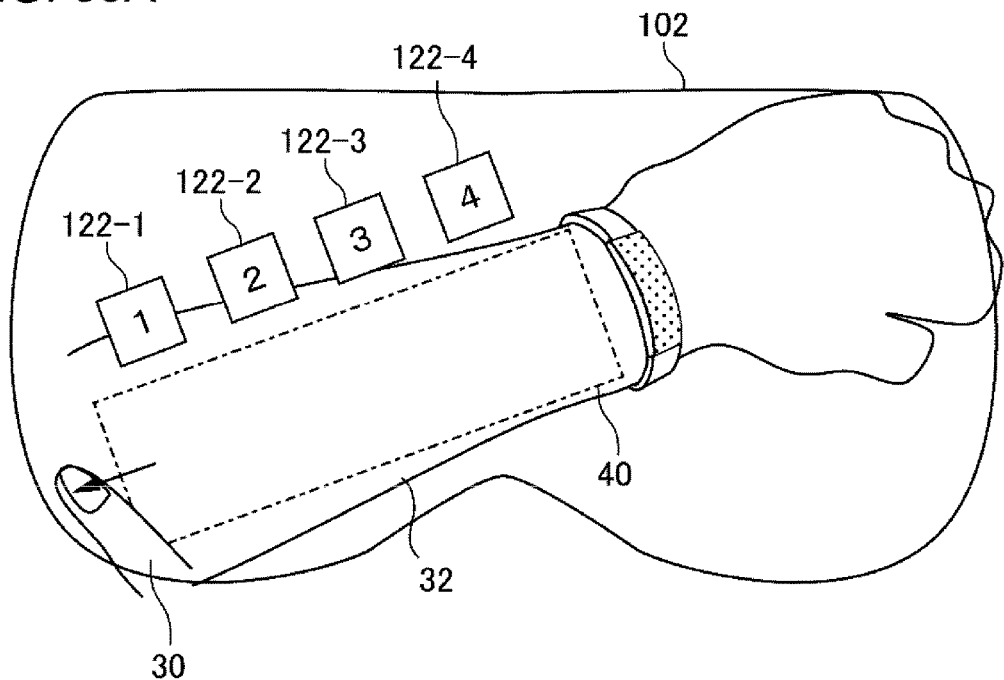
FIG. 38 are fifth diagrams illustrating a change operation.
Figure 38B:
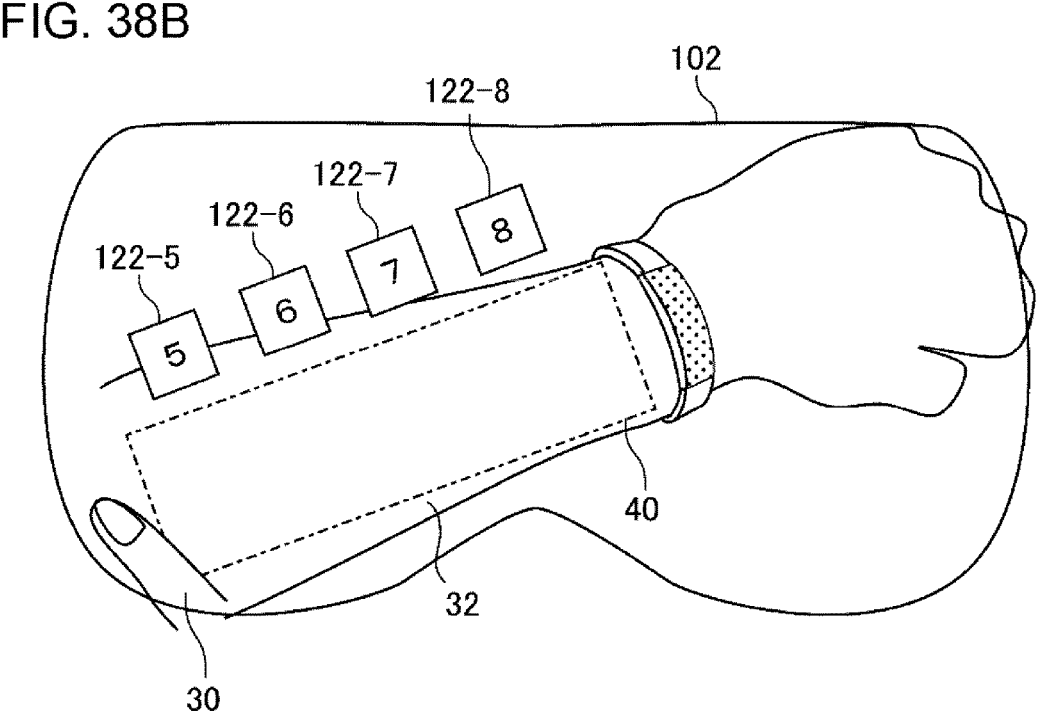

FIG. 38 are fifth diagrams illustrating the change operation. The user performs an input operation in which "a part of the finger 30 comes to the outside the operation region 40 from the left end of the operation region 40" (FIG. 38A). The recognition unit 2040 recognizes the input operation. The display control unit 2060 performs a process of changing the selection images 122 displayed on the display device 3040 from the selection images 122-1 to 122-4 to the selection images (selection images 122-5 to 122-8) subsequent thereto in response to the input operation in the same manner as in FIG. 34B (FIG. 38B).

Here, there are various methods of recognizing the input operation in which "a part of the finger 30 comes to the outside of the operation region 40 from the left end of the operation region 40". For example, the recognition unit 2040 recognizes the input operation by recognizing that "the left end of the finger 30 touches the left end of the operation region 40, and then the finger 30 is further moved leftward". For example, the recognition unit 2040 recognizes the input operation by recognizing that "the finger 30 is being moved leftward, and an area of the finger 30 included in the operation region 40 is reduced". For example, the recognition unit 2040 may recognize the input operation by recognizing that "the finger 30 is included in the left end region 136 of the operation region 40".

Figure 39A:
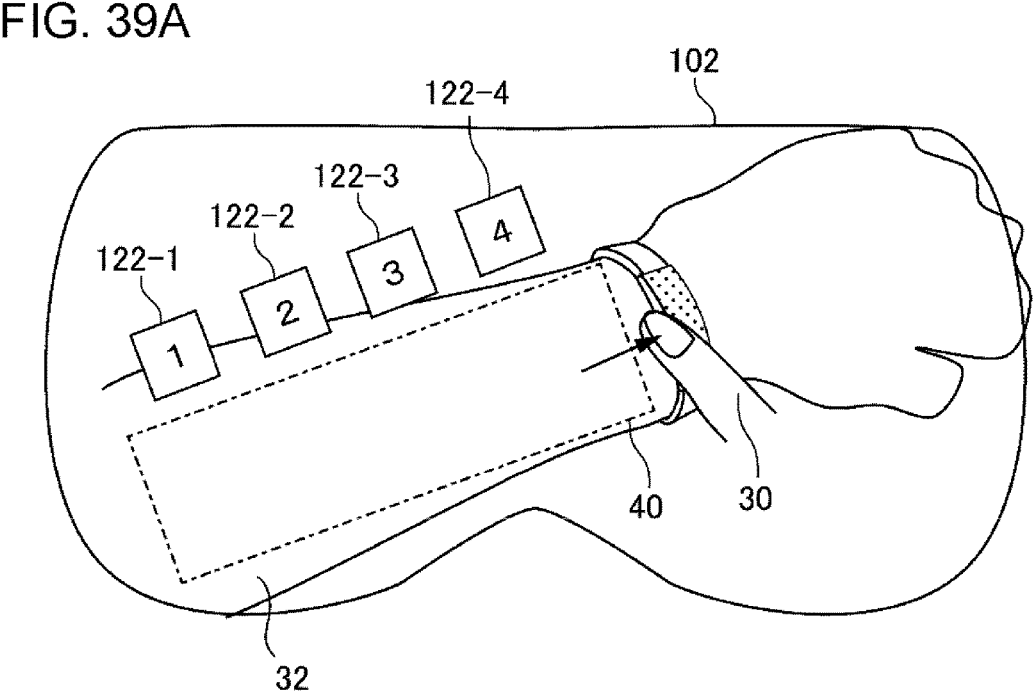
FIG. 39 are sixth diagrams illustrating a change operation.
Figure 39B:
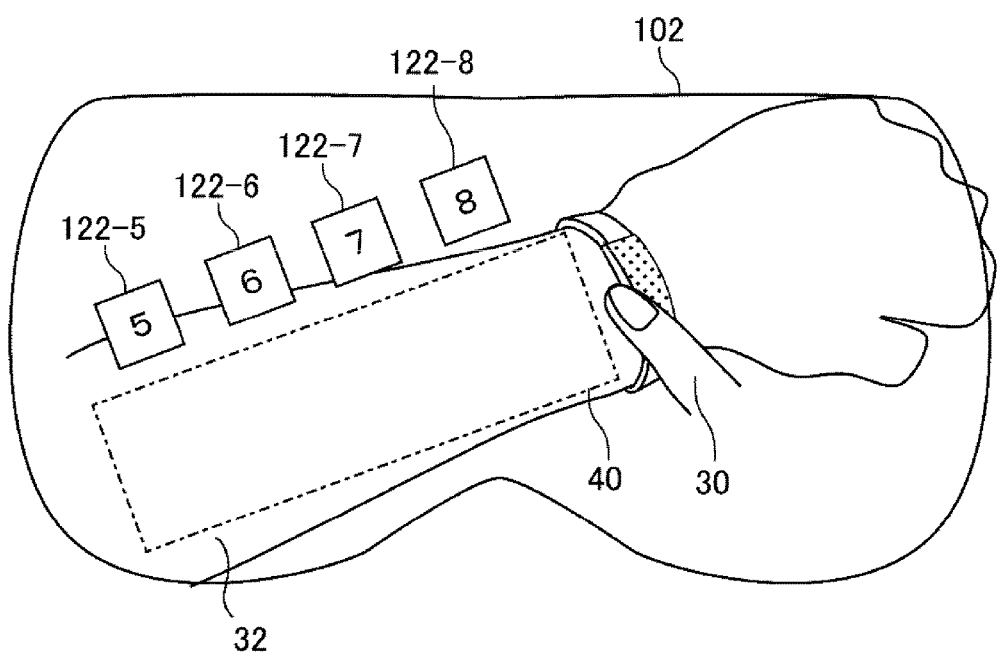

FIG. 39 are sixth diagrams illustrating the change operation. The user performs an input operation in which "a part of the finger 30 comes to the outside the operation region 40 from the right end of the operation region 40" (FIG. 39A). The recognition unit 2040 recognizes the input operation. The display control unit 2060 performs a process of changing the selection images 122 displayed on the display device 3040 from the selection images 122-5 to 122-8 to the selection images (selection images 122-1 to 122-4) prior thereto in response to the input operation in the same manner as in FIG. 35B (FIG. 39B).

Here, there are various methods of recognizing the input operation in which "a part of the finger 30 comes to the outside of the operation region 40 from the right end of the operation region 40". For example, the recognition unit 2040 recognizes the input operation by recognizing that "the right end of the finger 30 touches the right end of the operation region 40, and then the finger 30 is further moved rightward". For example, the recognition unit 2040 recognizes the input operation by recognizing that "the finger 30 is being moved rightward, and an area of the finger 30 included in the operation region 40 is reduced". For example, the recognition unit 2040 may recognize the input operation by recognizing that "the finger 30 is included in the right end region 138 of the operation region 40".

<Correspondence between Input Operation and Process in Display Control Unit 2060>

Any correspondence relationship between the type of input operation (for example, an input operation in which the finger 30 is retained in the same location for a predetermined time or more) recognized by the recognition unit 2040 and a process (for example, a candidate selection process of setting the selection image 122 as a selection candidate) performed by the display control unit 2060 may be adopted, and is not limited to the above-described correspondence relationship. Such a correspondence relationship may be set in the information processing apparatus 2000 in advance, may be stored in a storage device which can be accessed from the information processing apparatus 2000, or may be set by the user.

For example, in the above-described example, the display control unit 2060 handles an input operation in which "the finger 30 moves a predetermined distance or more in the direction of coming close to the selection image 122 which is a selection candidate" as a determination operation, and handles an input operation in which "the finger 30 moves a predetermined distance or more in the direction of becoming distant from the selection image 122 which is a selection candidate" as a cancel operation. However, on the contrary, the display control unit 2060 may handle an input operation in which "the finger 30 moves a predetermined distance or more in the direction of becoming distant from the selection image 122 which is a selection candidate" as a determination operation, and handles an input operation in which "the finger 30 moves a predetermined distance or more in the direction of coming close to the selection image 122 which is a selection candidate" as a cancel operation.

<Examples of Method of Not Changing Display on Display Device 3040>

The user may want the finger 30 to come out of the operation region 40 such that display on the display device 3040 is not changed. For example, the user may want an input operation to be temporarily stopped in the middle of performing each of the above-described operations. For example, as illustrated in FIG. 27B, the finger 30 may be desired to come out of the operation region 40 without performing either a determination operation or a cancel operation in a state in which the selection image 122-2 is a selection candidate.

In this case, the user may perform an action which is not handled as the above-described candidate selection operation, determination operation, cancel operation, or change operation by the display control unit 2060. For example, the user slowly moves the finger 30 to come out of the left or right end of the operation region 40. Here, the term "slowly" indicates that a speed is less than a predetermined value in an input operation in which "the finger 30 is moved rightward at a speed of the predetermined value or greater". Since a speed of the finger 30 is less than the predetermined value, even if the finger 30 is moved leftward or rightward, this is not recognized as a change operation. However, in this case, it is assumed that the display control unit 2060 is set not to handle, as a change operation, the input operation in which "the finger 30 comes out of the left or right end of the operation region 40".

Suppose that the recognition unit 2040 recognizes not only positions of the finger 30 in a horizontal direction and a vertical direction but also a position where the finger 30 is located in a depth direction (a position in the z direction in the coordinate system 42 defined by the marker image 16). In other words, the recognition unit 2040 recognizes an input operation on the basis of a three-dimensional position of the finger 30 in the coordinate system 42 defined by the marker image 16.

In this case, for example, the operation region extraction unit 2020 extracts, as an operation region, a cuboid which has the operation region 40 indicated by the above-described plane as a bottom, and has a depth of a predetermined value. In the above-described way, for example, in a case where an action with the content that "the finger 30 moves a predetermined distance or more in the direction of coming close to the selection image 122 which is a selection candidate" is performed at a position separated from the arm 32 by the predetermined value or greater, the action is not recognized as an input operation. Therefore, the user can cause the display control unit 2060 not to perform the various processes by separating the finger 30 from the arm 32.

Note that various methods of the recognition unit 2040 recognizing a position of the finger 30 in the depth direction may be used. For example, it is assumed that the camera 20 is a three-dimensional camera. In this case, the recognition unit 2040 can acquire a three-dimensional position of the finger 30 included in a captured image generated by the camera 20, and can thus recognize a position of the finger 30 in the depth direction. For example, the recognition unit 2040 may estimate a position of the finger 30 in the depth direction on the basis of a size of the finger 30 included in a captured image. For example, the recognition unit 2040 calculates a position of the finger 30 in the depth direction on the basis of a ratio between sizes of the arm 32 and the finger 30 of the user included in a captured image.

The display control unit 2060 may change handling of an input operation according to a size of the finger 30 included in the operation region 40 instead of recognizing a three-dimensional position of the finger 30. For example, only in a case where the action with the content that "the finger 30 moves a predetermined distance or more in the direction of coming close to the selection image 122 which is a selection candidate" is performed in a situation in which a proportion of a region indicating the finger 30 in the operation region 40 is equal to or less than a predetermined value, the display control unit 2060 handles an input operation recognized on the basis of the action as a cancel operation or the like. The situation in which "a proportion of a region indicating the finger 30 in the operation region 40 is equal to or less than a predetermined value" indicates that a size of the finger 30 in a captured image is small. This also indicates that the finger 30 is located near the arm 32.

On the other hand, in a case where the action with the content that "the finger 30 moves a predetermined distance or more in the direction of coming close to the selection image 122 which is a selection candidate" is performed in a situation in which a proportion of a region indicating the finger 30 in the operation region 40 is more than the predetermined value, the display control unit 2060 does not handle an input operation recognized on the basis of the action as a cancel operation or the like. The situation in which "a proportion of a region indicating the finger 30 in the operation region 40 is more than the predetermined value" indicates that a size of the finger 30 in a captured image is large. This also indicates that the finger 30 is located at a position far from the arm 32.

Example 2

A concrete operation of the information processing apparatus 2000 of Example Embodiment 3 will be described by using another Example. In the present example, a description will be made of an operation which is different from an operation on the selection image 122 in the information processing system 3000 having the same configuration as that in Example 1. Specifically, an input operation on a slide bar will be described.

FIG. 40 are first diagrams illustrating an input operation on a slide bar. In FIG. 40, a slide bar 140 is displayed in the operation region 40. The slide bar 140 has a knob 142. In this example, if the knob 142 is moved rightward, an image 150 is enlarged, and if the knob 142 is moved leftward, the image 150 is shrunk.

Figure 40A:
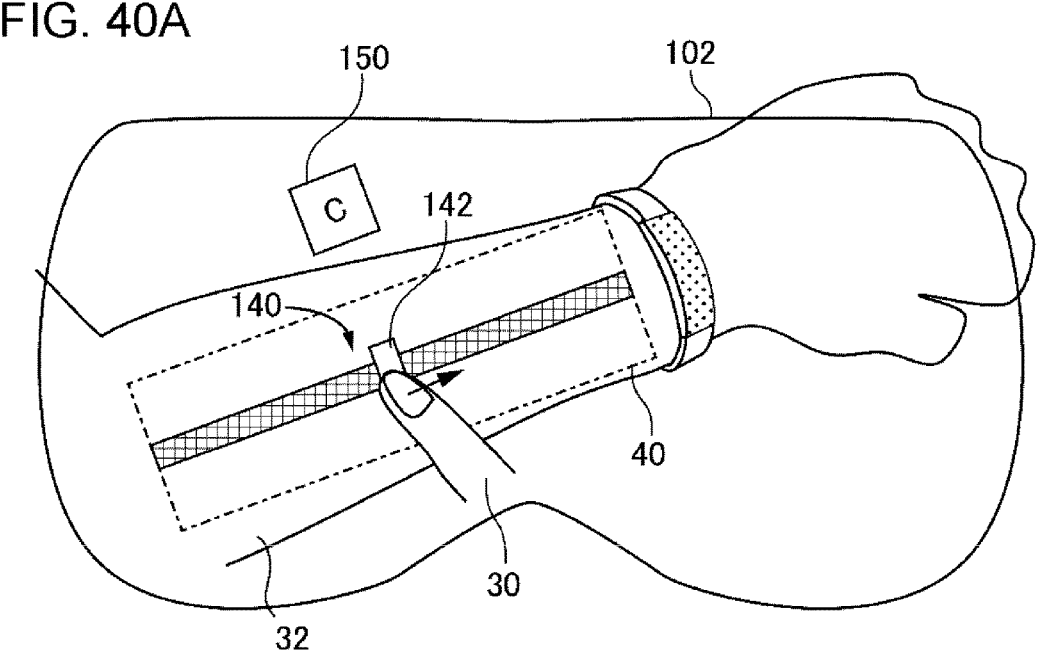
FIG. 40 are first diagrams illustrating an input operation on a slide bar.
Figure 40B:
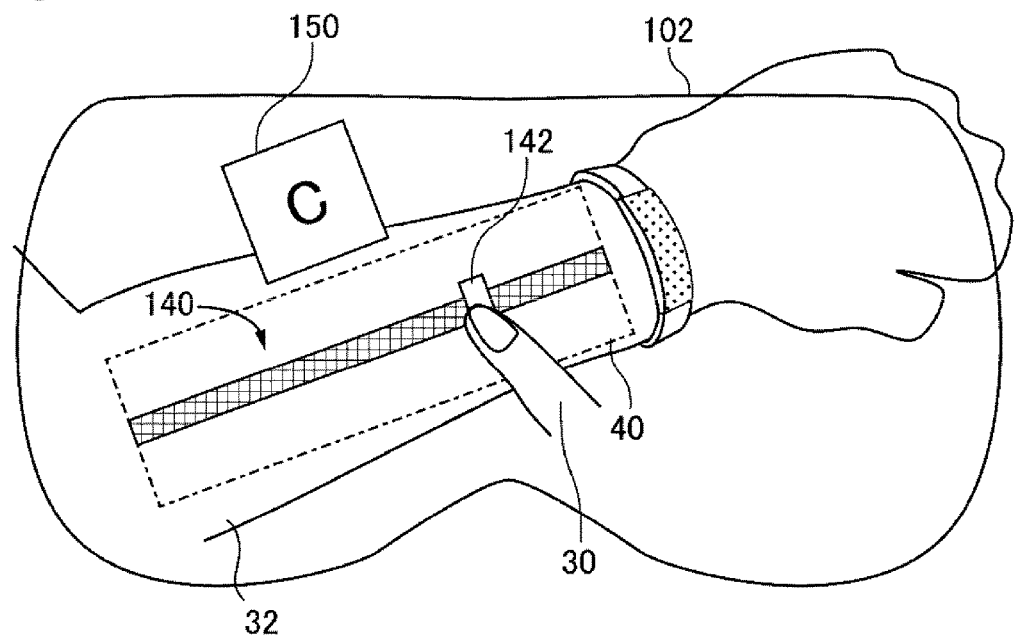

The user performs an input operation in which "the finger 30 is moved rightward in a state in which the finger 30 is placed to overlap the knob 142" (FIG. 40A). The recognition unit 2040 recognizes the input operation. The display control unit 2060 performs a process of changing a position where the knob 142 is displayed to a position to which the finger 30 is moved in response to the input operation (FIG. 40B). Since the knob 142 is moved rightward, the display control unit 2060 performs a process of enlarging the image 150 according to a distance which the knob 142 moves (a distance which the finger 30 moves) (FIG. 40B).

Figure 41A:
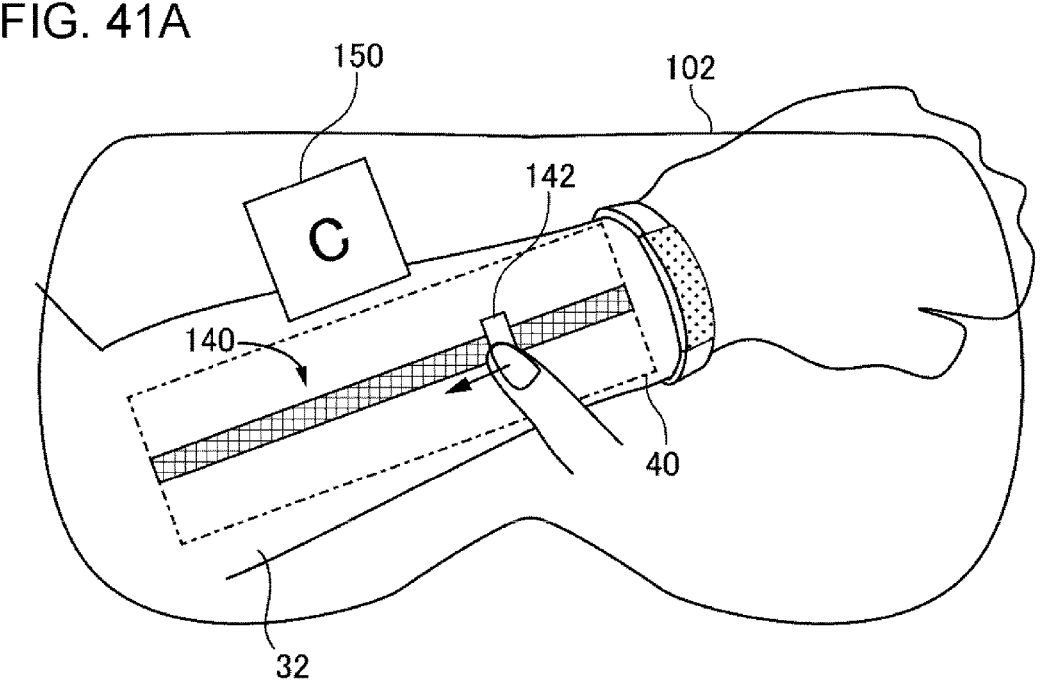
FIG. 41 are second diagrams illustrating an input operation on the slide bar.
Figure 41B:
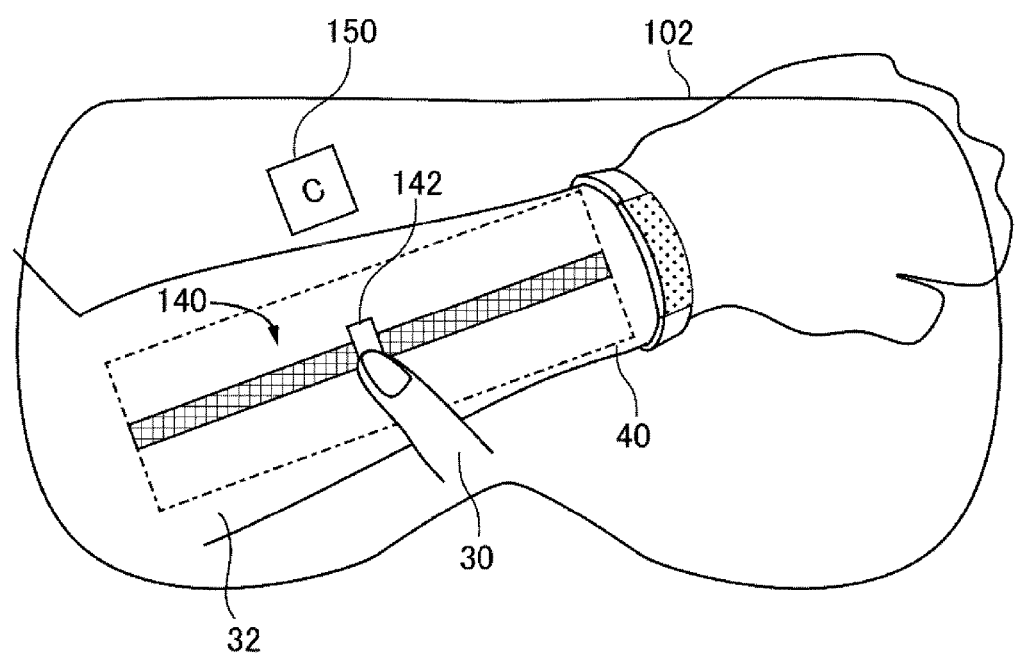

FIG. 41 are second diagrams illustrating an input operation on the slide bar. The user performs an input operation in which "the finger 30 is moved leftward in a state in which the finger 30 is placed to overlap the knob 142" (FIG. 41A). The recognition unit 2040 recognizes the input operation. The display control unit 2060 performs a process of changing a position where the knob 142 is displayed to a position to which the finger 30 is moved in response to the input operation (FIG. 41B). Since the knob 142 is moved leftward, the display control unit 2060 performs a process of shrinking the image 150 according to a distance which the knob 142 moves (a distance which the finger 30 moves) (FIG. 41B).

Figure 42A:
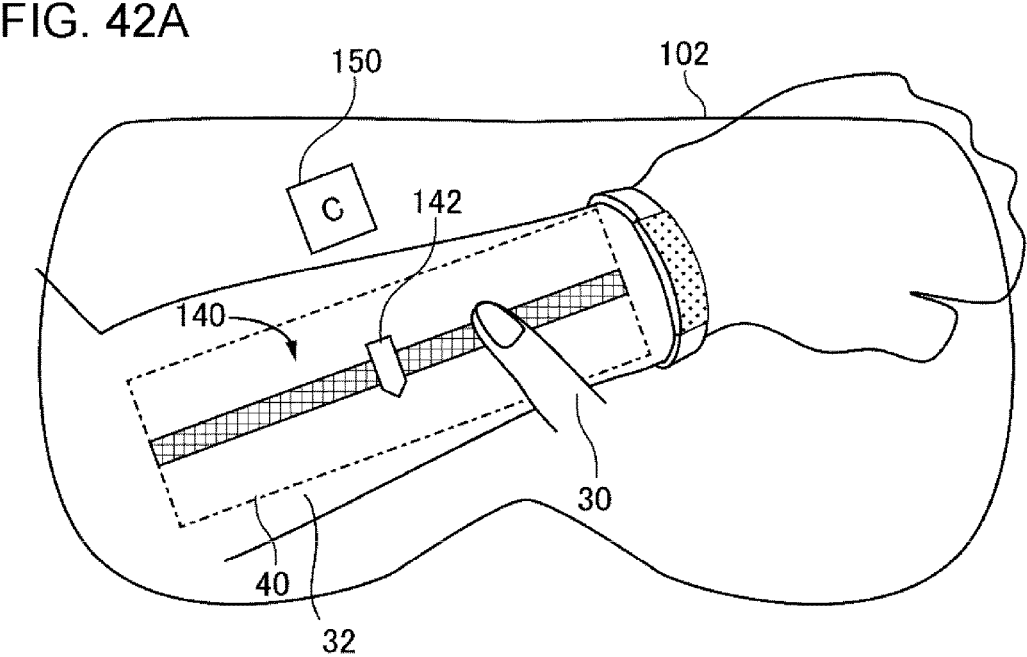
FIG. 42 are third diagrams illustrating an input operation on the slide bar.
Figure 42B:
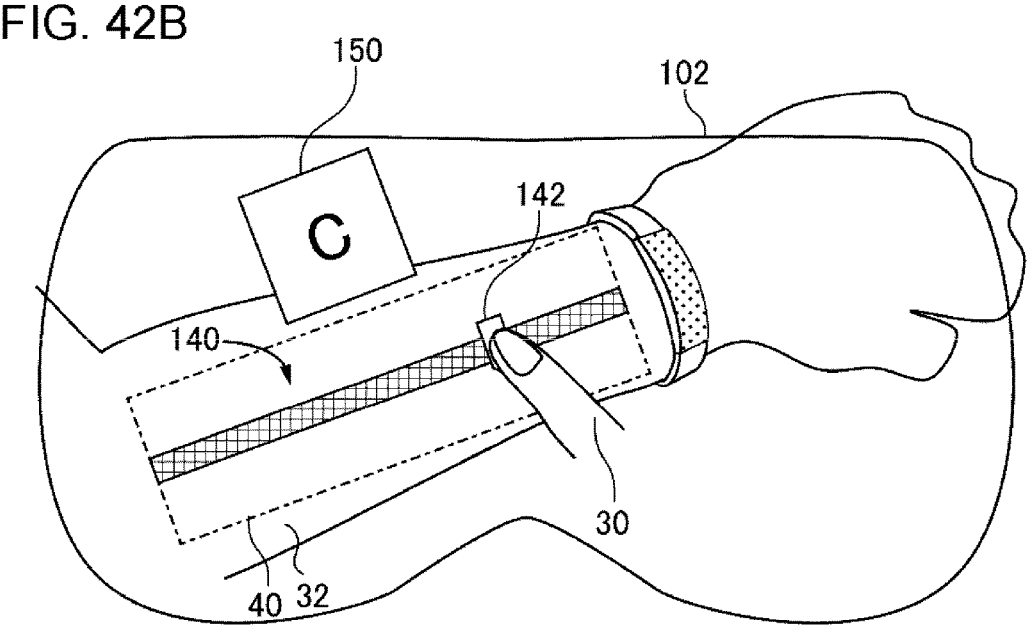

A description will be made of other variations of operations of moving the knob 142. FIG. 42 are third diagrams illustrating an input operation on the slide bar. In FIG. 42A, the user performs an input operation in which "the finger 30 is retained at a position on the slide bar 140 at which the knob 142 is not displayed for a predetermined time or more". The recognition unit 2040 recognizes the input operation. The display control unit 2060 performs a process of changing a display position of the knob 142 to a position of the finger 30 in response to the input operation (FIG. 42B). Since the knob 142 is moved rightward, the display control unit 2060 performs a process of enlarging the image 150 according to a distance which the knob 142 moves (a distance which the finger 30 moves) (FIG. 42B).

Note that, in the situation illustrated in FIG. 42A, it is assumed that an input operation of retaining the finger 30 on the left side of the knob 142 instead of the right side thereof is performed. In this case, since the knob 142 is moved leftward, the display control unit 2060 performs a process of reducing the image 150 according to a distance which the knob 142 moves.

As mentioned above, the example embodiments of the present invention have been described with reference to the drawings, but these are only examples of the present invention, and combinations of the example embodiments and various configurations other than the example embodiments may be employed.

For example, a process performed by the information processing apparatus 2000 according to an input operation recognized by the recognition unit 2040 is not limited to control of the display device 3040 performed by the display control unit 2060. For example, the information processing apparatus 2000 may perform various processes such as a process of copying various pieces of data, a process of deleting data, a process of encrypting the data, a process of reproducing the data, and a process of activating an application according to an input operation recognized by the recognition unit 2040.

For example, it is assumed that, in Example Embodiment 1, file browsers are displayed on the display device 3040, and the selection images 122 (refer to FIG. 27 or the like) are icons respectively indicating files. In this case, for example, if an icon which is the determination operation target is a document file, the information processing apparatus 2000 activates an application such as document file viewer software, and opens the document file with the activated application. Similarly, if an icon which is the determination operation target is a music file or a moving image file, the information processing apparatus 2000 activates an application such as music or video play software, and reproduces the music file or the moving image file with the activated application. Similarly, if an icon which is the determination operation target is an icon for an application, the information processing apparatus 2000 activates the application.

Similarly, in Example 1, an input operation or the like for a deletion process is defined. In this case, for example, if the user performs an input operation for a deletion process in a state in which a certain selection image 122 is a selection candidate, the information processing apparatus 2000 deletes data corresponding to the selection image 122 which is a selection candidate.

An execution result of each of the above-described processes is not necessarily displayed on the display device 3040.

Hereinafter, examples of reference embodiments are added.

1. An information processing system including:
a marker that is an object attached to a user or is a part of the body of the user; and
an information processing apparatus,
wherein the information processing apparatus includes
an operation region extraction unit that extracts an operation region from a captured image generated by a camera on the basis of a position of the marker, and
a recognition unit that calculates a position or motion of an operation body in the operation region, and recognizes an input operation on the basis of the calculated position or motion.

2. The information processing system according to 1.,
wherein the marker is an object attached to an arm portion of the user, and
wherein the operation region is a region on the arm portion.

3. The information processing system according to 1.,
wherein the marker is an image displayed on a display of a device attached to the user.

4. The information processing system according to any one of 1. to 3., wherein the recognition unit recognizes an input operation corresponding to a speed of the operation body.

5. The information processing system according to any one of 1. to 4., further including: a display device that displays an image,
wherein the information processing apparatus includes a display control unit that displays an operation region image indicating the operation region on the display device.

6. The information processing system according to 5.,
wherein the display device is a display device of a transmissive head mounted display, and
wherein the display control unit converts a position of the operation region image on the captured image into a position on the display device on the basis of a correspondence relationship between a position on the captured image and a position on the display device, and displays the operation region image at the position obtained through conversion on the display device.

7. The information processing system according to 5.,
wherein the display device is a display device of a non-transmissive head mounted display or a projector, and
wherein the display control unit displays on the display device the captured image on which the operation region image is superimposed at a position from which the operation region is extracted.

8. The information processing system according to any one of 5. to 7.,
wherein the display control unit performs:
displaying an operation target image which is an image indicating an input operation target on the display device, and
changing a display on the display device in response to an input operation recognized by the recognition unit.

9. The information processing system according to 8.,
wherein the recognition unit recognizes:
an operation of locating the operation body near the operation target image;
an operation of causing the operation body to come close to the operation target image;
an operation of causing the operation body to become distant from the operation target image;
an operation of causing the operation body to come out of the operation region; or
an operation of locating the operation body within a region in a predetermined range at an end of the operation region.

10. The information processing system according to 9.,
wherein the display control unit performs:
a process of setting the operation target image as a selection candidate according to recognition of the operation of locating the operation body near the operation target image; and
a process of determining the selection candidate as a selection target in response to recognition of any of an input operation of causing the operation body to come close to the selection candidate, an operation of locating the operation body in a predetermined region at an upper end of the operation region, and an operation of causing the operation body to come to the outside over the upper end of the operation region, in a state in which the operation target image is the selection candidate.

11. The information processing system according to 10., wherein the display control unit performs, in a state in which the operation target image is the selection candidate, a process of changing the operation target image being a selection candidate into a state in which the operation target image is not a selection candidate in response to recognition of any of an operation of causing the operation body to become distant from the selection candidate, an operation of locating the operation body in a predetermined region at a lower end of the operation region, and an operation of causing the operation body to come to the outside over the lower end of the operation region.

12. The information processing system according to any one of 8. to 11.,
wherein the recognition unit recognizes an operation of moving the operation body at a speed of a predetermined value or greater, and
wherein the display control unit performs a process of changing the operation target image displayed on the display device to another operation target image in response to recognition of the operation moving the operation body at a speed of the predetermined value or greater.

13. The information processing system according to any one of 8. to 12.,
wherein the display control unit displays an operation target image indicating a slide bar on the display device,
wherein the recognition unit recognizes an input operation in which the operation body overlaps a knob of the slide bar, and the operation body is moved along a bar of the slide bar, and
wherein the display control unit changes a display position of the knob of the slide bar to a position to which the operation body has been moved.

14. An information processing apparatus including:
an operation region extraction unit that extracts an operation region from a captured image generated by a camera on the basis of a position of a marker; and
a recognition unit that calculates a position or motion of an operation body in the operation region, and recognizes an input operation on the basis of the calculated position or motion,
wherein the marker is an object attached to a user or is a part of the body of the user.

15. The information processing apparatus according to 14.,
wherein the marker is an object attached to an arm portion of the user, and
wherein the operation region is a region on the arm portion.

16. The information processing apparatus according to 14., wherein the marker is an image displayed on a display of a device attached to the user.

17. The information processing apparatus according to any one of 14. to 16., wherein the recognition unit recognizes an input operation corresponding to a speed of the operation body.

18. The information processing apparatus according to any one of 14. to 17., further including a display control unit that displays an operation region image indicating the operation region on a display device.

19. The information processing apparatus according to 18.,
wherein the display device is a display device of a transmissive head mounted display, and
wherein the display control unit converts a position of the operation region image on the captured image into a position on the display device on the basis of a correspondence relationship between a position on the captured image and a position on the display device, and displays the operation region image at the position obtained through conversion on the display device.

20. The information processing apparatus according to 18.,
wherein the display device is a display device of a non-transmissive head mounted display or a projector, and
wherein the display control unit displays on the display device the captured image on which the operation region image is superimposed at a position from which the operation region is extracted.

21. The information processing apparatus according to any one of 18. to 20.,
wherein the display control unit performs:
displaying an operation target image which is an image indicating an input operation target on the display device; and
changing a display on the display device in response to an input operation recognized by the recognition unit.

22. The information processing apparatus according to 21.,
wherein the recognition unit recognizes:
an operation of locating the operation body near the operation target image;
an operation of causing the operation body to come close to the operation target image;
an operation of causing the operation body to become distant from the operation target image;

an operation of causing the operation body to come out of the operation region; or an operation of locating the operation body within a region in a predetermined range at an end of the operation region.

23. The information processing apparatus according to 22., wherein the display control unit performs:

a process of setting the operation target image as a selection candidate according to recognition of the operation of locating the operation body near the operation target image, and a process of determining the selection candidate as a selection target in response to recognition of any of an input operation of causing the operation body to come close to the selection candidate, an operation of locating the operation body in a predetermined region at an upper end of the operation region, and an operation of causing the operation body to come to the outside over the upper end of the operation region, in a state in which the operation target image is the selection candidate.

24. The information processing apparatus according to 23., wherein the display control unit performs, in a state in which the operation target image is the selection candidate, a process of changing the operation target image being a selection candidate into a state in which the operation target image is not a selection candidate in response to recognition of any of an operation of causing the operation body to become distant from the selection candidate, an operation of locating the operation body in a predetermined region at a lower end of the operation region, and an operation of causing the operation body to come to the outside over the lower end of the operation region.

25. The information processing apparatus according to any one of 21. to 24., wherein the recognition unit recognizes an operation of moving the operation body at a speed of a predetermined value or greater, and wherein the display control unit performs a process of changing the operation target image displayed on the display device to another operation target image in response to recognition of the operation moving the operation body at a speed of the predetermined value or greater.

26. The information processing apparatus according to any one of 21. to 25., wherein the display control unit displays an operation target image indicating a slide bar on the display device, wherein the recognition unit recognizes an input operation in which the operation body overlaps a knob of the slide bar, and the operation body is moved along a bar of the slide bar, and wherein the display control unit changes a display position of the knob of the slide bar to a position to which the operation body has been moved.

27. A control method executed by a computer, including:

an operation region extraction step of extracting an operation region from a captured image generated by a camera on the basis of a position of a marker; and a recognition step of calculating a position or motion of an operation body in the operation region, and recognizes an input operation on the basis of the calculated position or motion, wherein the marker is an object attached to a user or is a part of the body of the user.

28. The control method according to 27., wherein the marker is an object attached to an arm portion of the user, and wherein the operation region is a region on the arm portion.

29. The control method according to 27., wherein the marker is an image displayed on a display of a device attached to the user.

30. The control method according to any one of 27. to 29., wherein, in the recognition step, recognizing an input operation corresponding to a speed of the operation body.

31. The control method according to any one of 27. to 30., further including a display control step of displaying an operation region image indicating the operation region on a display device.

32. The control method according to 31., wherein the display device is a display device of a transmissive head mounted display, and wherein, in the display control step, converting a position of the operation region image on the captured image into a position on the display device on the basis of a correspondence relationship between a position on the captured image and a position on the display device, and displaying the operation region image at the position obtained through conversion on the display device.

33. The control method according to 31., wherein the display device is a display device of a non-transmissive head mounted display or a projector, and wherein, in the display control step, displaying on the display device the captured image on which the operation region image is superimposed at a position from which the operation region is extracted.

34. The control method according to any one of 31. to 33., wherein, in the display control step, displaying an operation target image which is an image indicating an input operation target on the display device, and changing display on the display device in response to an input operation recognized in the recognition step.

35. The control method according to 34., wherein, in the recognition step, recognizing:

an operation of locating the operation body near the operation target image, an operation of causing the operation body to come close to the operation target image, an operation of causing the operation body to become distant from the operation target image, an operation of causing the operation body to come out of the operation region, or an operation of locating the operation body within a region in a predetermined range at an end of the operation region.

36. The control method according to 35., wherein, in the display control step, performing:

a process of setting the operation target image as a selection candidate in response to recognition of the operation of locating the operation body near the operation target image, and a process of determining the selection candidate as a selection target in response to recognition of any of an input operation of causing the operation body to come close to the selection candidate, an operation of locating the operation body in a predetermined region at an upper end of the operation region, and an operation of causing the operation body to come to the outside over the upper end of the operation region, in a state in which the operation target image is the selection candidate.

37. The control method according to 36., wherein, in the display control step, performing, in a state in which the operation target image is the selection candidate, a process of changing the operation target image being a selection candidate into a state in which the operation target image is not a selection candidate in response to recognition of any of an operation of causing the operation body to become distant from the selection candidate, an operation of locating the operation body in a predetermined region at a lower end of the operation region, and an operation of causing the operation body to come to the outside over the lower end of the operation region.

38. The control method according to any one of 33. to 37.,
wherein, in the recognition step, recognizing an operation of moving the operation body at a speed of a predetermined value or greater, and
wherein, in the display control step, performing a process of changing the operation target image displayed on the display device into another operation target image in response to recognition of the operation moving the operation body at a speed of the predetermined value or greater.

39. The control method according to any one of 34. to 38.,
wherein, in the display control step, displaying an operation target image indicating a slide bar on the display device,
wherein, in the recognition step, recognizing an input operation in which the operation body overlaps a knob of the slide bar, and the operation body is moved along a bar of the slide bar, and
wherein, in the display control step, changing a display position of the knob of the slide bar into a position to which the operation body has been moved.

40. A program causing a computer to execute:
an operation region extraction step of extracting an operation region from a captured image generated by a camera on the basis of a position of a marker; and
a recognition step of calculating a position or motion of an operation body in the operation region, and recognizes an input operation on the basis of the calculated position or motion,
wherein the marker is an object attached to a user or is a part of the body of the user.

41. The program according to 40.,
wherein the marker is an object attached to an arm portion of the user, and
wherein the operation region is a region on the arm portion.

42. The program according to 40., wherein the marker is an image displayed on a display of a device attached to the user.

43. The program according to any one of 40. to 42.,
wherein, in the recognition step, recognizing an input operation corresponding to a speed of the operation body.

44. The program according to any one of 40. to 43., causing the computer to further execute displaying an operation region image indicating the operation region on a display device.

45. The program according to 44.,
wherein the display device is a display device of a transmissive head mounted display, and
wherein, in the display control step, converting a position of the operation region image on the captured image into a position on the display device on the basis of a correspondence relationship between a position on the captured image and a position on the display device, and displaying the operation region image at the position obtained through conversion on the display device.

46. The program according to 44.,
wherein the display device is a display device of a non-transmissive head mounted display or a projector, and
wherein, in the display control step, displaying on the display device the captured image on which the operation region image is superimposed at a position from which the operation region is extracted.

47. The program according to any one of 44. to 46.,
wherein, in the display control step,
displaying an operation target image which is an image indicating an input operation target on the display device, and
changing display on the display device in response to an input operation recognized in the recognition step.

48. The program according to 47.,
wherein, in the recognition step, recognizing:
an operation of locating the operation body near the operation target image,
an operation of causing the operation body to come close to the operation target image,
an operation of causing the operation body to become distant from the operation target image,
an operation of causing the operation body to come out of the operation region, or
an operation of locating the operation body within a region in a predetermined range at an end of the operation region.

49. The program according to 48.,
wherein, in the display control step, performing:
a process of setting the operation target image as a selection candidate in response to recognition of the operation of locating the operation body near the operation target image, and
a process of determining the selection candidate as a selection target in response to recognition of any of an input operation of causing the operation body to come close to the selection candidate, an operation of locating the operation body in a predetermined region at an upper end of the operation region, and an operation of causing the operation body to come to the outside over the upper end of the operation region, in a state in which the operation target image is the selection candidate.

50. The program according to 49., wherein, in the display control step, performing, in a state in which the operation target image is the selection candidate, a process of changing the operation target image being a selection candidate into a state in which the operation target image is not a selection candidate in response to recognition of any of an operation of causing the operation body to become distant from the selection candidate, an operation of locating the operation body in a predetermined region at a lower end of the operation region, and an operation of causing the operation body to come to the outside over the lower end of the operation region.

51. The program according to any one of 46. to 50.,
wherein, in the recognition step, recognizing an operation of moving the operation body at a speed of a predetermined value or greater, and
wherein, in the display control step, performing a process of changing the operation target image displayed on the display device into another operation target image in response to recognition of the operation moving the operation body at a speed of the predetermined value or greater.

52. The program according to any one of 47. to 51.,
wherein, in the display control step, displaying an operation target image indicating a slide bar on the display device,
wherein, in the recognition step, recognizing an input operation in which the operation body overlaps a knob of the slide bar, and the operation body is moved along a bar of the slide bar, and wherein, in the display control step, changing a display position of the knob of the slide bar into a position to which the operation body has been moved.

This application is based upon and claims the benefit of priority from Japanese Patent Application No. 2016-033960, filed Feb. 25, 2016; the entire contents of which are incorporated herein by reference.

What is claimed is:

1. An information processing apparatus comprising a processor and memory storing instructions,
wherein the processor is configured to:
extract an operation region from a captured image generated by a camera, the extraction being performed on the basis of a position of a marker; and
calculate a position or motion of an operation body in the operation region, and recognizes an input operation on the basis of the calculated position or motion,
wherein the marker is an image displayed on a display of a device attached to a user,
wherein the operation region can be divided into more than one region, and
wherein the input operation further comprises using at least one finger or an object held by the user in the operation region.

2. The information processing apparatus according to claim 1,
wherein the marker is attached to an arm portion of the user, and
wherein the operation region is a region on the arm portion.

3. An information processing apparatus comprising a processor and memory storing instructions,
wherein the processor is configured to:
extract an operation region from a captured image generated by a camera, the extraction being performed on the basis of a position of a marker;
calculate a position or motion of an operation body in the operation region, and recognize an input operation on the basis of the calculated position or motion; and
display an operation region image indicating the operation region on a display device,
wherein the marker is attached to a user or is a part of the body of the user,
wherein the operation region can be divided into more than one region, and
wherein the input operation further comprises using at least one finger or an object held by the user in the operation region.

4. The information processing apparatus according to claim 1, wherein the processor is further configured to recognize an input operation corresponding to a speed of the operation body.

5. The information processing apparatus according to claim 1, further comprising a display device that displays an image,
wherein the processor is further configured to display an operation region image indicating the operation region on the display device.

6. The information processing apparatus according to claim 3, wherein the marker is an image displayed on a display of a device attached to the user.

7. The information processing apparatus according to claim 3,
wherein the display device is a display device of a transmissive head mounted display, and
wherein the processor is further configured to convert a position of the operation region image on the captured image into a position on the display device on the basis of a correspondence relationship between a position on the captured image and a position on the display device, and display the operation region image at the position obtained through conversion on the display device.

8. The information processing apparatus according to claim 3,
wherein the display device is a display device of a non-transmissive head mounted display or a projector, and
wherein the processor is further configured to display on the display device the captured image on which the operation region image is superimposed at a position from which the operation region is extracted.

9. The information processing apparatus according to claim 3,
wherein the processor is further configured to:
display an operation target image which is an image indicating an input operation target on the display device; and
change a display on the display device in response to an input operation recognized by the recognition unit.

10. The information processing apparatus according to claim 9,
wherein the processor is further configured to recognize:
an operation of locating the operation body near the operation target image;
an operation of causing the operation body to come close to the operation target image;
an operation of causing the operation body to become distant from the operation target image;
an operation of causing the operation body to come out of the operation region; or
an operation of locating the operation body within a region in a predetermined range at an end of the operation region.

11. The information processing apparatus according to claim 10,
wherein the processor is further configured to perform:
a process of setting the operation target image as a selection candidate according to recognition of the operation of locating the operation body near the operation target image; and
a process of determining the selection candidate as a selection target in response to recognition of any of an input operation of causing the operation body to come close to the selection candidate, an operation of locating the operation body in a predetermined region at an upper end of the operation region, and an operation of causing the operation body to come to the outside over the upper end of the operation region, in a state in which the operation target image is the selection candidate.

12. The information processing apparatus according to claim 11, wherein the processor is further configured to perform, in a state in which the operation target image is the selection candidate, a process of changing the operation target image being a selection candidate into a state in which the operation target image is not a selection candidate in response to recognition of any of an operation of causing the operation body to become distant from the selection candidate, an operation of locating the operation body in a predetermined region at a lower end of the operation region, and an operation of causing the operation body to come to the outside over the lower end of the operation region.

13. The information processing apparatus according to claim 9, wherein the processor is further configured to recognize an operation of moving the operation body at a speed of a predetermined value or greater, and wherein the processor is further configured to perform a process of changing the operation target image displayed on the display device into another operation target image in response to recognition of the operation moving the operation body at a speed of the predetermined value or greater.

14. The information processing apparatus according to claim 9, wherein the processor is further configured to display an operation target image indicating a slide bar on the display device, wherein the processor is further configured to recognize an input operation in which the operation body overlaps a knob of the slide bar, and the operation body is moved along a bar of the slide bar, and wherein the processor is further configured to change a display position of the knob of the slide bar into a position to which the operation body has been moved.

15. A control method executed by a computer, comprising:

extracting an operation region from a captured image generated by a camera, the extraction being performed on the basis of a position of a marker; and calculating a position or motion of an operation body in the operation region, and recognizing an input operation on the basis of the calculated position or motion, wherein the marker that is an image displayed on a display of a device attached to a user, wherein the operation region can be divided into more than one region, and wherein the input operation further comprises using at least one finger or an object held by the user in the operation region.

16. A control method executed by a computer, comprising:

extracting an operation region from a captured image generated by a camera, the extraction being performed on the basis of a position of a marker;

calculating a position or motion of an operation body in the operation region, and recognizing an input operation on the basis of the calculated position or motion; and displaying an operation region image indicating the operation region on a display device, wherein the marker is attached to a user or is a part of the body of the user, wherein the operation region can be divided into more than one region, and wherein the input operation further comprises using at least one finger or an object held by the user in the operation region.

17. A non-transitory computer-readable storage medium storing a program causing a computer to execute:

extracting an operation region from a captured image generated by a camera, the extraction being performed on the basis of a position of a marker; and calculating a position or motion of an operation body in the operation region, and recognizing an input operation on the basis of the calculated position or motion, wherein the marker that is an image displayed on a display of a device attached to a user, wherein the operation region can be divided into more than one region, and wherein the input operation further comprises using at least one finger or an object held by the user in the operation region.

18. A non-transitory computer-readable storage medium storing a program causing a computer to execute:

extracting an operation region from a captured image generated by a camera, the extraction being performed on the basis of a position of a marker;

calculating a position or motion of an operation body in the operation region, and recognizing an input operation on the basis of the calculated position or motion; and displaying an operation region image indicating the operation region on a display device, wherein the marker is attached to a user or is a part of the body of the user, wherein the operation region can be divided into more than one region, and wherein the input operation further comprises using at least one finger or an object held by the user in the operation region.

* * * * *